US008152972B2

(12) United States Patent
Iwata et al.

(10) Patent No.: US 8,152,972 B2
(45) Date of Patent: Apr. 10, 2012

(54) METHOD FOR FORMING FINE PARTICLES, METHOD FOR FORMING CONCAVITIES AND CONVEXITIES, AND DEVICE FOR FORMING FINE PARTICLES

(75) Inventors: Noboru Iwata, Nara (JP); Yoshiteru Murakami, Hyogo (JP)

(73) Assignee: Sharp Kabushiki Kaisha, Osaka (JP)

( * ) Notice: Subject to any disclaimer, the term of this patent is extended or adjusted under 35 U.S.C. 154(b) by 671 days.

(21) Appl. No.: 12/291,817

(22) Filed: Nov. 13, 2008

(65) Prior Publication Data
US 2009/0127095 A1    May 21, 2009

(30) Foreign Application Priority Data

Nov. 21, 2007    (JP) ................................. 2007-302292

(51) Int. Cl.
C23C 14/00    (2006.01)
(52) U.S. Cl. ............ 204/192.23; 204/192.12; 204/298.2
(58) Field of Classification Search ............. 204/192.12, 204/192.23, 298.2
See application file for complete search history.

(56) References Cited

U.S. PATENT DOCUMENTS

| 6,171,454 | B1 * | 1/2001 | Weber et al. ............. 204/192.12 |
| 6,602,620 | B1 | 8/2003 | Kikitsu et al. |
| 2002/0086185 | A1 | 7/2002 | Yasui et al. |
| 2002/0186506 | A1 | 12/2002 | Sato et al. |
| 2005/0031905 | A1 | 2/2005 | Yasui et al. |
| 2005/0161427 | A1 | 7/2005 | Okawa et al. |
| 2006/0286345 | A1 | 12/2006 | Nakao |
| 2007/0242381 | A1 | 10/2007 | Sakurai et al. |

FOREIGN PATENT DOCUMENTS

| JP | 02-173258 A | 7/1990 |
| JP | 04-255909 A | 9/1992 |
| JP | 05-037957 A | 2/1993 |
| JP | 05-037957 U | 5/1993 |
| JP | 08-217420 A | 8/1996 |
| JP | 11-339239 A | 12/1999 |
| JP | 2004-272997 | 9/2004 |
| JP | 2005-209273 A | 8/2005 |
| JP | 2006-346820 A | 12/2006 |
| JP | 2007-273042 A | 10/2007 |

OTHER PUBLICATIONS

Noboru Iwata et al., Magnetic properties of amorphous magnetic film on self-assembled convex pattern,: Advanced Technology Research Laboratories, Sharp Corporation, IEEE International Magnetics Conference (Intermag) 2008, May 5, 2008.
K. Naito et al., "2.5-Inch Disk Patterned Media Prepared by an Artificially Assisted Self-Assembling Method," IEEE Transactions on Magnetics, vol. 38, No. 5, Sep. 2002, pp. 1949-1951.
H. Kikuchi et al., "Fabrication of Head-Flyable Nanohole Patterned Media and Dynamic Write/Read Measurement With GMR Head," IEEE Transactions on Magnetics, vol. 41, No. 10, Oct. 2005, pp. 3226-3228.
S. Miyanishi et al., "Near-Field Assisted Magnetic Recording," IEEE Transactions on Magnetics, vol. 41, No. 10, Oct. 2005, pp. 2817-2821.
C.D. Stanciu et al., "Ultrafast spin dynamics across compensation points in ferrimagnetic GdFeCo: The role of angular momentum compensation," Physical Review B73, 220402(R) (2006), Jun. 12, 2006, pp. 220402-1-22042-4, The American Physical Society.
M. Binder et al., "Magnetization dynamics of the ferrimagnet CoGd near the compensation of magnetization and angular momentum," Physical Review B74, 134404(2006), pp. 134404-1-134404-5, The American Physical Society.
K. Nakazawa et al., "Magnetization Dynamics in GDFECO Films Measured Using a Ultra Short Pulse Fiber Laser," Proceedings of MORIS2007 Workshop on Thermal and Optical Magnetic Materials and Devices, PA-12(2007).
B.G. Huth, "Calculations of Stable Domain Radii Produced by Thermomagnetic Writing," IBM J. Res. Develop, 18,100 (1974), pp. 100-109 Magneto-Optical Film Domains.

* cited by examiner

*Primary Examiner* — Christopher Young
(74) *Attorney, Agent, or Firm* — Edwards Wildman Palmer LLP; David G. Conlin; Stephen D. LeBarron

(57) ABSTRACT

A method of the present invention for forming fine particles includes forming fine particles on a substrate by supplying, in the presence of inert gas, to the substrate, atoms or molecules of a supply material capable of being combined with a material constituting a surface of the substrate to produce a compound, the atoms or the molecules being supplied from a supply source. The supply source is positioned in such a manner as not to be directly connected by a line with the surface of the substrate where the fine particles are to be formed, and a high-frequency voltage varying positively and negatively, ranging from 100 kHz to 100 MHz, is applied to at least one of the substrate and a substrate supporter for supporting the substrate. This realizes a method for forming fine particles that allows forming highly uniformed magnetic fine particles with a periodic pattern through a simple process at a time.

9 Claims, 33 Drawing Sheets

METHOD FOR FORMING FINE PARTICLES, METHOD FOR FORMING CONCAVITIES AND CONVEXITIES, AND DEVICE FOR FORMING FINE PARTICLES

This Nonprovisional application claims priority under U.S.C. §119(a) on Patent Application No. 302292/2007 filed in Japan on Nov. 21, 2007, the entire contents of which are hereby incorporated by reference.

FIELD OF THE INVENTION

The present invention relates to fine particles with high periodicity, concavities and convexities with high periodicity, and a device for producing fine particles.

BACKGROUND OF THE INVENTION

In the field of magnetic recording such as a hard disc, recording density is currently exceeding 400 Gbit/inch$^2$ in area density due to the increases in properties of storage media, recording heads, and reproducing heads, and the recording density is going to further increase.

Among them, a magnetic storage medium used in a current hard disc has a problem of heat fluctuation. It is known that as recording density further increases, it becomes difficult to stably store magnetic information for a long time.

The problem of heat fluctuation is represented by a relation between (i) a magnetic anisotropic energy $vK_u$ that is a product of volume v of magnetic particles forming magnetic bits of a magnetic storage medium and a magnetic anisotropic energy constant $K_u$ and (ii) thermal energy kT (k: Boltzmann's constant, T: temperature). It is known that when the magnetic anisotropic energy $vK_u$ gets so small as to be approximately several ten times larger than the thermal energy kT, magnetic information is lost notably due to heat fluctuation.

As one means for solving the problem of heat fluctuation, there is proposed a magnetic storage medium called patterned media (see Patent Documents 1-3 for example).

The magnetic storage medium called patterned media is a medium in which one magnetic particle forms one magnetic bit and a non-magnetic material exists between magnetic particles to separate them, as opposed to a magnetic storage medium (granular medium) employed in a conventional hard disc that is designed such that a plurality of small magnetic particles form one magnetic bit. The magnetic medium called patterned media is highly effective in solving the problem of heat fluctuation, since the magnetic medium allows a larger volume v of magnetic particles than the granular medium.

On the other hand, since one magnetic particle forms one magnetic bit, variations in the size of individual magnetic particles and in the array period of individual magnetic particles causes variations in a magnetic field required in recording and noises in reproduction. Therefore, it is necessary to make an array period pattern of magnetic bits as even as possible.

As a technique for realizing such patterned media, Patent Document 1 discloses a magnetic storage medium that can be produced with use of a block copolymer.

Further, Patent Document 2 discloses a magnetic storage medium where fillers made of a hard magnetic material fill alumina nano holes obtained by processing alumina.

Further, Patent Document 3 discloses a magnetic storage medium including a recording magnetic layer that includes a plurality of magnetic columns made of a magnetic material and a non-magnetic region that is made of a non-magnetic material and that exists between the magnetic columns.

Patent Document 3 describes that material particles used as making for forming patterned media are prepared by depositing and growing a predetermined material to have an island-shape through sputtering using a predetermined target. Further, Patent Document 3 describes that Ag, Cr, W, Mo, Ta or alloys thereof may be used as a material for forming the material particles (see paragraph [0038] of Patent Document 3).

Further, Patent Document 3 describes another masking that is obtained in such a manner that a solution in which a compound that can be deposited as so-called nano particles are dissolved is applied on the surface of a magnetic material film through spin coating and then a liquid component of the solution is evaporated to deposit the nano particles (see paragraph [0040] of Patent Document 3).

Other than the methods disclosed in Patent Documents 1-3, there are known methods such as: a method for applying a resist material on a magnetic material, forming a pattern with use of photolithography or electron beam exposure, developing the pattern, and thereafter etching the magnetic material with use of the resist material as masking so as to produce patterned media; and a method for directly processing a magnetic material with use of FIB (Focused Ion Beam) and patterning the magnetic material.

However, the conventional methods have a problem that it is difficult to form highly uniformed magnetic particles with a periodic pattern through a simple process at a time.

Specifically, each of the methods disclosed in Patent Documents 1 and 2, the method using nano particles that is disclosed in paragraph [0040] of Patent Document 3, and the well-known methods other than the methods disclosed in Patent Documents 1-3 for processing a magnetic material with use of photolithography, electron beam lithography, and FIB requires a large number of devices and steps that are not required in the production of the conventional granular medium, which results in higher production costs and more complex production steps.

Further, the aforementioned methods other than the method using FIB generally require a wet process, which may cause attachment of contaminated substances in a chemical solution and cause a defective product. In the method using FIB, direct processing causes chips and the chips attach as contaminated substances.

Further, among the aforementioned well-known methods, the methods using photolithography, electron beam lithography, and FIB require serially forming individual patterns one by one, and consequently the production of a medium requires a longer time and higher costs.

On the other hand, in the method disclosed in paragraph [0038] of Patent Document 3 in which a predetermined material is deposited and grown to have an island-shape through sputtering, a pattern can be formed by film formation through sputtering. Therefore, it is considered that the method is compatible with conventional steps for producing a medium. However, the size and movement energy of individual particles ejected from a target through the sputtering vary, and consequently it is difficult to uniform the island-shape on a substrate in nano meter order. Further, the actually formed island-shape has random size and random period, and therefore a substrate having the shape formed through this method is difficult to be used as a pattern for the patterned media that requires high uniformity.

[Patent Document 1]
Japanese Unexamined Patent Publication No. Tokukai 2000-251236 (published on Sep. 14, 2000)

[Patent Document 2]
Japanese Unexamined Patent Publication No. Tokukai 2002-175621 (published on Jun. 21, 2002)
[Patent Document 3]
Japanese Unexamined Patent Publication No. Tokukai 2004-272997 (published on Sep. 30, 2004)

SUMMARY OF THE INVENTION

An object of the present invention is to provide (i) a method for forming highly uniformed magnetic fine particles with a periodic pattern through a simple process at a time, (ii) a method for forming concavities and convexities through the method (i), and (iii) a device for forming fine particles that is used in the methods (i) and (ii).

In order to achieve the foregoing object, a method of the present invention for forming fine particles includes the step of forming fine particles on a substrate by supplying, in a presence of inert gas, to the substrate, atoms or molecules of a supply material that is capable of being combined with a material constituting a surface of the substrate to produce a compound, the atoms or the molecules of the supply material being supplied from a supply source, the supply source being positioned in such a manner that the supply material from the supply source is not directly incident to the surface of the substrate where the fine particles are to be formed, a high-frequency voltage varying positively and negatively with respect to a ground voltage, ranging from 100 kHz to 100 MHz, being applied to at least one of the substrate and a substrate supporter for supporting the substrate.

With the method, a high-frequency voltage varying positively and negatively with respect to a ground voltage is applied on at least one of the substrate and the substrate supporter for supporting the substrate. Consequently, in a time when a voltage negative with respect to the ground voltage is applied on the substrate and/or the substrate supporter, movement energy in a direction to collide with the substrate is given to inert gas ions, and the inert gas ions collide with the surface of the substrate to physically eject atoms or molecules (hereinafter referred to as "atoms etc.") from the surface. On the other hand, in a time when a voltage positive with respect to the ground voltage is applied on the substrate and/or the substrate supporter, movement energy in a direction to be away from the substrate is given to the inert gas ions, and the atoms etc. ejected from the substrate and atoms etc. supplied from the supply source are attached to the surface of the substrate.

In this manner, ejection of atoms etc. from the surface of the substrate and attachment of the atoms etc. to the surface are repeated. Consequently, on the surface of the substrate, atoms etc. supplied from the supply source and atoms etc. ejected from the substrate are combined with each other to produce a compound that grows as fine particles.

Further, in the method, the supply source is positioned in such a manner that the supply material from the supply source is not directly incident to the surface of the substrate where the fine particles are to be formed.

With the position, out of atoms etc. from the supply source, atoms etc. with high energy are prevented from directly reaching the surface of the substrate and only atoms etc. with low energy having bypassed the surface of the substrate reach the surface of the substrate.

Consequently, it is possible to form fine particles with high periodicity in nano meter order on the substrate.

Therefore, with the method, it is possible to form fine particles that allow forming highly uniformed magnetic fine particles with a periodic pattern through a simple process at a time.

That is, with the method, it is possible to easily form, with use of a vacuum device compatible with a conventional magnetic storage medium, fine particles with high periodicity in nano meter order that are applicable to production of a high density magnetic storage medium such as patterned media.

In order to achieve the foregoing object, a method of the present invention for forming concavities and convexities includes the step of etching the substrate masked by the fine particles formed through the above method for forming fine particles.

With the method, it is possible to cause the concavities and convexities formed by the fine particles to be further higher (deeper), thereby forming concavities and convexities suitable for a base for a high density magnetic storage medium.

Therefore, with the method, it is possible to produce a substrate on which concavities and convexities are formed, capable of forming highly uniformed magnetic fine particles with a periodic pattern through a simple process at a time.

In order to achieve the foregoing object, a device of the present invention for forming fine particles on a substrate includes: inert gas introducing means; a substrate supporter for supporting a substrate; a supply source for supplying a supply material that is capable of being combined with a material constituting a surface of the substrate to produce a compound; supply material generation means for generating atoms or molecules of the supply material from the supply source; and a high-frequency power source for applying, to at least one of the substrate and the substrate supporter, a high-frequency voltage varying positively and negatively with respect to a ground voltage, ranging from 100 kHz to 100 MHz, the supply source being positioned in such a manner that the supply material from the supply source is not directly incident to the surface of the substrate where the fine particles are to be formed.

With the method, a high-frequency voltage varying positively and negatively with respect to a ground voltage is applied on at least one of the substrate and the substrate supporter for supporting the substrate. Consequently, in a time when a voltage negative with respect to the ground voltage is applied on the substrate and/or the substrate supporter, movement energy in a direction to collide with the substrate is given to inert gas ions, and the inert gas ions collide with the surface of the substrate to physically eject atoms or molecules (hereinafter referred to as "atoms etc.") from the surface. On the other hand, in a time when a voltage positive with respect to the ground voltage is applied on the substrate and/or the substrate supporter, movement energy in a direction to be away from the substrate is given to the inert gas ions, and the atoms etc. ejected from the substrate and atoms etc. supplied from the supply source are attached to the surface of the substrate.

In this manner, ejection of atoms etc. from the surface of the substrate and attachment of the atoms etc. to the surface are repeated. Consequently, on the surface of the substrate, atoms etc. supplied from the supply source and atoms etc. ejected from the substrate are combined with each other to produce a compound that grows as particles.

Further, in the method, the supply source is positioned in such a manner that the supply material from the supply source is not directly incident to the surface of the substrate where the fine particles are to be formed.

With the position, out of atoms etc. from the supply source, atoms etc. with high energy are prevented from directly reaching the surface of the substrate and only atoms etc. with low energy having bypassed the surface of the substrate reach the surface of the substrate.

Consequently, it is possible to form fine particles with high periodicity in nano meter order on the substrate.

Therefore, with the arrangement, it is possible to form fine particles that allow forming highly uniformed magnetic fine particles with a periodic pattern through a simple process at a time.

Additional objects, features, and strengths of the present invention will be made clear by the description below. Further, the advantages of the present invention will be evident from the following explanation in reference to the drawings.

DESCRIPTION OF THE EMBODIMENTS

The following explains the present invention in details.

The wordings "mainly including", "mainly containing" and "mainly made of" in the present specification indicate that the component occupies the largest part of whole components, the component preferably occupies 50 wt % or more of the whole components, and the component most preferably occupies 100 wt % of the whole components. The wording "A to B" indicative of a range indicates being not less than A and not more than B.

First Embodiment (a) Fine Particle Forming Device

Figure 1:
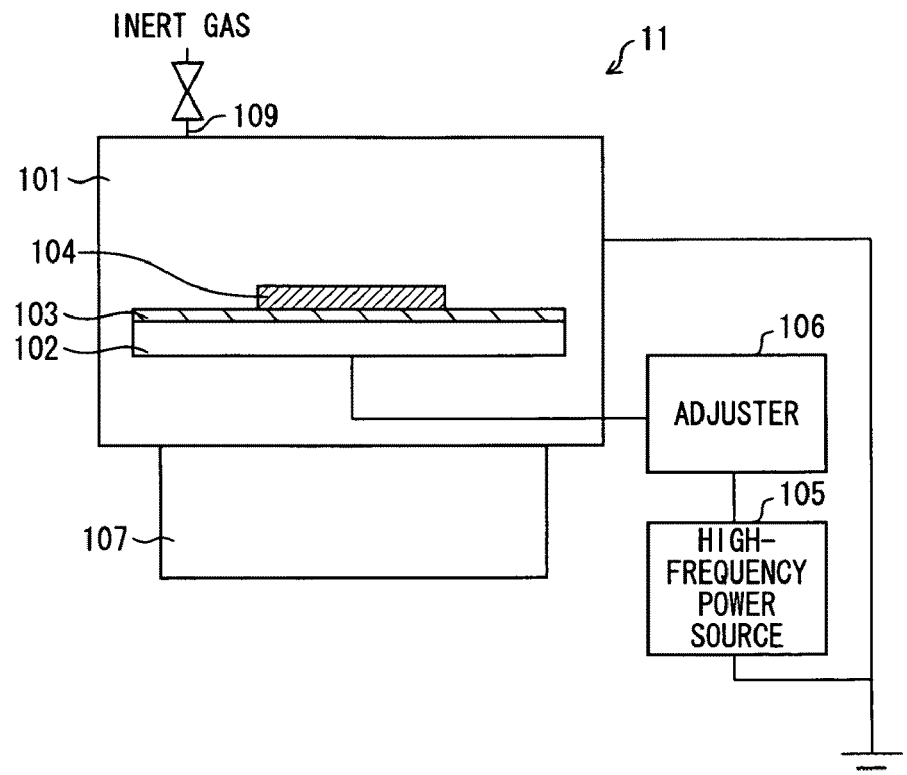
FIG. 1 is a cross sectional drawing schematically illustrating an example of a device of the present embodiment for forming fine particles.

FIG. 1 is a drawing schematically illustrating a fine particle forming device of the present invention.

As illustrated in FIG. 1, a fine particle forming device 11 of the present embodiment includes: a substrate supporter 102 for supporting a substrate 104; and a supply source 103 for supplying a supply material to the substrate 104, and forms fine particles on the substrate 104 by supplying the supply material to the substrate 104 through sputtering. The fine particle forming device 11 further includes a high frequency power source 105 for applying a high-frequency voltage varying positively and negatively on at least one of the substrate 104 and the substrate supporter 102. The supply source 103 is provided at a position where the supply material is not directly incident to the surface of the substrate 104 on which the fine particles are to be formed.

"A position where the supply material is not directly incident to the surface of the substrate 104 on which the fine particles are to be formed" in the present specification may be realized as follows. That is, the substrate 104 is provided at a position to which the supply material ejected from the supply source 103 does not reach linearly, or a shield is provided between the surface of the substrate 104 on which the fine particles are to be formed and the supply source 103 for supplying the supply material in such a manner that the supply material ejected from the supply source 103 cannot linearly reach the surface of the substrate 104, as mentioned later.

The shield may be provided by supplying a supply material from the back side of the substrate 104 (i.e., the substrate 104 itself is used as a shield) or by providing a shield between the supply source 103 and the substrate 104.

The high frequency power source 105 is electrically connected with the substrate supporter 102 via an adjustor 106 for adjusting impedance.

In the fine particle forming device 11, the substrate 104, the substrate supporter 102, and the supply source 103 are provided in a vacuum chamber 101. The vacuum chamber 101 is connected with a vacuum pump 107 which can reduce the pressure inside the vacuum chamber 101.

Further, the vacuum chamber 101 is connected with a gas pipe (inert gas introduction means) 109 for introducing inert gas such as Ar, Kr, and Xe into the vacuum chamber 101.

In the fine particle forming device 11, by introducing the inert gas and applying a high frequency voltage, it is possible to cause plasma radiation in the vacuum chamber 101 and to form fine particles on the substrate 104 through sputtering.

In the present embodiment, the supply source 103 is provided on the surface of the substrate supporter 102, and the substrate 104 is provided on the surface side of the substrate supporter 102.

In the present embodiment, the substrate supporter 102 is electrically connected with the high frequency power source 105 and therefore is preferably made of a conductive metal material.

The substrate supporter 102 is not particularly limited as long as it can support the substrate 104. The substrate supporter 102 may support the substrate 104 by fixing it with a screw or a spring, by fixing with a magnet, or performing vacuum suction.

The substrate supporter 102 does not necessarily fix the substrate 104 actively. Instead, the substrate 104 may be simply put on the substrate supporter 102. Further, the substrate supporter 102 may rotate inside the vacuum chamber 101, or may be made by combining a member receiving an electric power from the high frequency power source 105 with a member for supporting the substrate.

That is, a portion of the substrate supporter 102 that supports the substrate 104 is electrically connected in a direct manner, or the substrate supporter 102 is electrically connected via other member in an indirect manner. For example, the substrate supporter 102 may be arranged so that it is made of a rotating member and a base and the substrate 104 is supported by the rotating member and the base receives an electric power from the high-frequency power source 105.

The supply source 103 supplies, to the substrate 104, atoms or molecules (that may be referred to as "atoms etc." hereinafter) of a supply material capable of being combined with a material constituting the surface of the substrate 104 to produce a compound. The supply material in the form of atoms etc. is a material capable of being combined with the material constituting the surface of the substrate 104 to produce a compound, and of forming fine particles of the compound on the surface of the substrate 104.

In order to determine whether the material constituting the substrate 104 and the supply material are combined with each other to produce the compound or not, a phase diagram may be used for example.

That is, "a supply material capable of being combined with the material constituting the surface of the substrate to produce a compound" in the present specification is a supply material that has a region of a compound with the material constituting the surface of the substrate 104 in a phase diagram showing the supply material and the material constituting the surface of the substrate 104. The supply material is more preferably a supply material that has a region of a compound with the material constituting the surface of the substrate 104 under fine particle forming conditions (temperature and pressure) in use in the phase diagram showing the supply material and the material constituting the surface of the substrate 104.

The material for the supply source 103 is not particularly limited as long as the material allows producing a supply material capable of being combined with the material constituting the surface of the substrate 104 to produce a compound. For example, the material may be selected from materials mainly made of elements belonging to 3-6 groups in the periodic table of the elements. More specifically, the material may be (i) a material mainly including at least one selected from the group consisting of V, Cr, Zr, Nb, Mo, Hf, Ta, and W that are materials with high melting points, (ii) a material mainly including an alloy including at least one selected from the group, or (iii) a material mainly including an alloy including these materials and the material constituting the surface of the substrate 104. Further, a compound made by combining the aforementioned material with a later-mentioned material on the surface of the substrate 104 may be used.

The supply source 103 may be a thin film formed on the substrate supporter 102, or a bulk formed on the substrate supporter 102. Further, it is unnecessary that the supply source 103 is formed on the whole surface of the substrate supporter 102 as long as the supply source 103 is at least partially formed on a region other than a region covered by the substrate 104.

The substrate 104 may be a substrate mainly made of a material that can be combined with atoms etc. supplied from the supply source 103 to produce a compound, or may be a substrate on at least a surface of which the material that can be combined with the supplied atoms etc. to produce a compound is formed.

The material for the substrate 104 or the surface of the substrate 104 is not particularly limited as long as the material can be combined with atoms etc. supplied from the supply source 103 to produce a compound. Examples of the material include a semiconductor material mainly made of elements such as Si and Ge, and Al.

In a case where the material that can be combined with the supplied atoms etc. to produce a compound is formed on the surface of the substrate 104, the base material of the substrate 104 is not particularly limited. In addition to the above materials, the base material may be an insulating material such as $SiO_2$, $Al_2O_3$, and glass, a semiconductor material such as GaAs and GaN, various metal materials, and a resin substrate.

When determining the material for the supply source 103 and the material for the substrate 104, it is further desirable to select the materials so that the supplied material supplied from the supply source 103 is combined with the material for the surface of the substrate 104 to produce fine particles of a compound on the substrate 104 which compound has unfamiliarity with the surface of the substrate 104 (has low wettability with respect to the surface of the substrate 104).

This is because when the produced fine particles of the compound have unfamiliarity with the surface of the substrate 104, fine particles (agglomeration of fine particles) are formed with a space between adjacent fine particles, thereby isolating individual fine particles. This allows providing fine particles suitable for etching with the fine particles used as masking.

As described above, in order that the fine particles formed on the substrate 104 have unfamiliarity with the surface of the substrate 104, it is important to design that surface energy at the side of the substrate 104 is small and surface energy at the side of the fine particles and interface energy between the substrate 104 and the fine particles are large. Therefore, it is desirable to design that the material for the fine particles is a material having large surface energy and the material for the surface of the substrate 104 is a material having surface energy smaller than that of the material having large surface energy. It is known that the size of surface energy generally has a relationship with a melting point of a material (element) and therefore it is desirable to design that the material (element) for the supply source 103 is a high-melting-point material whose melting point generally exceeds 1500° C. That is, it is desirable that the material for the surface of the substrate 104 is a material having a lower melting point than the material for the supply source 103.

Further, when the material for the surface of the substrate 104 and the supply material are selected so that the supply material supplied from the supply source 103 is combined with the material for the surface of the substrate 104 to produce fine particles of a compound on the substrate 104 (when the melting point of the material for the surface of the substrate 104 is lower than the melting point of the supply material), it is possible to lower the melting point of the obtained fine particles than fine particles formed when the supply material is not combined with the material for the surface of the substrate 104 to produce a compound. This allows making the fine particles formed on the substrate 104 unfamiliar with the surface of the substrate 104 and causing the fine particles to grow to such an extend that the fine particles can be used as etching masks.

Specifically, assume that the supply material is, for example, a material with a high melting point that forms extremely small particles of 1 to 2 nm or less on the substrate 104 in a case where the surface of the substrate 104 is made of a material that cannot be combined with the supply material to produce a compound. Here, by designing that the surface of the substrate 104 is made of a material that can be combined with the supply material to produce a compound, the melting point of the resulting fine particles (compound) gets lower than the melting point of the supply material, allowing the fine particles to grow to have a diameter of 5 nm to several ten nm on the substrate 104.

The high frequency power source 105 in the present embodiment is a power source that generates a high-frequency voltage with a frequency range that allows ejecting the supply material from the supply source 103 through sputtering, specifically, a frequency range not less than 100 kHz and not more than 100 MHz, and that can supply a high-frequency voltage varying positively and negatively with respect to a ground voltage. For example, there may be used a power source for generating a high-frequency voltage with 13.56 MHz that is general as a power source for high frequency sputtering.

Figure 2:
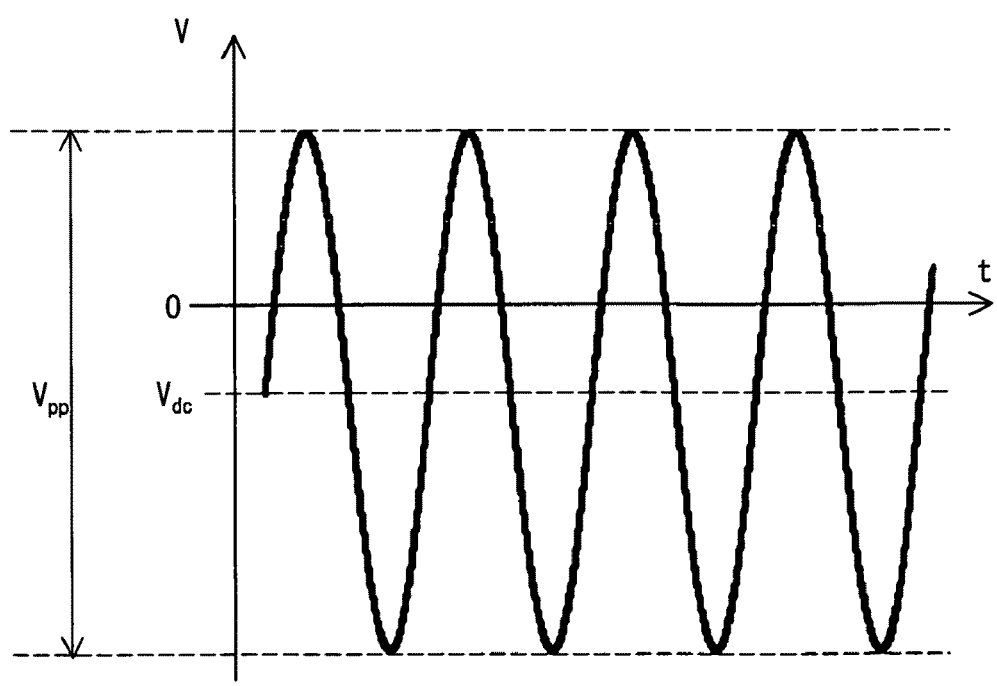
FIG. 2 is a graph showing an example of a waveform of a high-frequency voltage used in forming fine particles of the present embodiment.

FIG. 2 illustrates an example of a waveform of the high-frequency voltage varying positively and negatively with respect to a ground voltage.

As illustrated in FIG. 2, the high-frequency voltage generated by the high-frequency power source 105 has substantially the shape of a sine wave, and varies positively and negatively with respect to a ground voltage (line 0 in FIG. 2).

Here, assume that a difference between the maximum value and the minimum value of the high-frequency voltage is Vpp and a value obtained by subtracting the ground voltage from an average value of the high-frequency voltage is Vdc. In order that the high-frequency voltage varies both positively and negatively with respect to the ground voltage, it is necessary to set Vpp to be larger than the absolute value Vdc.

FIG. 2 illustrates an example in which Vdc is negative. However, Vdc is not necessarily negative, and may be positive.

The vacuum pump 107 is not particularly limited as long as it can reduce the pressure inside the vacuum chamber 101. For example, the vacuum pump 107 may be obtained by combining a rotary pump or a dry pump with a pump selected from a turbo molecular pump, a cryo pump, and a diffusion pump.

In FIG. 1, the side of the high-frequency power source 105 which side is opposite to the side of the substrate supporter 102 is in a ground state, and the high-frequency power source 105 has the same potential as that of the side wall of the vacuum chamber 101. However, the arrangement of the high-frequency power source 105 is not limited to this as long as it can apply a high-frequency voltage on the substrate supporter 102. Specifically, it may be arranged so that a counter electrode is provided in the vacuum chamber 101 and the counter electrode has the same potential as that of the side of the high-frequency power source 105 which side is opposite to the side of the substrate supporter 102.

(b) Method for forming fine particles In the present embodiment, fine particles are formed as follows.

Initially, vacuuming of the vacuum chamber 101 is performed by the vacuum pump 107, and the pressure of the vacuum chamber 101 is reduced. Here, the ultimate vacuum is not particularly limited. In terms of reducing the influence of contamination, the ultimate vacuum is set to $1\times10^{-3}$ Pa or less, more preferably $1\times10^{-4}$ Pa or less, for example. Next, inert gas is introduced from a gas pipe. Here, the pressure (gas pressure) in the vacuum chamber 101 is set to approximately $1\times10^{-2}$ Pa to 1 Pa for example.

Subsequently, the high-frequency power source 105 is electrified and a high-frequency voltage is applied on the substrate supporter 102. Here, since the invert gas has been introduced into the vacuum chamber 101, plasma radiation occurs, which causes sputtering.

Here, the difference (Vpp) between the maximum value and the minimum value of the high-frequency voltage is set to 200V to 2000V for example. The value (Vdc) obtained by subtracting a ground voltage from the average value of the high-frequency voltage is set to −500V to +100V for example. The relation between Vpp and Vdc is set so that Vpp is larger than the absolute value of Vdc. Consequently, the high-frequency voltage varies positively and negatively with respect to the ground voltage. The introduction of the inert gas and the application of the high-frequency voltage may be performed in reverse order.

The magnitude of the high-frequency voltage may be controlled by an electric power radiated to the substrate supporter 102 and an electric power reflected by the substrate supporter 102. The radiated electric power is set so that a radiated electric power per unit area that is obtained by dividing the radiated electric power by the area of the surface of the substrate supporter 102 on which surface the substrate 104 is attached ranges approximately from 0.02 W/cm$^2$ to 1.2 W/cm$^2$ for example. The reflected electric power is preferably as small as possible. For example, the reflected electric power is set to be approximately 10% or less of the radiated electric power.

During a time when a voltage negative with respect to the ground voltage is applied on the substrate supporter 102, the inert gas ions in the vacuum chamber 101 are given movement energy in a direction in which the ions collide with the substrate supporter 102. Consequently, the inert gas ions collide with the surface of the supply source 103 and the surface of the substrate 104, ejecting atoms etc. on the surfaces thereof physically.

On the other hand, during a time when a voltage positive with respect to the ground voltage is applied on the substrate supporter 102, the inert gas ions in the vacuum chamber 101 are given movement energy in a direction in which the ions go away from the substrate supporter 102. Consequently, atoms etc. ejected from the supply source 103 and substrate 104 are attached to the surface.

Thus, the ejection of atoms etc. from the supply source 103 and the surface of the substrate 104 and the attachment of atoms etc. to the surface of the substrate 104 are repeated, so that atoms etc. supplied from the supply source 103 and atoms etc. ejected from the substrate 104 are combined with each other to produce a compound that grows as particles.

Here, when the supply material supplied from the supply source 103 is a material having a higher melting point than that of the material constituting the surface of the substrate 104, particles having grown on the substrate 104 show unfamiliarity with the surface of the substrate 104, and consequently isolated fine particles (agglomeration) with periodicity are formed on the substrate 104 while providing a space between adjacent fine particles. A time for the fine particles to be formed is not particularly limited, and may range approximately from 100 to 3600 seconds for example.

Lastly, the application of the high-frequency voltage is stopped and the plasma radiation is finished, and consequently fine particles (concavities and convexities) with high periodicity in nano meter order can be formed.

In the present embodiment, the substrate 104 and the supply source 103 are positioned such that atoms etc. supplied from the supply source 103 are not directly incident to the surface of the substrate 104 where fine particles are to be formed (the upper-side surface of the substrate 104 in FIG. 1) (positioned such that a supply element is not directly incident to a surface where fine particles are to be formed).

Specifically, the substrate 104 and the supply source 103 are positioned such that the atoms etc. supplied from the supply source 103 are blocked by the substrate 104 and consequently are not directly incident to the surface of the substrate 104 where fine particles are to be formed.

When the substrate 104 and the supply source 103 are positioned in this manner, particles with large energy out of sputtered particles with large energy and large size distribution are prevented from directly reaching the surface of the substrate 104, and only particles with small energy having bypassed the substrate 104 reach the surface of the substrate 104 to form fine particles (concavities and convexities) with high periodicity.

Further, in the present embodiment, reverse sputtering mainly used to clean the surface of the substrate 104 in a sputtering device may be used. When reverse sputtering in the sputtering device in use is performed with a high-frequency power source that generates a voltage varying positively and negatively with respect to a ground voltage, fine particles can be formed in the same manner as the present embodiment.

In a case of using reverse sputtering, too, a material serving as the supply source 103 is provided beforehand on the surface of a member for supporting the substrate 104 (which member corresponds to the substrate supporter 102) and the substrate 104 is attached to the member, and then reverse sputtering is performed in inert gas atmosphere. Thus, atoms etc. ejected from the supply source 103 and the surface of the substrate 104 attach onto the substrate 104, receives movement energy to be a compound, which grows as particles to be fine particles with periodicity. Usage of reverse sputtering in this manner allows cleaning the surface of the substrate 104 and formation of fine particles on the substrate 104 at once, which is effective.

In the present embodiment, Vdc may be positive or negative. However, Vdc is preferable negative. This is because when Vdc is negative, it is possible to prevent impurity atoms etc. coming from a member other than the supply source 103 and the substrate 104 from attaching to the substrate 104, and it is possible to remove, simultaneously with the above fine particle formation process, unnecessary adsorbate having been adsorbed by the surface of the substrate 104 before the substrate 104 is introduced into the fine particle forming device 11. Consequently, it is possible to prevent the adsorbate on the surface of the substrate 104 from becoming initial growth nuclei that would prevent growth of fine particles and make the size of particles uneven.

In the present embodiment, the substrate 104 and the substrate supporter 102 may be electrically connected with each other or may be not electrically connected with each other. Even when they are not electrically connected with each other, since the substrate supporter 102 exists very close to the substrate 104, ions having been given movement energy toward the substrate supporter 102 also reach the substrate 104. This yields the same effect as when the substrate 104 and the substrate supporter 102 are electrically connected with each other.

Specifically, for example, in a case where the substrate 104 is a substrate obtained by forming on the surface of a non-conductive base material a material capable of being combined with atoms etc. supplied from the supply source 103 to produce a compound, it is possible to obtain fine particles (concavities and convexities) with high periodicity. Further, the high-frequency voltage may be directly applied on the substrate 104 without being applied on the substrate supporter 102.

In the present embodiment, production of fine particles (concavities and convexities) with periodicity requires that (i) the material constituting the supply source 103 (the material supplied from the supply source 103) and the material for the surface of the substrate 104 can be combined with each other to produce a compound, (ii) a high-frequency voltage is applied on the substrate 104, and (iii) the substrate 104 and the supply source 103 are positioned such that atoms etc. from the supply source 103 are not directly incident to the substrate 104.

Therefore, the device in the present embodiment is not necessarily limited to the device in FIG. 1 as long as the device is designed to meet the above conditions (i) to (iii).

Figure 3:
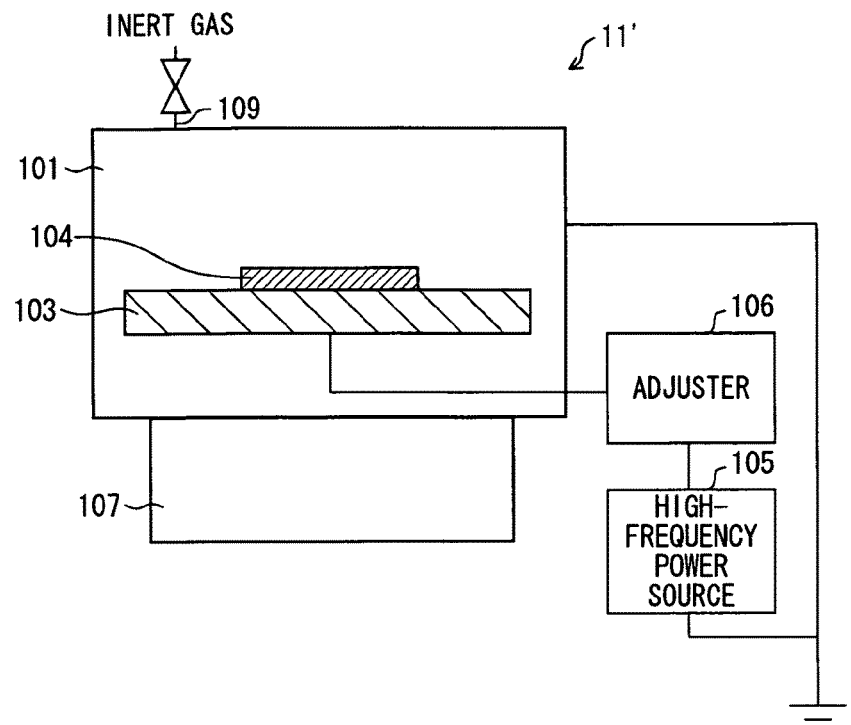
FIG. 3 is a cross sectional drawing schematically illustrating another example of a device of the present embodiment for forming fine particles.

For example, as in a fine particle forming device 11' in FIG. 3, the substrate supporter 102 itself may serve as a supply source. Alternatively, as in a fine particle forming device 11" in FIG. 4, the supply source 103 may be provided separately from the substrate supporter 102.

Figure 4:
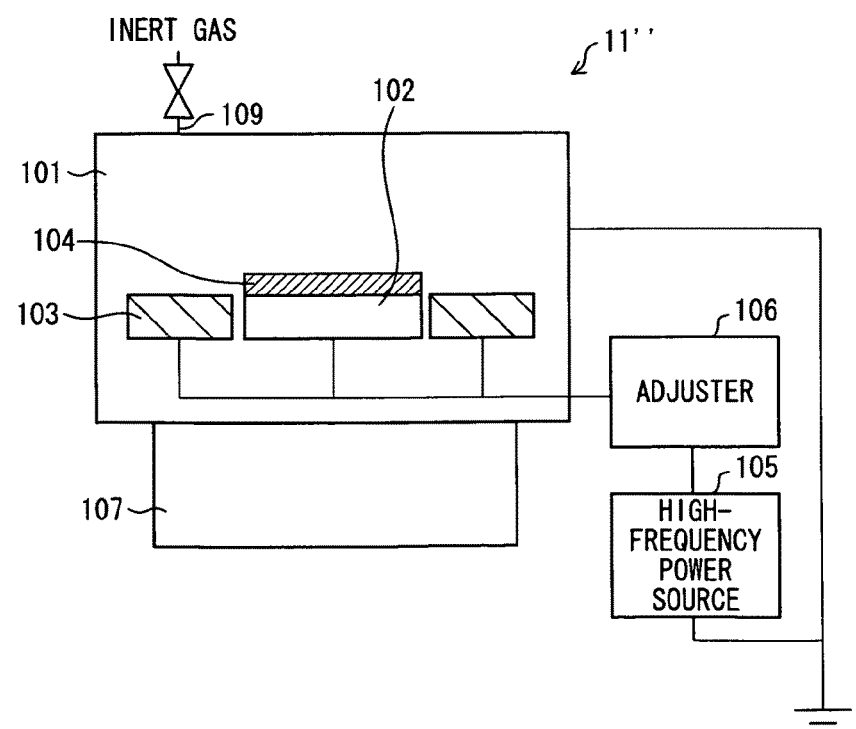
FIG. 4 is a cross sectional drawing schematically illustrating further another example of a device of the present embodiment for forming fine particles.

Alternatively, in the arrangement in FIG. 4, a power source for supplying a voltage (electric power) to the supply source 103 and a power source for supplying a voltage (electric power) to the substrate 104 may be provided separately. In this case, the power source for supplying a voltage (electric power) to the supply source 103 may be a direct current power source instead of a high-frequency power source. Further, in the arrangements in FIGS. 1, 3, and 4, application of a high-frequency voltage on the substrate supporter 102 may be performed by applying the voltage on the substrate 104.

In FIG. 4, instead of the high-frequency power source for supplying a voltage to the supply source 103, there may be provided an ion source or an electron source for radiating ion beam or electron beam to the supply source 103 so as to cause the supply source 103 to supply atoms etc. Alternatively, there may be provided a heating source for heating the supply source 103 so as to evaporate molecules.

Figure 5:
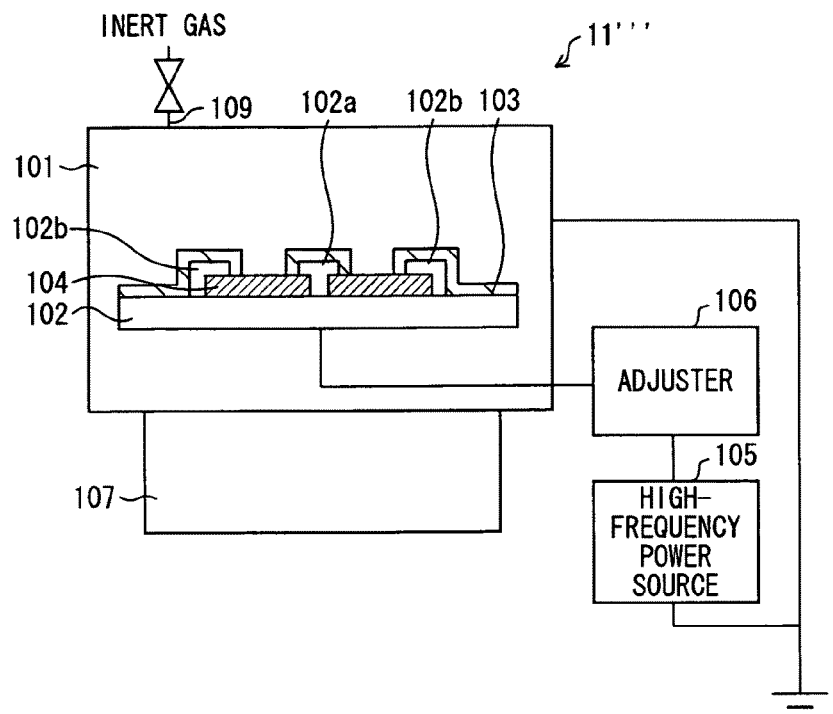
FIG. 5 is a cross sectional drawing schematically illustrating further another example of a device of the present embodiment for forming fine particles.

Alternatively, as in a fine particle forming device 11''' illustrated in a cross sectional drawing of FIG. 5, it may be arranged so that the substrate 104 with a disc-shape is supported by the substrate supporter 102, an internal peripheral supporter 102a (which is fixed to the substrate supporter 102 with magnet or screw-clamp for example), and if necessary, an external peripheral ring 102b (which is fixed to the substrate supporter 102 with magnet or screw-clamp for example). In this case, as illustrated in FIG. 5, the supply source 103 may be formed on exposed surfaces of the substrate supporter 102, the internal peripheral supporter 102a, and the external peripheral ring 102b.

In the arrangement in FIG. 5, the supply source 103 formed on the surfaces of the internal peripheral supporter 102a and the external peripheral ring 102b is positioned ahead of the surface of the substrate 104 (upper direction in FIG. 5). However, in applying a high-frequency voltage to form fine particles, no potential difference that causes sputtering exists between the substrate 104 and the supply source 103, and consequently the material constituting the supply source 103 is not directly incident to the substrate 104.

In this manner, even if the supply source 103 is positioned ahead of the surface of the substrate 104 (upper direction in FIG. 5), by positioning the supply source 103 and the substrate 104 so that no potential difference that causes sputtering exists between the supply source 103 and the substrate 104 in applying a high-frequency voltage to form fine particles, it is possible to meet the condition (iii) that the substrate 104 and the supply source 103 are positioned such that atoms etc. from the supply source 103 are not directly incident to the substrate 104, allowing formation of fine particles (concavities and convexities) with high periodicity. This can be said not only about the substrate 104 with a disc-shape in FIG. 5, but also about substrates with other shapes.

Second Embodiment

Figure 6:
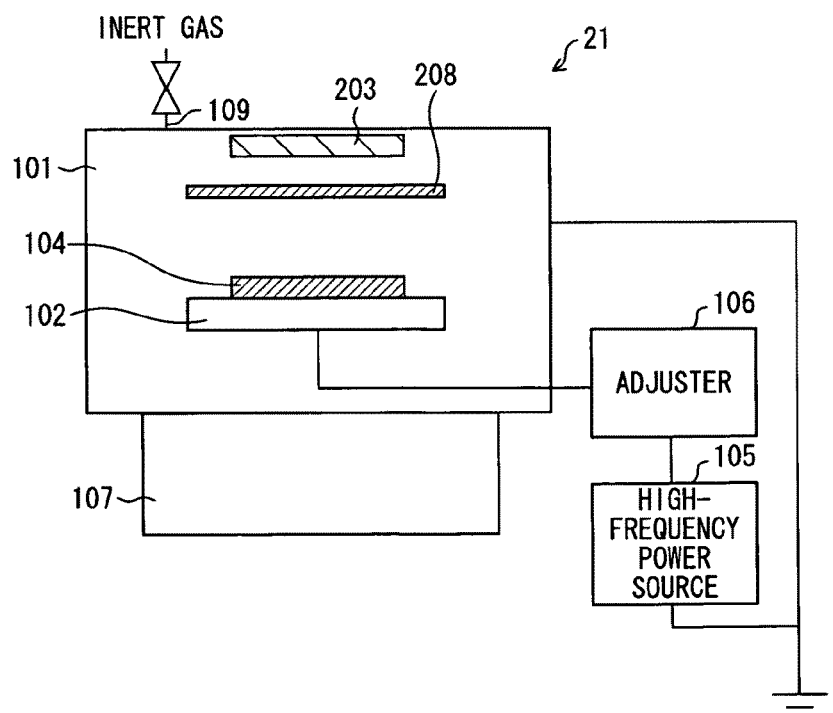
FIG. 6 is a cross sectional drawing schematically illustrating further another example of a device of the present embodiment for forming fine particles.

The following explains another embodiment of the present invention with reference to FIG. 6. The structure that is not explained in the present embodiment is the same as that of First Embodiment unless otherwise stated. For convenience of explanation, members having the same functions as those illustrated in the drawings of First Embodiment are given the same reference numerals and explanations thereof are omitted here.

FIG. 6 is a cross sectional drawing schematically illustrating another embodiment of the fine particle forming device of the present invention.

As illustrated in FIG. 6, a fine particle forming device 21 employed in the present embodiment includes a vacuum chamber 101, a substrate supporter 102 provided inside the vacuum chamber 101, a substrate 104 attached to the substrate supporter 102, a high-frequency power source 105 for applying a high-frequency voltage on the substrate supporter 102, an adjustor 106 for adjusting impedance, and a vacuum pump 107 for vacuuming the vacuum chamber 101, as in the fine particle forming device 11 explained in First Embodiment.

In the present embodiment, a supply source 203 for supplying atoms etc. to the substrate 104 is provided as a target material for sputtering, and is connected with a sputtering power source that is common to the high-frequency power source 105 for applying a high-frequency voltage on the substrate supporter 102 or that is different from the high-frequency power source 105, and atoms etc. are ejected from the supply source 203 by sputtering.

The material constituting the supply source 203 is the same as the material constituting the supply source 103.

Besides, in the present embodiment, a blocking member 208 for preventing the atoms etc. from the supply source 203 from being directly incident to the substrate 104 is provided on a line connecting the supply source 203 and the substrate 104.

As a result of the positioning of the blocking member 208, the atoms etc. ejected from the supply source 203 cannot linearly and directly reach the substrate 104. Instead, atoms etc. that diffuse due to collision with inert gas in film-forming atmosphere or collision with other atoms etc. ejected from the supply source 203 or atoms etc. with low energy that diffuse or diffract due to collision with the blocking member 208 reach the surface of the substrate 104.

As in First Embodiment, ejection and attachment of atoms etc. are repeated on the surface of the substrate 104 in response to a high-frequency voltage applied on the substrate supporter 102, so that atoms etc. supplied from the supply source 203 and atoms etc. ejected from the substrate 104 are combined with each other to produce a compound that grows as particles.

At that time, when the material supplied from the supply source 203 has a higher melting point than that of the material constituting the surface of the substrate 104, particles having grown on the substrate 104 show unfamiliarity with the surface of the substrate 104, forming isolated fine particles with periodicity on the substrate 104 while providing a space between adjacent particles. Thus, fine particles (concavities and convexities) with high periodicity in nano meter order can be formed.

The material constituting the blocking member 208 is not particularly limited as long as it can block atoms etc. supplied from the supply source 203. The material is preferably a material resistant to damage caused by sputtering. Examples of the material include stainless steel, aluminum, aluminum alloy, and glass.

Further, in order that the blocking member 208 is not sputtered and the material constituting the blocking member 208 does not attach to the substrate 104, it is further preferable that the blocking member 208 has a ground voltage or has the same potential as that of the substrate supporter 102.

In the present embodiment, it is desirable that the surface of the substrate supporter 102 is protected by a sputtering-resistant material or, as in First Embodiment, the surface of the substrate supporter 102 is covered by the material constituting the supply source 203. Alternatively, the substrate supporter 102 itself may be made of the same material as that of the supply source 203.

This allows preventing the material constituting the substrate supporter 102 from being supplied as impurities to the substrate 104 in response to application of a high-frequency voltage. It may be arranged so that the substrate supporter 102 is designed as small as possible in order that the material constituting the substrate supporter 102 does not reach the surface of the substrate 104.

In the present embodiment, the blocking member 208 is positioned in such a manner that atoms etc. ejected from the supply source 203 are not directly incident to the surface of the substrate 104 where fine particles are to be formed (upper surface of the substrate 104 in FIG. 6) (positioned in such a manner that the atoms etc. are not directly incident to the surface where fine particles are to be formed).

When the blocking member 208 is positioned in this manner, particles with large energy out of sputtered particles with large energy and large size distribution are prevented from directly reaching the surface of the substrate 104, and only particles with small energy having bypassed the blocking member 208 reach the surface of the substrate 104 to form fine particles (concavities and convexities) with high periodicity.

With the method in which the fine particle forming device 21 of the present embodiment forms fine particles with high periodicity on the surface of the substrate 104, it is possible to separately adjust the magnitude (Vpp and Vdc) of the high-frequency voltage to be applied on the substrate 104 and a sputtering electric power to be supplied to the supply source 203. This allows more freely controlling the size of fine particles, the distance between fine particles, the height of fine particles, and periodicity of fine particles.

In the present embodiment, the sputtering electric power to be supplied to the supply source 203 is set to approximately 0.2 W/cm$^2$ to 8.2 W/cm$^2$ per unit area for example. This indicates that when a sputtering target of the supply source 203 is of 6 inches in diameter, an electric power of approximately 30 W to 1.5 kW is required.

As in First Embodiment, the difference (Vpp) between the maximum value and the minimum value of a high-frequency voltage to be applied on the substrate supporter 102 is set to 200V to 300V for example. As in First Embodiment, a value (Vdc) obtained by subtracting a ground voltage from the average value of the high-frequency voltage is set to −500V to +100V for example. The relation between Vpp and Vdc is set so that Vpp is larger than the absolute value of Vdc.

Consequently, the high-frequency voltage varies positively and negatively with respect to the ground voltage. The magnitude of the high-frequency voltage may be controlled by the sizes of an electric power radiated to the substrate supporter 102 and an electric power reflected by the substrate supporter 102. When the magnitude of the high-frequency voltage is controlled by the radiated electric power and the reflected electric power, the radiated electric power is set so that a radiated electric power per unit area that is obtained by dividing the radiated electric power by the area of the surface of the substrate supporter 102 to which surface the substrate 104 is attached ranges approximately from 0.02 W/cm$^2$ to 1.2 W/cm$^2$, as in First Embodiment. The reflected electric power is preferably as small as possible. For example, the reflected electric power is set to be approximately 10% or less of the radiated electric power.

The fine particle forming device 21 of the present embodiment may be arranged so that instead of the sputtering power source for supplying an electric power to the supply source 203, there is provided an ion source or an electron source for radiating ion beam or electron beam to the supply source 203 so as to cause the supply source 203 to supply atoms etc. Alternatively, there may be provided a heating source for heating the supply source 203 so as to evaporate molecules.

Third Embodiment

Figure 7:
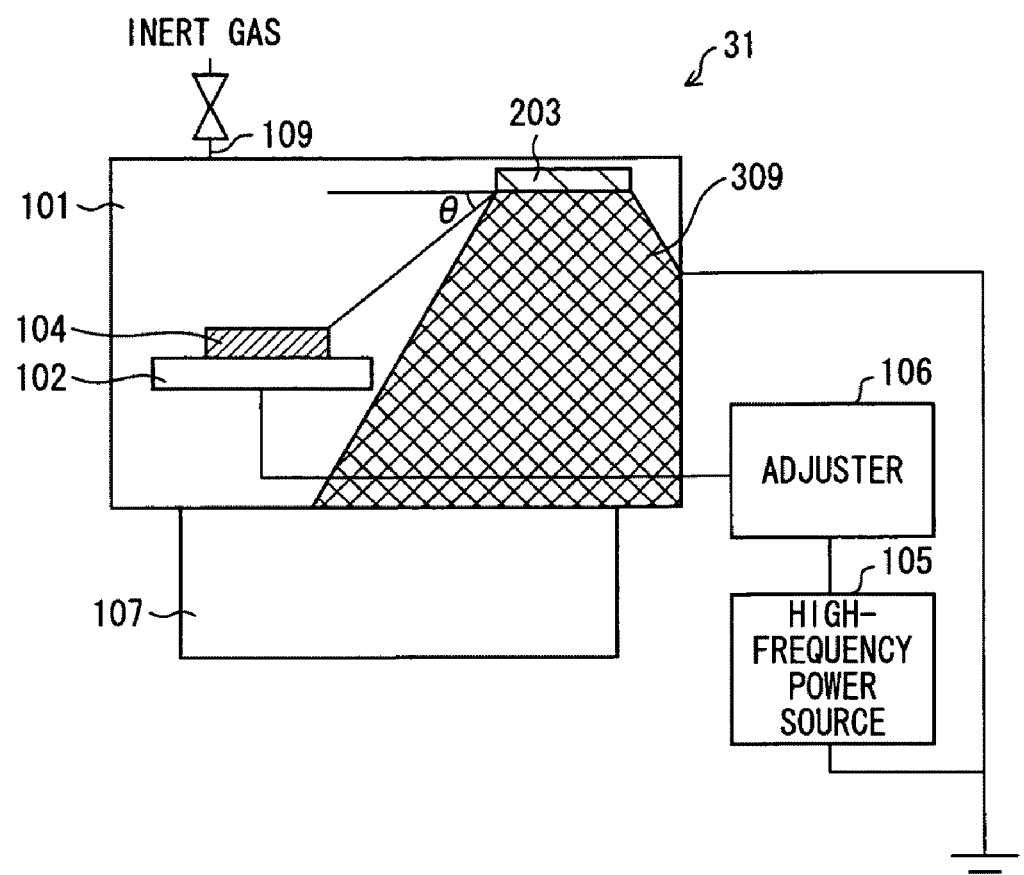
FIG. 7 is a cross sectional drawing schematically illustrating further another example of a device of the present embodiment for forming fine particles.

The following explains further another embodiment of the present invention with reference to FIG. 7. The structure that is not explained in the present embodiment is the same as the structures of First and Second Embodiments unless otherwise stated. For convenience of explanation, members having the same functions as those illustrated in the drawings of First and Second Embodiments are given the same reference numerals and explanations thereof are omitted here.

FIG. 7 is a cross sectional drawing schematically illustrating a fine particle forming device of further another embodiment of the present invention.

As illustrated in FIG. 7, a fine particle forming device 31 employed in the present embodiment includes a vacuum chamber 101, a substrate supporter 102 provided inside the vacuum chamber 101, a substrate 104 attached to the substrate supporter 102, a high-frequency power source 105 for applying a high-frequency voltage on the substrate supporter 102, an adjustor 106 for adjusting impedance, and a vacuum pump 107 for vacuuming the vacuum chamber 101, as in the fine particle forming devices 11 and 21 explained in First and Second Embodiments, respectively.

In the fine particle forming device 31 of the present embodiment, as with the fine particle forming device 21 of Second Embodiment, the supply source 203 for supplying atoms etc. to the substrate 104 is provided as a target material for sputtering, and is connected with a sputtering power source that is common to the high-frequency power source 105 for applying a high-frequency voltage on the substrate supporter 102 or that is different from the high-frequency power source 105, and atoms etc. are ejected from the supply source 203 through sputtering.

As illustrated in FIG. 7, the fine particle forming device 31 of the present embodiment is designed such that the substrate 104 is positioned so as to be outside of a discharged plasma 309 of atoms etc. ejected from the supply source 203.

As a result of positioning the substrate 104 so as to be outside of the discharged plasma 309 of the supplied atoms etc., the atoms etc. ejected from the supply source 203 do not directly and linearly reach the substrate 104. Instead, atoms etc. with low energy that have been diffused or reflected due to collision with inert gas in the film formation atmosphere, collision with other atoms etc. ejected from the supply source 203, or collision with a member in the vacuum chamber such as a chamber wall, reach the surface of the substrate 104.

As with First and Second Embodiments, the ejection of atoms etc. from the surface of the substrate 104 and the attachment of atoms etc. to the surface of the substrate 104 are repeated in response to application of a high-frequency voltage on the substrate supporter 102, so that atoms etc. supplied from the supply source 203 and atoms etc. ejected from the substrate 104 are combined with each other to produce a compound that grows as particles. Here, when the material for the supply source 203 is a material having a higher melting point than that of the material constituting the substrate 104, particles having grown on the substrate 104 show unfamiliarity with the surface of the substrate 104, and consequently isolated fine particles with periodicity are formed on the substrate 104 while providing a space between adjacent fine particles. Thus, fine particles (concavities and convexities) with high periodicity in nano meter order can be formed.

The range of the discharged plasma 309 can be substantially discerned by visually observing the state of discharge in sputtering the supply source 203. However, it is more preferable to confirm the range where a high periodicity can be obtained, by changing the position of the substrate 104 little by little.

Other standard for discerning the range is as follows. Assume that, as illustrated in FIG. 7, an angle θ is formed by (i) a line connecting an end of the supply source 203 which end is closest to the substrate 104 and an end of the substrate 104 which end is closest to the supply source 203 and (ii) a line extending from the surface of the supply source 203 (the surface of the supply source 203 that generates plasma and that is closer to the substrate 104). Here, by setting the angle θ to be substantially 55 degrees or less, it is possible to realize production of fine particles in the present embodiment.

In many cases, a sputtering device is designed such that a target material is surrounded by a member called an earth shield. In the fine particle forming device 31 of the present embodiment, too, when a part of the discharged plasma is blocked by the earth shield, the earth shied serves as a shielding material, so that fine particles (concavities and convexities) with high periodicity can be obtained at an area shielded by the earth shield, as with Second Embodiment.

Therefore, in such a case, even when the angle θ is more than 55 degrees, atoms etc. ejected from the supply source 203 are not directly and linearly incident to the substrate 104. Consequently, it is possible to obtain concavities and convexities with high periodicity.

In the present embodiment, the substrate 104 is positioned so as to be outside of the discharged plasma 309, so that a supply material ejected from the supply source 203 is not directly incident to a surface of the substrate 104 where fine particles are to be formed (upper surface of the substrate 104 in FIG. 7) (positioned so that the supply material is not linearly incident). With such positioning, it is possible to prevent particles with high energy out of sputtering particles with large energy or large size distribution from directly reaching the surface of the substrate 104, so that only particles with low energy reach the surface of the substrate 104. Thus, fine particles (concavities and convexities) with high periodicity can be obtained.

In the present embodiment, an explanation is made as to a case where the substrate 104 is positioned so as to be outside of the discharged plasma 309 in a lateral direction of the supply source 203. Alternatively, the substrate 104 may be positioned so as to be outside of discharged plasma 309 in a direction perpendicular to the surface of the supply source 203 (direction away from the supply source 203).

With the positioning, the supply material (atoms etc.) ejected from the supply source 203 collides with molecules of inert gas such as Ar gas and the supply material (atoms etc.) in sputtering atmosphere and consequently loses more energy as the supply material is farer from the supply source 203. Consequently, when the substrate 104 is positioned to be outside of the discharged plasma 309 in a direction away from the supply source 203, it is possible to obtain the same effect as when the substrate 104 is positioned to be outside of the discharged plasma 309 in a lateral direction of the supply source 203.

When the substrate 104 is positioned to be outside of the discharged plasma 309 in a direction away from the supply source 203, the distance between the supply source 203 and the substrate 104 is not particularly limited. However, it is preferable that the distance is approximately two times or more of mean free path of the supply material (atoms etc.) ejected from the supply source 203.

In the present embodiment, it is unnecessary to position the substrate supporter 102 to be outside of the discharged plasma 309. It is only necessary to position at least the substrate 104 to be outside of the discharged plasma 309.

In the present embodiment, an electric power for sputtering to be supplied to the supply source 203 is set to approximately 0.05 W/cm$^2$ to 5.5 W/cm$^2$ per unit area for example. This means that when a sputtering target of the supply source 203 is of 6 inches in diameter, an electric power of approximately 10 W to 1 kW is required.

As in First and Second Embodiments, the difference (Vpp) between the maximum value and the minimum value of a high-frequency voltage to be applied on the substrate supporter 102 is set to 200V to 2000V for example. As in First and Second Embodiments, a value (Vdc) obtained by subtracting a ground voltage from the average value of the high-frequency voltage is set to −500V to +100V for example. The relation between Vpp and Vdc is set so that Vpp is larger than the absolute value of Vdc. Consequently, the high-frequency voltage varies positively and negatively with respect to the ground voltage.

The magnitude of the high-frequency voltage may be controlled by the sizes of an electric power radiated to the substrate supporter 102 and an electric power reflected by the substrate supporter 102. When the magnitude of the high-frequency voltage is controlled by the radiated electric power and the reflected electric power, the radiated electric power is set so that a radiated electric power per unit area that is obtained by dividing the radiated electric power by the area of the surface of the substrate supporter 102 to which surface the substrate 104 is attached ranges approximately from 0.02 W/cm$^2$ to 1.2 W/cm$^2$, as in First and Second Embodiments. The reflected electric power is preferably as small as possible. For example, the reflected electric power is set to be approximately 10% or less of the radiated electric power.

The fine particle forming device 31 of the present embodiment may be arranged so that instead of the sputtering power source for supplying an electric power to the supply source 203, there is provided an ion source or an electron source for radiating ion beam or electron beam to the supply source 203 so as to cause the supply source 203 to supply atoms etc. Alternatively, there may be provided a heating source for heating the supply source 203 so as to evaporate molecules.

Fourth Embodiment

The following explains further another embodiment of the present invention. The structure that is not explained in the present embodiment is the same as the structures of First to Third Embodiments unless otherwise stated. For convenience of explanation, members having the same functions as those illustrated in the drawings of First to Third Embodiments are given the same reference numerals and explanations thereof are omitted here.

Fourth Embodiment of the present invention discloses a method for arraying fine particles with high periodicity that can be produced through the methods described in First to Third Embodiments.

For example, in a case where the fine particles with high periodicity that are described in First to Third Embodiments are employed as patterned media in a disc storage medium such as a hard disc, it is desirable that the fine particles are arrayed along a track length direction of the storage medium. The present embodiment discloses a method for forming line-shaped steps on the surface of the substrate 104 beforehand and arraying the fine particles along the steps.

The method for forming the steps on the surface of the substrate 104 may be realized by combining (i) a lithography technique capable of making minute lithography, such as photolithography and electron beam lithography with (ii) dry or wet etching through which the steps are formed on the substrate after the lithography. Alternatively, a technique capable of directly processing a substrate in a minute level, such as FIB (Focused Ion Beam), may be used.

The step formed on the substrate 104 should have a height (depth) approximately equal to a height of a fine particle, specifically, approximately 3 nm or more. An angle formed by a side wall of the step and a bottom surface should be approximately 10 degrees or more at the steepest portion of the side wall.

In the case of employing the fine particles in the disc storage medium, when forming repeated steps (repetition of concavities and convexities that are connected in a line) corresponding to a track, it is desirable that the periodicity of the repeated steps is 100 nm or less for example. In this case, the width of the concavity and the width of the convexity may be equal to each other, or one of the widths may be larger than the other.

The substrate 104 on which the steps are formed beforehand is attached to the substrate supporter 102 in the vacuum chamber 101, and fine particles are formed through one of the methods described in First to Third Embodiments on the surface of the substrate 104 on which surface the steps have been formed, thereby obtaining concavities and convexities with high periodicity.

Here, as in First to Third Embodiments, on the surface of the substrate 104, atoms etc. supplied from the supply source 103 (203) and atoms etc. of the surface of the substrate 104 are combined with each other to produce a compound that grows as particles. In the present embodiment, since the steps are formed on the substrate 104, particles do not grow beyond the steps, and consequently fine particles are arrayed along the steps having been formed beforehand.

In the present embodiment, fine particles are arrayed along the steps and therefore the steps are not necessarily formed in a track manner and may have other shape according to the purpose.

Fifth Embodiment

The following explains further another embodiment of the present invention. The structure that is not explained in the present embodiment is the same as the structures of First to Fourth Embodiments unless otherwise stated. For convenience of explanation, members having the same functions as those illustrated in the drawings of First to Fourth Embodiments are given the same reference numerals and explanations thereof are omitted here.

Fifth embodiment describes a method for etching the concavities and convexities to be higher (deeper) with use of fine particles (concavities and convexities) with high periodicity described in First to Fourth Embodiments as masking.

With use of the method for forming fine particles that is described in First to Fourth Embodiments, a convexity out of the concavities and convexities is made of fine particles containing the material constituting the supply source 103 (203). Therefore, by performing etching through a dry process or a wet process with use of an etchant that allows faster etching with respect to the material of the surface of the substrate 104 than with respect to the material of the supply source 103, it is possible to make the height (depth) of the concavities and convexities higher (deeper) while keeping high periodicity.

A particularly preferable example of the etching through a dry process is a RIE (Reactive Ion Etching) where the substrate 104 with the fine particles (concavities and convexities) formed thereon are attached inside a vacuum device, halogen reactive gas such as fluoride and chloride is introduced, and plasma is discharged so as to perform etching.

Examples of the introduced reactive gas include $CHF_3$, $CF_4$, $C_4F_8$, $CHF_3$, $SF_6$, $CCl_4$, and $CH_2Cl_2$. Further, Ar milling for etching with use of introduced Ar gas may be employed.

A preferable example of etching through a wet process is a method in which the substrate 104 with the fine particles (concavities and convexities) formed thereon is immersed in an acidic or alkaline solution so as to perform etching. Specific examples of the solution include a solution containing sulfuric acid and hydrochloric acid, a potassium hydroxide (KOH) aqueous solution, an ethylenediamine pyrocatechol (EDP) aqueous solution, and a tetramethyl ammonium hydroxide (TMAH) aqueous solution.

With the etching through a dry process or a wet process, the material constituting the concavities of the concavities and convexities (material for the surface of the substrate 104) is etched faster than the material constituting the convexities (compound between the material for the surface of the substrate 104 and the material constituting the supply source 103 (203)), so that it is possible to make the concavities and convexities higher (deeper).

In the case of the wet etching, there is a possibility that the convexity is removed due to side etching in which an etchant that has etched the concavity also etches a side wall between the convexity and the concavity. In order to prevent this, it is preferable to perform anisotropic etching with use of a plane direction of the substrate 104. Specifically, an Si substrate with a plane direction (110) for example is prepared as the substrate 104, and anisotropic etching is performed with respect to the substrate 104 with use of a potassium hydroxide (KOH) aqueous solution, an ethylenediamine pyrocatechol (EDP) aqueous solution, or a tetramethyl ammonium hydroxide (TMAH) aqueous solution. Consequently, the substrate 104 is etched preferentially in a depth direction, reducing the side etching.

Sixth Embodiment

Figure 8:
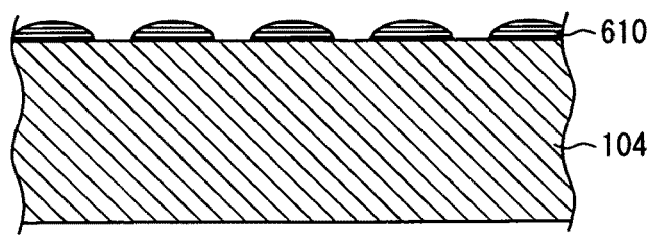
FIGS. 8(a) to 8(c) are cross sectional process drawings illustrating an example of a method of the present embodiment for forming a magnetic storage medium.
Figure 8:
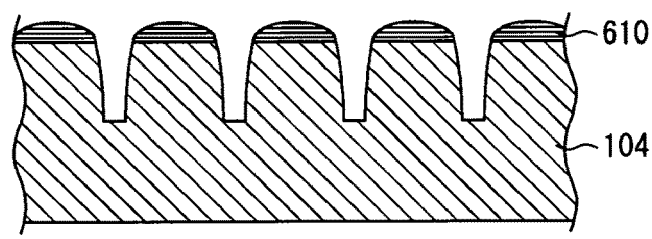
Figure 8:
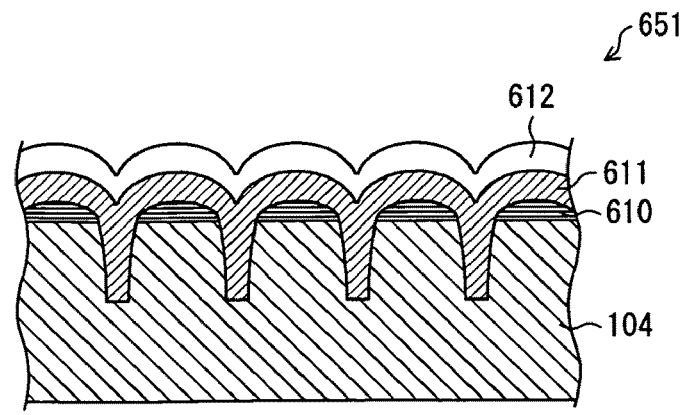

The following explains further another embodiment of the present invention with reference to FIGS. 8(*a*) to 13(*g*).

The structure that is not explained in the present embodiment is the same as the structures of First to Fifth Embodiments unless otherwise stated. For convenience of explanation, members having the same functions as those illustrated in the drawings of First to Fifth Embodiments are given the same reference numerals and explanations thereof are omitted here.

Sixth Embodiment is an embodiment in which the fine particles (concavities and convexities) with high periodicity that are produced through the methods in First to Fifth Embodiments are employed in a magnetic storage medium.

Employment of the fine particles (concavities and convexities) with high periodicity that are produced through the methods in First to Fifth Embodiments in the magnetic storage medium may be performed through such a method as (I) a method in which a storage film (magnetic layer) for storing magnetic information is formed on fine particles (concavities and convexities) with high periodicity (the concavities and convexities are used as a base for the storage layer), (II) a method in which a storage film is formed on the substrate 104 before forming fine particles, fine particles (concavities and convexities) with high periodicity are formed on the substrate 104 through one of the methods in First to Third Embodiments, and then the substrate 104 is etched while masked by fine particles constituting the convexities so that a storage film other than a storage film under the convexities is removed (patterned media), and (III) a method in which the concavities and convexities are transferred to other substrate while using as a master the substrate 104 with fine particles formed thereon, and the transferred shape is used as a base as in (I) or the transferred shape is used as an etching mask as in (II).

<Method (I)>

Figure 9:
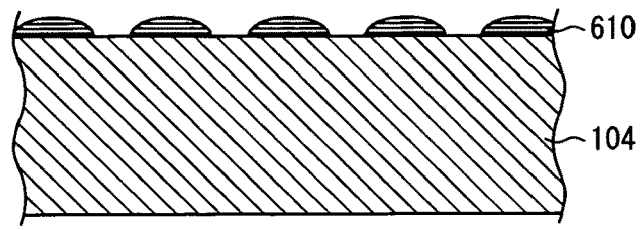
FIGS. 9(a) to 9(d) are cross sectional process drawings illustrating another example of a method of the present embodiment for forming a magnetic storage medium.
Figure 9:
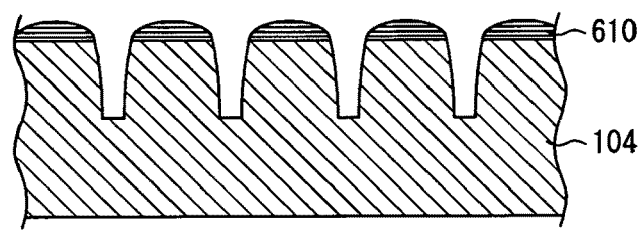
Figure 9:
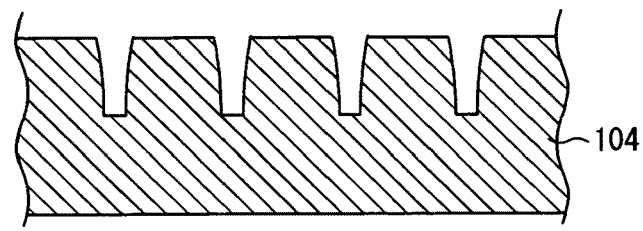
Figure 9:
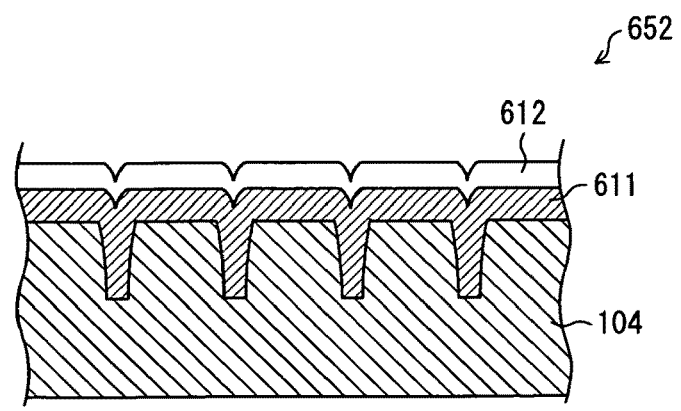

Among the methods (I)-(III), the following explains the method (I) in which the concavities and convexities are used as a base for a storage layer, with reference to FIGS. 8(*a*) to 8(*c*) and FIGS. 9(*a*) to 9(*d*).

The method explained here is preferable in attaining high-density magnetic recording as with patterned media, in a case where a storage layer for storing magnetic information is difficult to etch since the storage layer is likely to be oxidized or for other reasons.

FIGS. 8(*a*) to 8(*c*) are cross sectional drawings illustrating an example of production steps.

Initially, in the step of FIG. 8(*a*), fine particles (concavities and convexities) with high periodicity are formed on the substrate 104. Specifically, fine particles 610 are formed on the substrate 104 through the methods for forming fine particles in First to Third Embodiments.

Next, in the step of FIG. 8(*b*), the substrate 104 is etched while masked by the fine particles 610 constituting the convexities, through the method described in Fifth Embodiment.

Next, in the step of FIG. 8(*c*), a storage layer (magnetic layer) 611 for storing magnetic information and a protection layer 612 for protecting the storage layer 611 are formed, and thus a magnetic storage medium 651 is completed.

The material for the storage layer 611 is preferably a magnetic material having perpendicular magnetic anisotropy capable of storing magnetic information in a direction perpendicular to the surface of a substrate. Specific examples of the material include: a material consisting of a base such as Co, Fe, and CoFe alloy and Cr, Ta, Ni, Pt, Pd, B, Zr, Nb and/or Rh added to the base; and a rare earth-transition metal magnetic material such as TbFe, TbFeCo, GdFe, GdFeCo, DyFe, DyFeCo, GdTbFeCo, TbDyFeCo, and/or SmCo, consisting of a base such as Co, Fe, and CoFe alloy and a rare earth added to the base. These magnetic materials may be laminated.

The thickness of the storage layer 611 is set to approximately 5 nm to 50 nm for example. When the storage layer 611 is formed on fine particles (concavities and convexities) with high periodicity, there is yielded the effect of pinning a magnetic domain wall of a magnetic domain (corresponding to magnetic information) stored in the storage layer 611. Consequently, the magnetic domain is compartmentalized in accordance with the concavities and convexities, so that magnetic information can be stored with higher recording density than when the concavities and convexities do not exist. Particularly in the present embodiment, since the concavities and convexities have high periodicity, the magnetic domains are formed to have the same sizes. This allows providing a magnetic storage medium with little noise in reproducing magnetic information and with little reading error.

The storage layer 611 may be formed on the substrate 104 through sputtering for example.

The protective layer 612 is not particularly limited as long as it is made of a material capable of protecting the storage layer 611 from physical contact with the outside such as a magnetic head. Preferable examples of the protective layer 612 include a DLC (diamond-like carbon) film and a nitride film such as an AlN (aluminum nitride) film, a SiN (silicon nitride) film, and a CN (carbon nitride) film.

The thickness of the protective layer 612 is set to 2 nm to 10 nm for example. A lubrication layer for reducing friction with a magnetic head and preventing head crush may be provided on the protective layer 612. As with the storage layer 611, the protective layer 612 may be formed through sputtering.

In the present embodiment, before forming the storage layer 611, there may be formed a soft magnetic backing layer for assisting, when recording information on the storage layer 611 by application of an external magnetic field, the recording by increasing a magnetic field in a direction perpendicular to a film surface. Further, the substrate 104 used in the present embodiment may be a substrate on which steps are formed beforehand.

FIGS. 8(a) to 8(c) illustrate a case where the material for the surface of the substrate 104 is the same as a base material for the substrate 104. Alternatively, as in the methods in First to Third Embodiments, a material that can be combined with a material for the supply source 103 (203) to produce a compound may be formed on the surface of the substrate 104. Here, in the etching of FIG. 8(b), only a material formed on the surface may be etched, or both of the material formed on the surface and the base material of the substrate 104 may be etched.

The etching of FIG. 8(b) is performed in order to yield the effect of pinning a magnetic domain wall of the storage layer 611. Therefore, if the pinning effect is sufficiently obtained only by forming fine particles (concavities and convexities) in FIG. 8(a), the etching of FIG. 8(b) is unnecessary.

FIGS. 9(a) to 9(d) are cross sectional drawings illustrating another example of steps of producing a magnetic storage medium of the present embodiment (method (I)).

Out of the production steps illustrated in FIGS. 9(a) to 9(d), the steps of FIGS. 9(a) and 9(b) are the same as the steps of FIGS. 8(a) and 8(b). The production steps in FIG. 9 are different from the production steps in FIG. 8 in that the step of FIG. 9(c) is a step of removing the fine particles 610 that are used as masking in etching the substrate 104 in FIG. 9(b).

Specifically, in the step of FIG. 9(c), the substrate 104 is immersed in a solution containing hydrogen peroxide in order to remove the fine particles 610 and expose a flat section of the substrate 104 to its surface, and in the step of FIG. 9(d), the storage layer 611 and the protective layer 612 are formed as in the step of FIG. 8(c). Thus, the magnetic storage medium 652 is completed.

The production method illustrated in FIGS. 9(a) to 9(d) provides a magnetic storage medium with a flatter surface than the magnetic storage medium provided by the production method illustrated in FIGS. 8(a) to 8(c). Therefore, the production method illustrated in FIGS. 9(a) to 9(d) can provide a magnetic storage medium that is preferable when using a flying magnetic head.

The surface of the finally formed protective layer 612 of the magnetic storage medium produced through the production steps of FIGS. 8(a) to 8(c) or the production steps of FIGS. 9(a) to 9(d) may be subjected to polishing such as CMP (Chemical Mechanical Polishing) so as to smooth the surface of the magnetic storage medium.

<Method (II)>

Next, with reference to FIGS. 10(a) to 10(c) and FIGS. 11(a) to 11(d), the following explains the method (II) in which a storage layer is formed on the substrate 104 beforehand and fine particles (concavities and convexities) are formed on the storage layer and then the substrate 104 is subjected to etching, so that a storage film other than the storage film under the convexities is removed (patterned media).

FIGS. 10(a) to 10(c) are cross sectional drawings illustrating an example of steps of producing a magnetic storage medium in the method (II).

Initially, in the step of FIG. 10(a), on the substrate 104 is formed the storage layer 611 and a compound production layer 613 made of a material that can be combined with the material of the supply source 103 to produce a compound, and the fine particles 610 are formed on the compound production layer 613 through one of the methods for producing fine particles that are described in First to Third Embodiments.

The compound production layer 613 is a thin film layer whose material is selected from the materials used for the surface of the substrate 104. For example, the compound production layer 613 is made of a semiconductor material mainly containing an element such as Si and Ge or a material mainly containing Al, with the thickness of approximately 5 nm to 100 nm.

The protective layer 612 may be formed between the storage layer 611 and the compound production layer 613. Further, in the production steps of FIGS. 10(a) to 10(c), the material for the surface of the substrate 104 is not necessarily a material that can be combined with the material for the supply source 103 (203) to produce a compound. For example, the material for the surface of the substrate 104 may be an insulating material such as $SiO_2$, $Al_2O_3$, and glass, a semiconductor material such as GaAs and GaN, various metal materials, or a resin substrate.

Next, in the step of FIG. 10(b), the storage layer 611 is etched while masked by the fine particles 610 constituting the convexities. The storage layer 611 may be etched through the method in Fifth Embodiment or RIE (Reactive Ion Etching) in methane gas atmosphere or methanol gas atmosphere.

Next, in the step of FIG. 10(c), the protective layer 612 is formed, and if necessary, a lubrication layer (not shown) for reducing friction with a magnetic head and preventing head crush is formed. Thus, the magnetic storage medium 653 is completed.

In the step of FIG. 10(a), before forming the storage layer 611, there may be formed a soft magnetic backing layer for assisting, when recording information on the storage layer 611 by application of an external magnetic field, the recording by increasing a magnetic field in a direction perpendicular to a film surface.

As in Fourth Embodiment, the substrate 104 of the present embodiment may be provided with steps beforehand. Alternatively, instead of providing the substrate 104 with the steps, the compound production layer 613 may be provided with steps.

FIGS. 11(a) to 11(d) are cross sectional drawings illustrating another example of the method (II) of the present embodiment.

Figure 10:
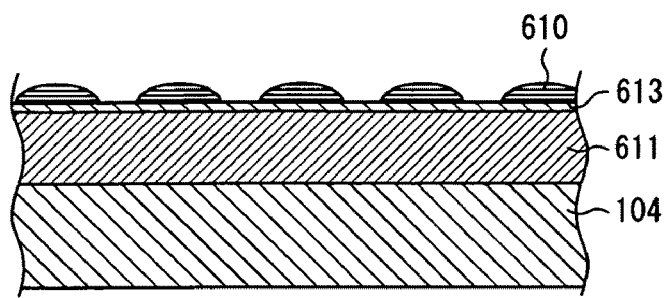
FIGS. 10(a) to 10(c) are cross sectional process drawings illustrating further another example of a method of the present embodiment for forming a magnetic storage medium.
Figure 10:
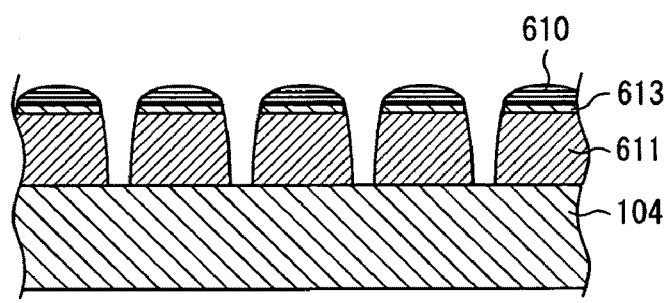
Figure 10:
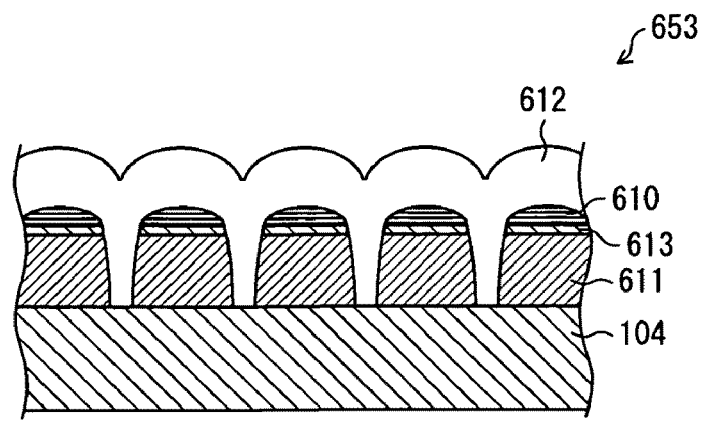
Figure 11:
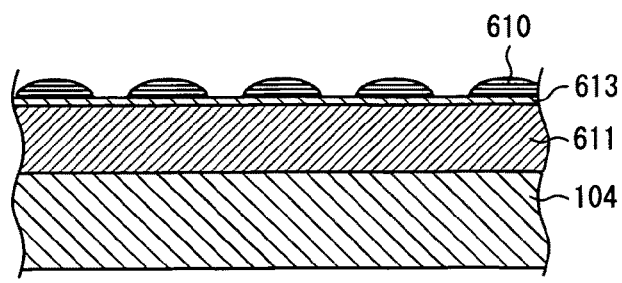
FIGS. 11(a) to 11(d) are cross sectional process drawings illustrating another example of a method of the present embodiment for forming a magnetic storage medium.
Figure 11:
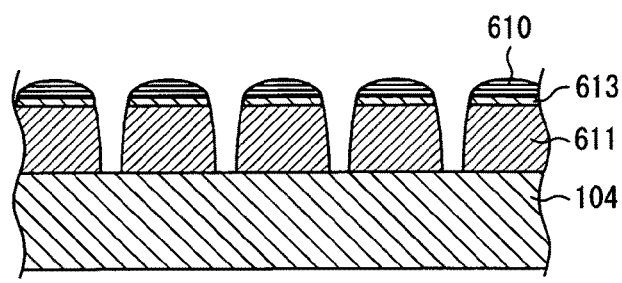
Figure 11:
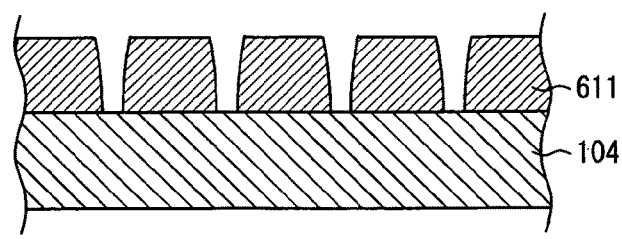
Figure 11:
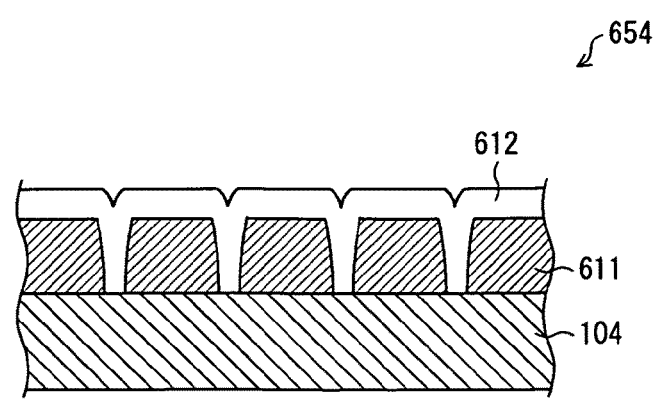

Out of the production steps illustrated in FIGS. 11(a) to 11(d), the steps of FIGS. 11(a) and 11(b) are the same as the steps of FIGS. 10(a) and 10(b). The production steps in FIG. 11 are different from the production steps in FIG. 10 in that the step of FIG. 11(c) is a step of removing the fine particles 610 that are used as masking in etching the substrate 104 in FIG. 11(b).

Specifically, in the step of FIG. 11(c), the compound production layer 613 and the fine particles 610 formed thereon are removed with use of a chemical solution capable of removing the compound production layer 613. Alternatively, the substrate 104 is immersed in a chemical solution containing hydrogen peroxide to remove the fine particles 610.

Thus, a flat portion is exposed at the top of the storage layer 611, and then in the step of FIG. 11(d), the protective layer 612 is formed as in the step of FIG. 10(c). Thus, a magnetic storage medium 654 is completed.

In the steps of FIGS. 11(a) to 11(d), between the storage layer 611 and the compound production layer 613, there may be formed a detachment layer made of a material different from materials for the storage layer 611 and the compound production layer 613, and in the step of FIG. 11(c), the fine particles 610 and the detachment layer may be removed with use of a chemical solution capable of dissolving the detachment layer so as to expose a flat portion on the storage layer 611.

Further, in the step of FIG. 11 (c) for removing the fine particles 610, the protective layer 612 may be formed between the storage layer 611 and the compound production layer 613 in order to protect the storage layer 611 from damages.

The production method illustrated in FIGS. 11(a) to 11(d) provides a magnetic storage medium with a flatter surface than the magnetic storage medium provided by the production method illustrated in FIGS. 10(a) to 10(c). Therefore, the production method illustrated in FIGS. 11(a) to 11(d) can provide a magnetic storage medium that is preferable when using a flying magnetic head.

The surface of the finally formed protective layer 612 of the magnetic storage medium produced through the production steps of FIGS. 10(a) to 10(c) or the production steps of FIGS. 11(a) to 11(d) may be subjected to polishing such as CMP (Chemical Mechanical Polishing) so as to smooth the surface of the magnetic storage medium.

<Method (III)>

Next, with reference to FIGS. 12(a) to 12(g) and 13(a) to 13(g), the following explains the method (III) in which the shape of fine particles is transferred to other substrate using as a master the substrate 104 on which the fine particles are formed.

FIGS. 12(a) to 12(g) are cross sectional drawings illustrating an example of the steps for producing a magnetic storage medium through the method (III). This example refers to a case where the shape of fine particles (concavities and convexities) is transferred to other substrate and the transferred shape is used as a base for a storage layer.

Figure 12:
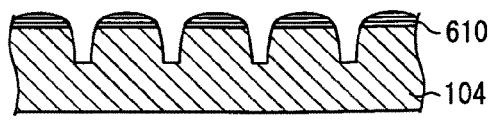
FIGS. 12(a) to 12(g) are cross sectional process drawings illustrating another example of a method of the present embodiment for forming a magnetic storage medium.
Figure 12:
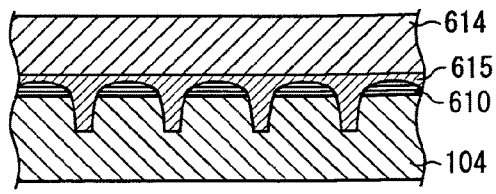
Figure 12:
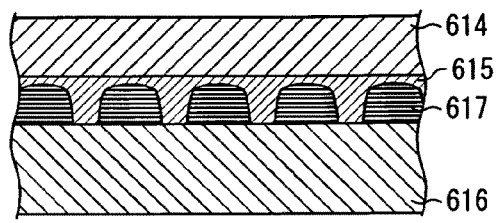
Figure 12:
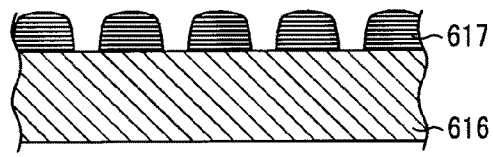
Figure 12:
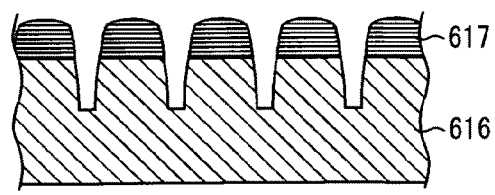
Figure 12:
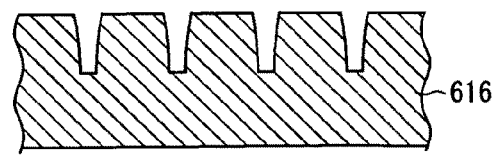
Figure 12:
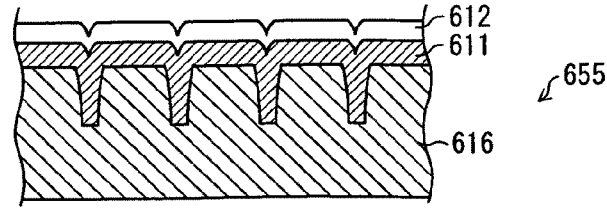

Initially, in the step of FIG. 12(a), as in the steps of FIGS. 8(a) and 8(b), the fine particles 610 with high periodicity are formed on the substrate 104, and the substrate 104 is etched while masked by the fine particles 610 constituting the convexities through the method described in Fifth Embodiment.

Next, in the step of FIG. 12(b), there is prepared a substrate (first transfer substrate (first transfer material) 614) other than the substrate 104, having thereon a first resin layer 615 to which the shape of the fine particles 610 is to be transferred, and the first transfer substrate 614 is pressed to a surface of the substrate 104 where the fine particles 610 are formed, so that the shape of the fine particles 610 are transferred to the first transfer substrate 614.

The first resin layer 615 used here may be resin used in a transfer technique known as a nano-inprinting technique. Examples of the first resin layer 615 include acrylic resin such as PMMA (polymethyl methacrylate), resin on which an application solution such as SOG (Spin-On-Glass) and HSQ (Hydrogen Silsequioxane) is applied, and UV curing resin.

Pressing in the transfer is performed with a pressure of approximately 0.1 MPa to 10 MPa, and if necessary, the first resin layer 615 is heated or subjected to irradiation of UV ray in order to make the first resin layer 615 softer or harder. A lubricant may be applied on the first resin layer 615 in order to facilitate detachment after the transfer (detachment of the substrate 104 and the fine particles 610 from the first resin layer 615).

The first transfer substrate 614 is not particularly limited as long as it is resistive to the pressure in the transfer. Examples of the first transfer substrate 614 include an $SiO_2$ substrate, a glass substrate, an Si substrate, and a Si substrate with a thermally oxidized surface.

The first resin layer 615 to which the shape of the fine particles 610 has been transferred is detached in combination with the first transfer substrate 614. Then, as illustrated in FIG. 12(c), the shape of the fine particles 610 transferred to the first resin layer 615 is pressed and transferred to a second resin layer 617 formed on another transfer substrate (second transfer substrate (second transfer material) 616).

The materials for the second transfer substrate 616 and the second resin layer 617 may be those for the first transfer substrate 614 and the first resin layer 615, respectively. However, the material for the second resin layer 617 should be selected so that the material for the second resin layer 617 is in a softer state than the first resin layer 615 when the first resin layer 615 is pressed to the second resin layer 617.

As with the resin layer 615, a lubricant for facilitating detachment of the second resin layer 617 may be applied on the second resin layer 617.

Next, in the step of FIG. 12(d), the second resin layer 617 to which the shape of the first resin layer 615 has been transferred is detached in combination with the second transfer substrate 616, and is subjected to a slight ashing treatment in order to remove residuals that have attached in the transfer.

Next, in the step of FIG. 12(e), the second transfer substrate 616 is etched while masked by the second resin layer 617, and in the step of FIG. 12(f), the second transfer substrate 616 is immersed in a detachment solution or subjected to the ashing treatment to remove the second resin layer 617. Then, in the step of FIG. 12(g), the storage layer 611 and the protective layer 612 are formed. Thus, a magnetic storage medium 655 is completed.

In the step of FIG. 12(g), before forming the storage layer 611, there may be formed a soft magnetic backing layer for assisting, when recording information on the storage layer 611 by application of an external magnetic field, the recording by increasing a magnetic field in a direction perpendicular to a film surface.

Further, in the steps of FIGS. 12(a) to 12(g), an explanation was made as to a case where the material for the surface of the substrate 104 is the same as the material for the base of the substrate 104. Alternatively, as in the methods described in First to Third Embodiments, there may be used a substrate 104 on the surface of which a material that can be combined with the material for the supply source 103 (203) to produce a compound is formed.

Here, the etching of the substrate 104 in FIG. 12(a) may be etching of only the material formed on the surface of the substrate 104, or may be etching of both the material formed on the surface and the base of the substrate 104. Further, the substrate 104 in the present embodiment may be provided with steps beforehand, as in Fourth Embodiment.

The etching of the substrate 104 in the step of FIG. 12(a) is performed in order to cause the concavities and convexities finally formed on the second transfer substrate 616 to be higher (deeper) and to give a pinning effect of a magnetic domain wall to the recording layer 611. If the pinning effect is sufficiently obtained only by formation of fine particles (concavities and convexities), it is not necessarily required to etch the substrate 104 in the step of FIG. 12(a).

In the production steps of FIGS. 12(a) to 12(g), an explanation was made as to a case where the shape of the fine particles 610 is transferred twice. Alternatively, the shape of the fine particles 610 may be transferred only once, i.e., the shape of the fine particles 610 may be transferred only to the first transfer substrate 614 (first resin layer 615). In this case, the first transfer substrate 614 is etched while masked by the first resin layer 615 to which the shape of the fine particles 610 has been transferred, and the first resin layer 615 is removed, and then the storage layer 611 and the protective layer 612 are formed on the first transfer substrate 614, so that a magnetic storage medium is completed. Consequently, in this case, a pattern of finally formed concavities and convexities is a reverse of a pattern of concavities and convexities formed on the substrate 104.

FIGS. 13(a) to 13(g) are cross sectional drawings illustrating another example of the method (III) of the present embodiment for producing a magnetic storage medium.

Figure 13:
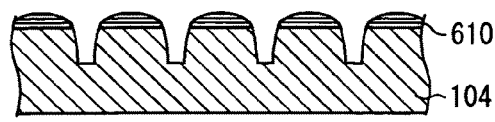
FIGS. 13(a) to 13(g) are cross sectional process drawings illustrating another example of a method of the present embodiment for forming a magnetic storage medium.
Figure 13:
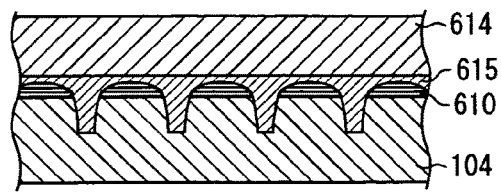
Figure 13:
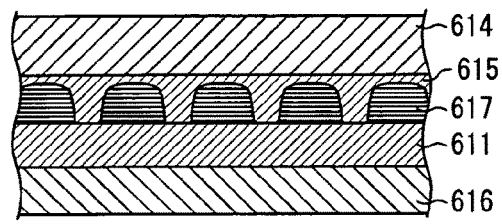
Figure 13:
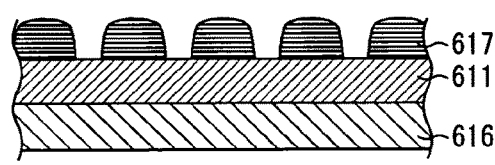
Figure 13:
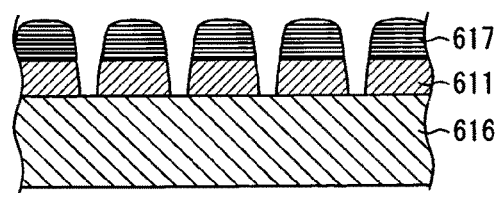
Figure 13:
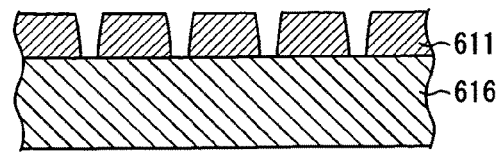
Figure 13:
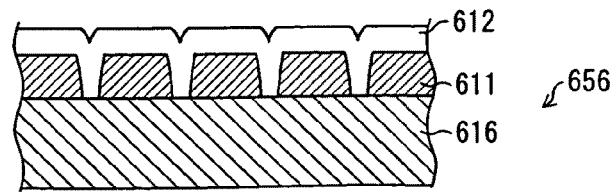

Out of the production steps of FIGS. 13(a) to 13(g), the steps of FIGS. 13(a) and 13(b) are the same as the steps of FIGS. 12(a) and 12(b) and therefore explanations thereof are omitted here.

In the step of FIG. 13(c), as in the step of FIG. 12(c), the shape of the fine particles 610 transferred to the first resin layer 615 is pressed and transferred to the second resin layer 617 formed on another transfer substrate (second transfer substrate 616). Here, the steps of FIGS. 13(a) to 13(g) are different from the steps of FIGS. 12(a) to 12(g) in that the storage layer 611 is formed on the second transfer substrate 616 beforehand.

Next, in the step of FIG. 13(d), as in the step of FIG. 12(d), the second resin layer 617 to which the shape of the first resin layer 615 has been transferred is detached in combination with the storage layer 611 and the second transfer substrate 616, and then the second resin layer 617 is subjected to a slight ashing treatment in order to remove residuals attached to the second resin layer 617 in the transfer.

Next, in the step of FIG. 13(e), the storage layer 611 is etched while masked by the second resin layer 617. The etching may be performed through the method described in Fifth Embodiment or through RIE (Reactive Ion Etching) in methane gas atmosphere or methanol gas atmosphere, as in the step of FIG. 10(b).

Further, in the step of FIG. 13(f), as in the step of FIG. 12(f), the second transfer substrate 616 is immersed in a detachment solution or subjected to an ashing treatment in order to remove the second resin layer 617. In the step of FIG. 13(g), the protective layer 612 is formed and a magnetic storage medium 656 is completed.

In the step of FIG. 13(c), before forming the storage layer 611, there may be formed a soft magnetic backing layer for assisting, when recording information on the storage layer 611 by application of an external magnetic field, the recording by increasing a magnetic field in a direction perpendicular to a film surface. Further, if necessary, the protective layer 612 may be provided between the storage layer 611 and the second resin layer 617.

Further, in the steps of FIGS. 13(a) to 13(g), an explanation was made as to a case where the material for the surface of the substrate 104 is the same as the material for the base of the substrate 104. Alternatively, as in the methods described in First to Third Embodiments, there may be used a substrate 104 on the surface of which a material that can be combined with the material for the supply source 103 (203) to produce a compound is formed. Here, the etching in FIG. 13(a) may be etching of only the material formed on the surface of the substrate 104, or may be etching of both of the material formed on the surface and the base of the substrate 104. Further, the substrate 104 may be provided with steps beforehand, as in Fourth Embodiment.

The etching of the substrate 104 in the step of FIG. 13(a) is performed for the purpose of causing the second resin layer 617 serving as masking in etching of the storage layer 611 in the step of FIG. 13(e) to be so thick as to allow the whole thickness of the storage layer 611 to be etched. If the second resin layer 617 is sufficiently resistive to an etchant that etches the storage layer 611, it is not necessarily required to perform etching in FIG. 13(a).

In the production steps of FIGS. 13(a) to 13(g), an explanation was made as to a case where the shape of the fine particles 610 is transferred twice. Alternatively, the shape of the fine particles 610 may be transferred only once, i.e., the shape of the fine particles 610 may be transferred only to the first transfer substrate 614 (first resin layer 615).

In this case, the storage layer 611 is formed on the first transfer substrate 614 beforehand, the storage layer 611 is etched while masked by the first resin layer 615 to which the shape of the fine particles 610 has been transferred, and the first resin layer 615 is removed, and then the protective layer 612 is formed on the first transfer substrate 614, so that a magnetic storage medium is completed. Consequently, in this case, a pattern of finally formed concavities and convexities is a reverse of a pattern of concavities and convexities formed on the substrate 104.

In the magnetic storage medium produced through the production steps of FIGS. 12(a) to 12(g) or FIGS. 13(a) to 13(g), the surface of the protective layer 612 that is finally formed may be polished through a polishing method such as CMP (Chemical Mechanical Polishing) in order to smooth the surface of the magnetic storage medium.

Each of the magnetic storage media 651 to 656 in the present embodiment is not necessarily a magnetic storage medium that stores magnetic information with use of only a magnetic field, and may store information by heat-assisted magnetic recording (laser-assisted magnetic recording) that heats a magnetic storage medium substantially simultaneously with application of a magnetic field.

Further, the methods for forming fine particles (concavities and convexities) with high periodicity that are described in First to Third Embodiments may be used singularly or two or more of them may be used in combination.

Further, the purpose of the fine particles (concavities and convexities) formed through the methods for forming fine particles (concavities and convexities) with high periodicity that are described in First to Fifth Embodiments is not necessarily limited to the magnetic storage medium explained in Sixth Embodiment, and the fine particles may be used in other industrial fields.

For example, in a case of a sensor device that analyzes a sample from the outside with use of a reaction film on the surface of a substrate that adsorbs the sample or makes the sample react chemically, when the fine particles (concavities and convexities) described in the present specification are used, it is possible to enlarge the surface area of the substrate. In particular, being highly periodic increases a utility ratio of the area, and reduces variations in detection sensibility.

Alternatively, the fine particles (concavities and convexities) of the present specification may be used as growth points for nanowires such as carbon nanowires. Since the present invention allows producing concavities and convexities with small particle size distribution and high periodicity through a very simple process, the present invention is applicable to fields that require nanowires with a fixed distance between the wires and with small particle size distribution.

As described above, the method of the present invention for forming fine particles includes the step of forming fine particles on a substrate by supplying, in a presence of inert gas, to the substrate, atoms or molecules of a supply material that is capable of being combined with a material constituting a surface of the substrate to produce a compound, the atoms or the molecules of the supply material being supplied from a supply source, the supply source being positioned in such a manner that the supply material from the supply source is not directly incident to the surface of the substrate where the fine particles are to be formed, a high-frequency voltage varying positively and negatively with respect to a ground voltage, ranging from 100 kHz to 100 MHz, being applied to at least one of the substrate and a substrate supporter for supporting the substrate.

With the method, it is possible to form fine particles that allow formation of highly uniformed magnetic fine particles with a periodic pattern through a simple process at a time.

It is preferable to arrange the method of the present invention so that the material constituting the surface of the substrate is a material mainly containing an element selected from Si, Ge, and Al or a material mainly containing an alloy of the material, and the supply material is (i) a material mainly containing an element selected from V, Cr, Zr, Nb, Mo, Hf, Ta, and W, (ii) a material mainly containing an alloy of the material (i), or (iii) a material mainly containing an alloy of the materials (i) and (ii) and the material constituting the surface of the substrate.

With the method, a compound is likely to be produced on the substrate. Further, fine particles formed on the substrate grow to have a size suitable for etching masks while keeping a space between adjacent fine particles.

Therefore, with the method, it is possible to form isolated fine particles suitable for etching masks.

It is preferable to arrange the method of the present invention so that the supply material is supplied to the substrate through sputtering.

In the method, plasma is generated when applying a high-frequency voltage. Therefore, when the supply material is supplied through sputtering, it is possible to prompt growth of fine particles on the surface of the substrate, thereby forming fine particles in a shorter time.

Further, since sputtering is widely used in a conventional method for producing a magnetic storage medium, it is possible to greatly simplify steps for producing a high-density magnetic storage medium such as patterned media.

It is preferable to arrange the method of the present invention so that the substrate is positioned outside a plasma emission area that accompanies sputtering to the supply source.

With the method, it is possible to easily provide positioning where the supply material ejected from the supply source is not directly incident to the surface of the substrate. Consequently, it is possible to more easily form fine particles that allow formation of highly uniformed magnetic fine particles with a periodic pattern through a simple process at a time.

It is preferable to arrange the method of the present invention so that the supply source is positioned on the substrate supporter for supporting the substrate or at least a part of the substrate supporter is made of the supply source.

With the method, it is possible to easily provide positioning where the supply material ejected from the supply source is not directly incident to the surface of the substrate. Consequently, it is possible to more easily form fine particles that allow formation of highly uniformed magnetic fine particles with a periodic pattern through a simple process at a time.

It is preferable to arrange the method of the present invention so that a blocking member for preventing the supply material from being directly incident to the surface of the substrate is provided between the substrate and the supply source.

With the method, it is possible to easily provide positioning where the supply material ejected from the supply source is not directly incident to the surface of the substrate. Consequently, it is possible to more easily form fine particles that allow formation of highly uniformed magnetic fine particles with a periodic pattern through a simple process at a time.

It is preferable to arrange the method of the present invention so that the surface of the substrate where the fine particles are to be formed is provided with steps.

With the arrangement, it is possible to array formed fine particles along the steps. This allows greatly simplifying steps for producing a high-density magnetic storage medium such as patterned media.

It is preferable to arrange the method of the present invention so that a magnetic film is formed on the surface of the substrate where the fine particles are to be formed.

With the arrangement, it is possible to produce patterned media with a simple process. This allows greatly simplifying steps for producing a high-density magnetic storage medium such as patterned media.

A method of the present invention for forming concavities and convexities includes the step of etching a substrate by using, as masking, fine particles formed through any one of the methods of the present invention for forming fine particles.

With the method, it is possible to form fine particles that allow formation of highly uniformed magnetic fine particles with a periodic pattern through a simple process at a time.

Further, the method of the present invention for forming concavities and convexities includes the steps of: transferring, to a first transfer material, a shape of fine particles formed through any one of the methods of the present invention for forming fine particles, or a shape of concavities and convexities formed through the method of the present invention for forming concavities and convexities; and etching the first transfer material by using, as masking, the shape transferred to the first transfer material.

With the method, concavities and convexities formed from the fine particles are made higher (deeper), and the concavities and convexities are easily duplicated by the transfer. This allows greatly simplifying steps for producing a high-density magnetic storage medium such as patterned media.

Therefore, with the method, it is possible to form concavities and convexities that allow formation of highly uniformed magnetic fine particles with a periodic pattern through a simple process at a time.

Further, the method of the present invention for forming concavities and convexities includes the steps of: transferring, to a first transfer material, a shape of fine particles formed through any one of the methods of the present invention for forming fine particles, or a shape of concavities and convexities formed through any one of the methods of the present invention for forming concavities and convexities; transferring the shape transferred to the first transfer material to a second transfer material; and etching the second transfer material by using, as masking, the shape transferred to the second transfer material.

With the method, concavities and convexities formed from the fine particles are made higher (deeper), and the concavities and convexities are easily duplicated by the transfer. This allows greatly simplifying steps for producing a high-density magnetic storage medium such as patterned media.

Therefore, with the method, it is possible to form concavities and convexities that allow formation of highly uniformed magnetic fine particles with a periodic pattern through a simple process at a time.

It is preferable to arrange the method of the present invention for forming concavities and convexities so that a magnetic film is formed on a surface of the first transfer material on which surface the concavities and convexities are to be transferred.

With the method, a high-density magnetic storage medium such as patterned media can be produced through a simple process, so that it is possible to greatly simplify steps for producing the high-density magnetic storage medium.

It is preferable to arrange the method of the present invention for forming concavities and convexities so that a magnetic film is formed on a surface of the second transfer material on which surface the concavities and convexities are to be transferred.

With the method, a high-density magnetic storage medium such as patterned media can be produced through a simple process, so that it is possible to greatly simplify steps for producing the high-density magnetic storage medium.

Further, the method of the present invention for forming a magnetic storage medium includes the steps of: preparing a substrate on a surface of which concavities and convexities are formed through any one of the methods of the present invention for forming fine particles or any one of the methods of the present invention for forming concavities and convexities; and forming a magnetic film on the surface of the substrate on which surface the concavities and convexities are formed.

With the method, it is possible to provide a magnetic storage medium capable of storing magnetic information with high density, even when the magnetic storage medium is made of a magnetic material that is hard to etch since the magnetic material is likely to be oxidized or for other reasons.

With the method, it is possible to form highly uniformed magnetic fine particles with a periodic pattern through a simple process at a time.

Further, the method of the present invention for producing a magnetic storage medium includes the steps of: preparing a substrate on a magnetic film of which concavities and convexities are formed through any one of the methods of the present invention for forming fine particles on a surface where a magnetic film is formed or any one of the methods of the present invention for forming concavities and convexities on a surface where a magnetic film is formed; etching the magnetic film using the concavities and convexities as masking; removing the concavities and convexities; and forming a protective layer on the magnetic film.

With the method, it is possible to form fine particles that allow formation of highly uniformed magnetic fine particles with a periodic pattern through a simple process at a time.

The device of the present invention for forming fine particles on a substrate includes: inert gas introducing means; a substrate supporter for supporting a substrate; a supply source for supplying a supply material that is capable of being combined with a material constituting a surface of the substrate to produce a compound; supply material generation means for generating atoms or molecules of the supply material from the supply source; and a high-frequency power source for applying, to at least one of the substrate and the substrate supporter, a high-frequency voltage varying positively and negatively with respect to a ground voltage, ranging from 100 kHz to 100 MHz, the supply source being positioned in such a manner that the supply material from the supply source is not directly incident to the surface of the substrate where the fine particles are to be formed.

With the arrangement, it is possible to form fine particles that allow formation of highly uniformed magnetic fine particles with a periodic pattern through a simple process at a time.

It is preferable to arrange the device of the present invention so that the supply source is positioned on the substrate supporter for supporting the substrate or at least a part of the substrate supporter is made of the supply source.

With the arrangement, it is possible to easily provide positioning where the supply material ejected from the supply source is not directly incident to the surface of the substrate. This allows formation of a highly uniform periodic pattern through a simple process at a time.

It is preferable to arrange the device of the present invention so as to further include a blocking member for preventing the supply material from being directly incident to the surface of the substrate.

With the arrangement, it is possible to easily provide positioning where the supply material ejected from the supply source is not directly incident to the surface of the substrate. This allows formation of a highly uniform periodic pattern through a simple process at a time.

It is preferable to arrange the device of the present invention so that the supply material generation means is means for generating a supply material by sputtering.

With the arrangement, plasma is generated when applying a high-frequency voltage. Therefore, when the supply material is supplied through sputtering, it is possible to prompt growth of fine particles on the surface of the substrate, thereby forming fine particles in a shorter time.

Further, since sputtering is widely used in a conventional method for producing a magnetic storage medium, it is possible to greatly simplify production steps for producing a high-density magnetic storage medium such as patterned media.

Further, the device of the present invention for producing a magnetic storage medium includes any one of the devices of the present invention for forming fine particles.

With the arrangement, since the device of the present invention for producing a magnetic storage medium includes any one of the devices of the present invention for forming fine particles, it is possible to produce a magnetic storage medium capable of storing magnetic information with high density, even when the magnetic storage medium is made of a magnetic material that is hard to etch.

Therefore, with the arrangement, it is possible to form highly uniformed magnetic fine particles with a periodic pattern at a time through a simple process including a dry process compatible with a conventional method for producing a granular medium.

The above explanation may be expressed as follows.

(1) A method for forming fine particles on a substrate, comprising the step of applying to the substrate a high-frequency voltage varying positively and negative with respect to a ground voltage, ranging from 100 kHz to 100 MHz, and supplying a supply material capable of being combined with a material constituting the substrate or a thin film material formed on the substrate to produce a compound, from a supply source positioned in such a manner that the supply material is not directly incident to a surface of the substrate, so that fine particles are formed on the substrate.

(2) The method as set forth in (1), wherein the material constituting the substrate or the thin film material formed on the substrate is a material mainly containing an element selected from Si, Ge, and Al or a material mainly containing an alloy of the material, and the supply material is (i) a material mainly containing an element selected from V, Cr, Zr, Nb, Mo, Hf, Ta, and W, (ii) a material mainly containing an alloy of the material (i), or (iii) a material mainly containing an alloy of the materials (i) and (ii) and the material constituting the substrate or the thin film material formed on the substrate.

(3) The method as set forth (1) or (2), wherein the supply material is supplied to the substrate through sputtering.

(4) The method as set forth in any one of (1) to (3), wherein the supply source is positioned on the substrate supporter for supporting the substrate or at least a part of the substrate supporter is made of the supply source.

(5) The method as set forth in any one of (1) to (4), wherein a blocking member for preventing the supply material from being directly incident to the surface of the substrate is provided between the substrate and the supply source.

(6) The method as set forth in any one of (1) to (5), wherein the substrate is positioned outside a plasma emission area that accompanies sputtering to the supply source.

(7) The method as set forth in any one of (1) to (6), wherein steps are formed in an area of the substrate on which area fine particles are to be formed.

(8) A method for forming concavities and convexities, comprising the step of etching the substrate or a thin film formed on the substrate, using fine particles formed through a method as set forth in any one of (1) to (7) as masking.

(9) A method for forming concavities and convexities, comprising the steps of: transferring, to a first transfer target material, a shape of fine particles formed through a method as set forth in any one of (1) to (7) or a shape of concavities and convexities formed through a method as set forth in (8); and etching a base of the first transfer target material or a thin film formed on the base of the first transfer target material, using the shape transferred to the first transfer target material as masking.

(10) A method for forming concavities and convexities, comprising the steps of: transferring, to a first transfer target material, a shape of fine particles formed through a method as set forth in any one of (1) to (7) or a shape of concavities and convexities formed through a method as set forth in (8); transferring, to a second transfer target material, the shape transferred to the first transfer target material; and etching a base of the second transfer target material or a thin film formed on the base of the second transfer target material, using the shape transferred to the second transfer target material as masking.

(11) A method for producing a magnetic storage medium, comprising the step of forming a magnetic film on a substrate on a surface of which fine particles are formed through a method as set forth in any one of (1) to (7) or on a substrate or a base on a surface of which concavities and convexities are formed through a method as set forth in any one of (8) to (10).

(12) A method for producing a magnetic storage medium, wherein a thin film as set forth in any one of (8) to (10) is a magnetic film.

The present invention is not limited to the description of the embodiments above, but may be altered by a skilled person within the scope of the claims. An embodiment based on a proper combination of technical means disclosed in different embodiments is encompassed in the technical scope of the present invention.

EXAMPLES

The following explains the present invention in more details, with reference to Examples. Note that the present invention is not limited to these Examples.

<AFM (Atomic Force Microscope) Observation>

All observations with AFM in the Examples were performed with a Nanoscope DI-3100 manufactured by Veeco Instruments.

Example 1

In Example 1, fine particles (concavities and convexities) with high periodicity were formed on the substrate 104 with the fine particle forming device of FIG. 1 explained in First Embodiment.

In the present embodiment, the vacuum chamber 101 whose ultimate vacuum was $5 \times 10^{-5}$ Pa was used, and the substrate supporter 102 was made of a stainless steel. A Ta film of 100 nm in thickness was formed on the surface of the substrate supporter 102 with a sputtering device beforehand, and the Ta film was used as the supply source 103. The Ta film was formed on the whole area of the surface of the substrate supporter 102 to which area the substrate 104 was to be attached. The substrate 104 was a P-type Si wafer (plane direction (100)) to which B was doped. The substrate 104 was fixed by a spring member to the substrate supporter 102 on which the Ta thin film was formed.

Inert gas to be introduced to the vacuum chamber 101 in forming fine particles was Ar gas and the pressure at the time of introducing the Ar gas was set to $8.6 \times 10^{-2}$ Pa.

The high-frequency power source 105 was a power source whose frequency was 13.56 MHz and which was capable of applying an electric power of 1 kW or less. When applying a high-frequency voltage from the high-frequency power source 105 to the substrate supporter 102, as illustrated in FIG. 1, an end of the high-frequency power source 105 which end was opposite to the substrate supporter 102 was electrically grounded and was connected with the side wall of the vacuum chamber 101 to have the same potential, and control was performed so that a radiated electric power was constant. In the present embodiment, a voltage was applied so that a radiated electric power was 200 W.

In the present embodiment, an area of the substrate supporter 102 to which area the substrate 104 was to be attached was 550 mm in diameter. Therefore, a radiated electric power per unit area was 0.08 W/cm². In addition, the adjustor 106 made adjustment and a reflected electric power was set to 5 W or less.

Consequently, during a time when fine particles (concavities and convexities) were formed, Vdc changed in a range of −110V to −140V, and Vpp changed in a range of 820V to 850V. This is a state where the applied high-frequency voltage varied positively and negatively with respect to a ground voltage.

A time for applying the high-frequency voltage was set to 900 seconds continuously. A distance between the area of the substrate supporter 102 to which area the substrate 104 was to be attached and a wall of the vacuum chamber 101 facing the area was set to 200 mm.

Figure 14:
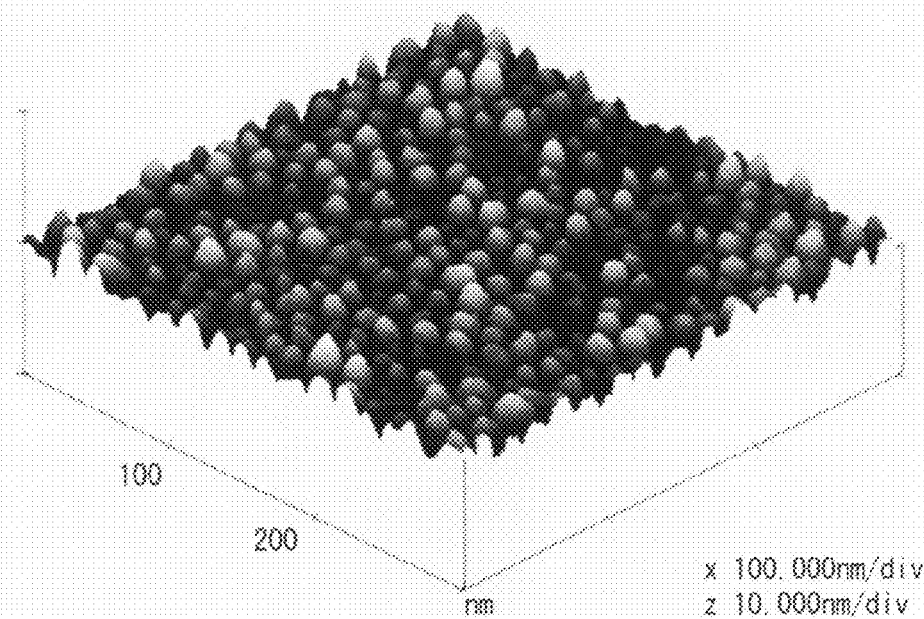
FIG. 14 is a drawing illustrating an image obtained by observation with AFM of fine particles in Example 1 that are formed through the method of the present embodiment for forming fine particles.
Figure 15:
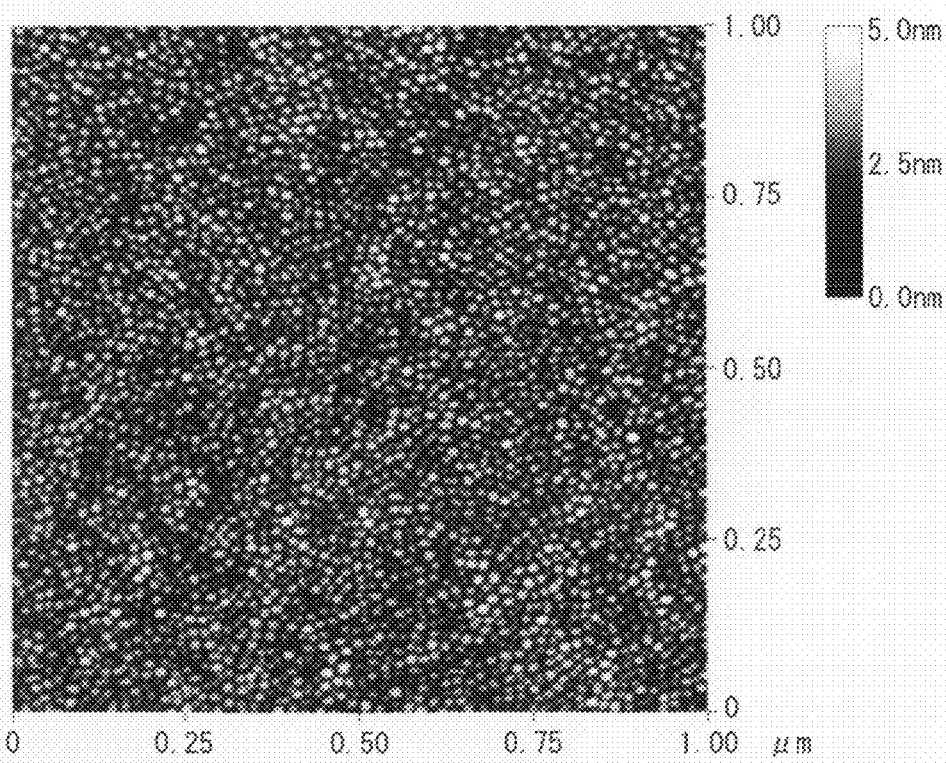
FIG. 15 is a drawing illustrating an image obtained by observation with AFM of fine particles in Example 1 that are formed through the method of the present embodiment for forming fine particles.

FIGS. 14 and 15 illustrate the results of observing with AFM the shape of the surface of the substrate 104 on which surface fine particles (concavities and convexities) were formed through the method of the present example.

FIG. 14 is an oblique drawing illustrating the result of observing the surface with a scanning range of 300 nm square and FIG. 15 is a top drawing illustrating the result of observing the surface with a scanning range of 1 μm square.

As illustrated in FIGS. 14 and 15, fine particles (concavities and convexities) produced in the present Example were periodic fine particles whose maximum vertical interval was 5.0 nm and whose arithmetic mean roughness Ra was 0.52 nm in the scanning range of 1 μm square. Further, it was observed that fine particles were formed while isolated from each other.

Figure 16:
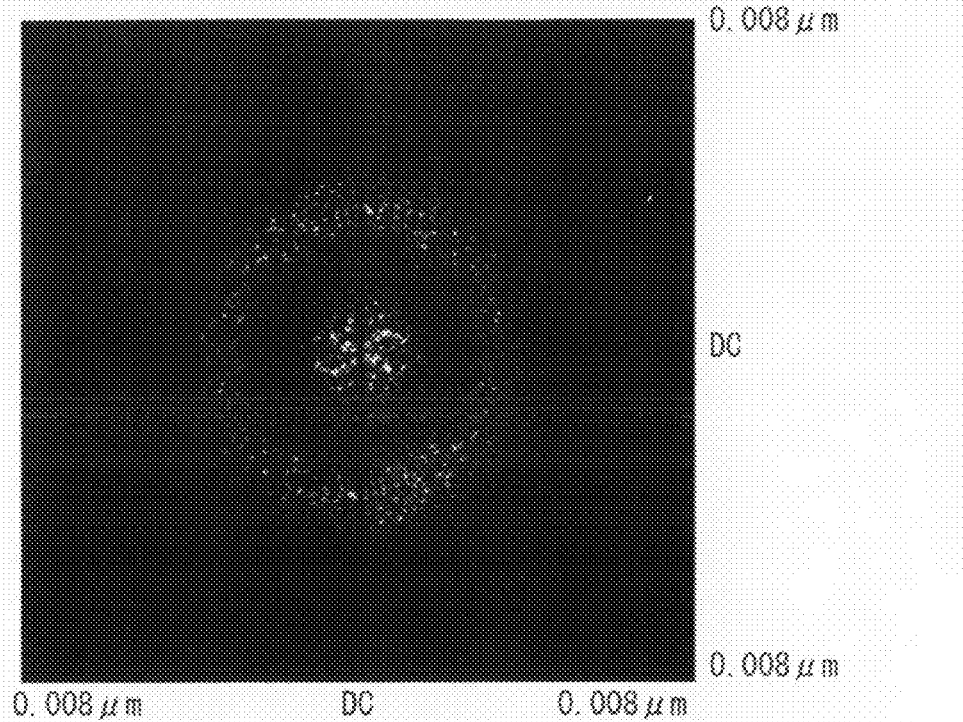
FIG. 16(a) is a drawing illustrating a spectrum obtained by subjecting the result of measurement with AFM of fine particles in Example 1 to 2-D Fourier conversion.
FIG. 16(b) is a drawing illustrating a power spectrum density obtained by subjecting the result of measurement with AFM of fine particles in Example 1 to 2-D Fourier conversion.
Figure 16:
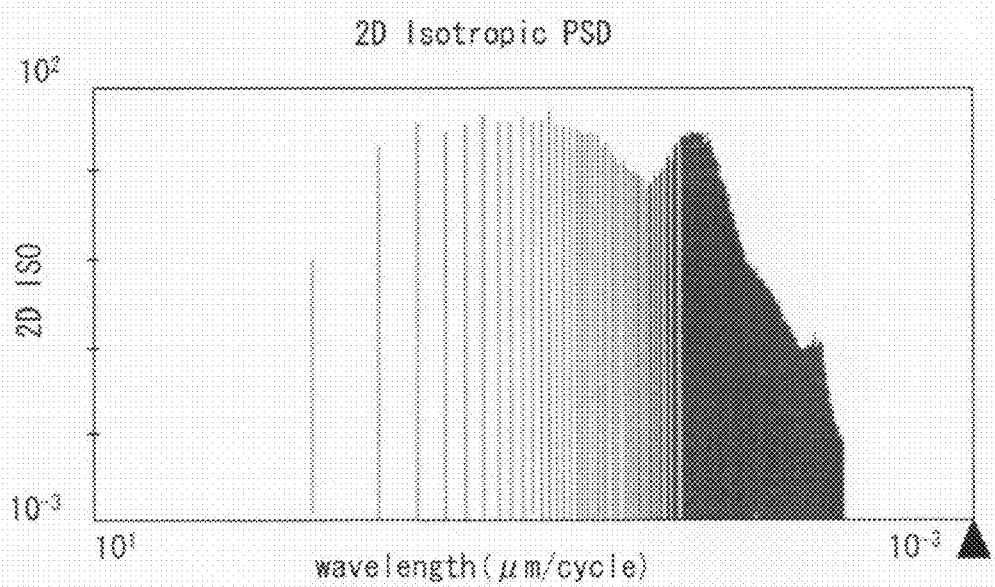

FIG. 16(a) illustrates a spectrum (2D-spectrum) obtained by subjecting the result of AFM observation in the range of 1 μm square in FIG. 15 to two-dimensional Fourier transform in order to confirm periodicity of the formed fine particles (concavities and convexities) in a direction parallel to the surface of the substrate. FIG. 16(b) illustrates a graph of a power Spectrum Density (PSD) obtained by subjecting the result of AFM observation in the range of 1 μm square in FIG. 15 to two-dimensional Fourier transform in order to confirm periodicity of the formed fine particles (concavities and convexities) in a direction parallel to the surface of the substrate.

The 2-D spectrum in FIG. 16(a) indicates that a brighter portion in FIG. 16(a) has more intensity, and a partially bright portion indicates that a periodicity component at that area (frequency) is particularly larger than a periodicity component at other portion.

The result of FIG. 16(a) shows that a ring-shaped bright portion was seen in a range of frequency corresponding to a range of 11 nm to 30 nm, indicating that fine particles (concavities and convexities) formed in the present Example had high periodicity in a very narrow range of 11 nm to 30 nm. Further, the ring shape indicates that the fine particles were positioned isotropically with respect to a direction parallel to the surface of the substrate.

On the other hand, the power spectrum density in FIG. 16(b) shows a clear peak in the range of 11 nm to 30 nm, and the position where the peak was highest was at 19 nm.

From the above results, it was confirmed that the concavities and convexities formed in the present example had high periodicity in the very narrow range of 11 nm to 30 nm.

Although a P-type Si wafer was used as the substrate 104 in the present Example, the same result was obtained for an N-type Si wafer. Further, the same result was obtained for Si wafers with different amounts of a dope element and different plane directions. Thus, the substrate 104 is not necessarily made of a pure element, and may mainly contain a material capable of being combined with the material of the supply source 103 to produce a compound.

When the surface of the sample formed in the present Example was subjected to elemental analysis by Auger spectroscopy, not only Si used for the surface of the substrate 104 but also Ta used for the supply source 103 were detected. That is, it was confirmed that Ta was attached to the surface of the substrate 104 due to the steps of the present Example.

Further, the sample was subjected to Ar etching to scrape the surface of the sample, and was subjected to element analysis in a depth direction (etching amount: per 5 nm). The result of the etching showed that a little amount of Ta was detected after 5 nm etching, but Ta was not detected after 10 nm etching. This depth corresponded to the height of the fine particles observed with AFM. Consequently, it is highly possible that Ta constituting the supply source 103 was included in the fine particles formed on the surface of the substrate 104.

It is known that the melting point of Ta used for the supply source 103 in the present example is approximately 2996° C., and the surface energy of Ta at 298K is approximately 3018 erg/cm$^2$. In contrast, it is known that the melting point of Si used for the substrate 104 is approximately 1414° C. and the surface energy of Si at 298K is approximately 1107 erg/cm$^2$.

The materials (elements) used in the present example were selected so that the material (element) for the supply source 103 has higher surface energy than the material (element) for the surface of the substrate 104, and that the fine particles formed on the substrate 104 are unfamiliar with the surface of the substrate 104.

Further, in the present Example, fine particles were formed on (i) the surface of the substrate 104 which had been rinsed to remove a natural adsorbate and a natural oxidization film thereon and (ii) the surface of the substrate 104 which had not been rinsed and on the surface of which a natural adsorbate and a natural oxidization film remain, and the fine particles on the surfaces (i) and (ii) were compared with each other through AFM observation, but significant difference between the fine particles on the surfaces (i) and (ii) was not seen.

Therefore, adsorbate existing in a portion approximately several nm away from the surface of the substrate 104 did not have so much influence. Instead, the kind of the material existing in a portion of approximately several ten nm in thickness under the portion approximately several nm away from the surface was particularly important.

In the present example, heating of the substrate and cooling of the substrate were not performed. However, the heating of the substrate and the cooling of the substrate may be performed in order to adjust the size of each of the formed fine particles and the distance between adjacent fine particles.

Reference Example

Figure 17:
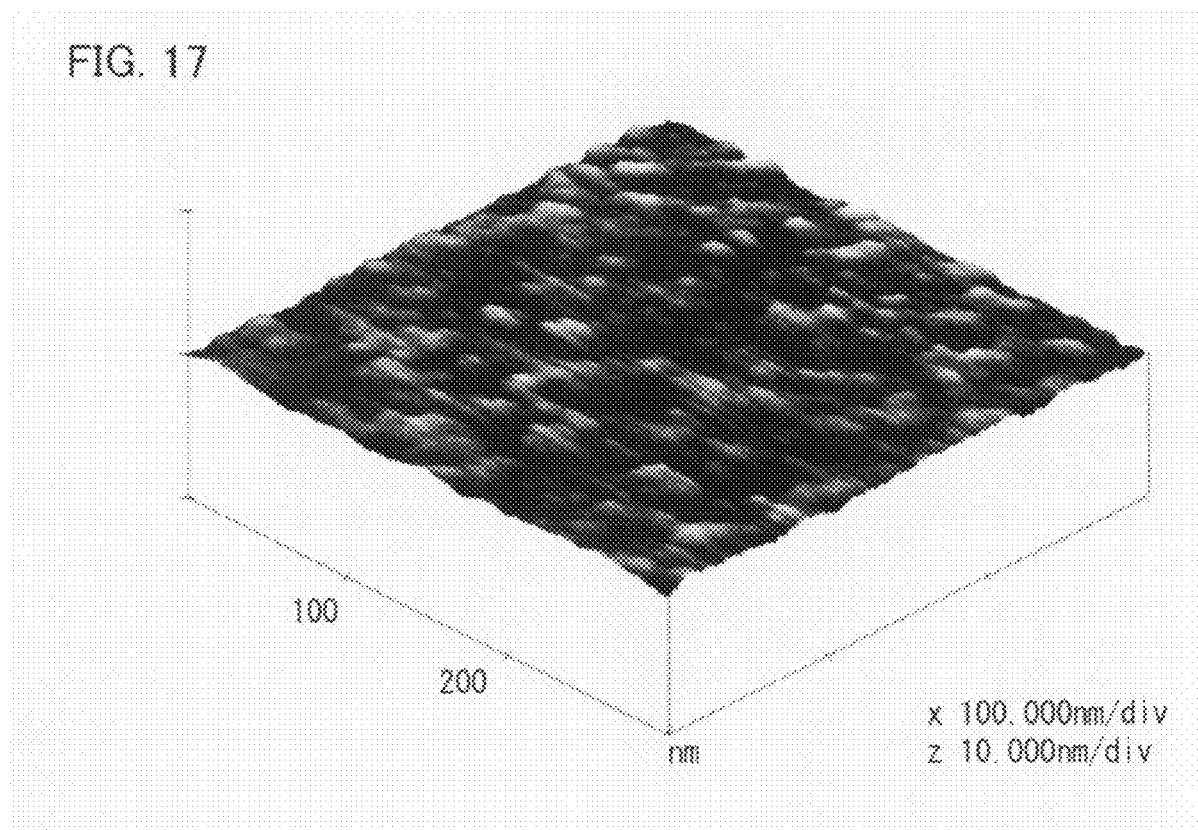
FIG. 17 is an image obtained by observation with AFM of the surface of a substrate in Reference Example.
Figure 18:
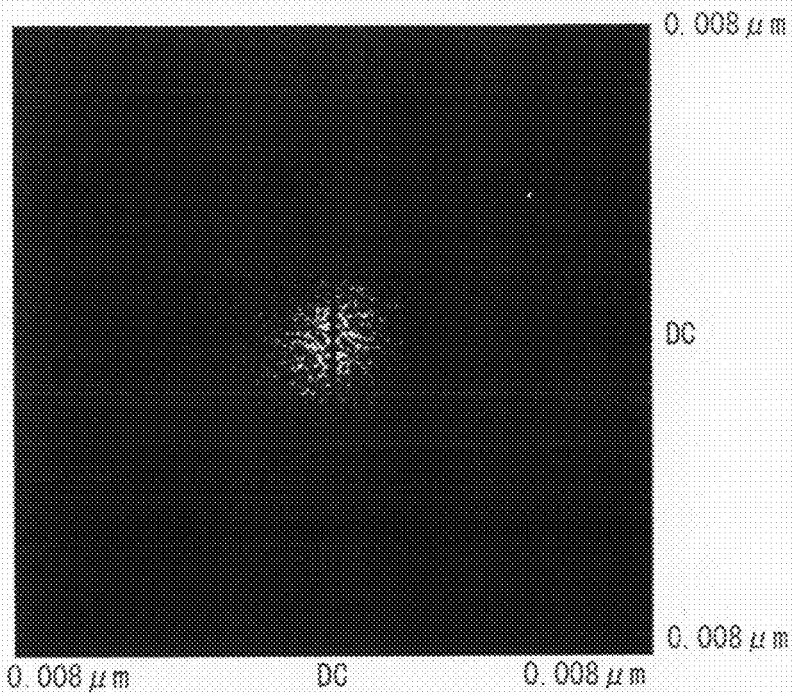
FIG. 18(a) is a drawing illustrating a spectrum obtained by subjecting the result of measurement with AFM of a substrate in Reference Example to 2-D Fourier conversion.
FIG. 18(b) is a drawing illustrating a power spectrum density obtained by subjecting the result of measurement with AFM of a substrate in Reference Example to 2-D Fourier conversion.
Figure 18:
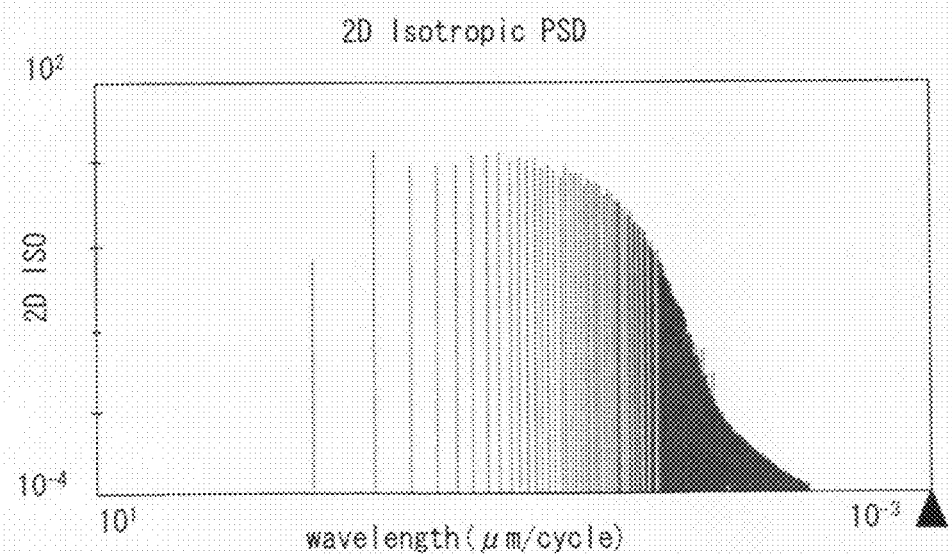

A Reference Example shows the result of observation with AFM of the shape of the surface of the Si wafer used for the substrate 104 in Example 1 (which was not subjected to the treatment in Example 1) (FIG. 17) and the results of 2-D spectrum (FIG. 18(a)) and 2-D power spectrum density (FIG. 18(b)) based on the AFM observation as in Example 1.

FIG. 17 is an oblique drawing illustrating the result of observing the surface of an Si wafer in a scanning range of 300 nm square.

The surface of the Si wafer had the maximum vertical interval of 1.6 nm in a scanning range of 1 µm square and arithmetic mean roughness Ra of 0.15 nm.

Further, 2-D spectrum in FIG. 18(a) did not show a ring-shaped bright portion as seen in Example 1. Further, power spectrum density in FIG. 18(b) did not show a clear peak as seen in Example 1.

Comparative Example 1

Comparative Example 1 shows the result of sputtering Ta to the substrate 104 to form a Ta film thereon, with use of a sputtering device in which an Si wafer identical with the substrate in Example 1 was used as the substrate 104 and Ta used as the material for the supply source 103 in Example 1 was provided as a target on a position that faced the substrate 104.

When forming the Ta film, the ultimate vacuum of the sputtering device was set to $5 \times 10^{-5}$ Pa as in Example 1, Ar gas was introduced as in Example 1, and the pressure of Ar gas at the time of the introduction was set to $8.6 \times 10^{-2}$ Pa. A Ta target used here was of 6 inches in diameter. An electric power of DC20W that was the minimum dischargeable electric power was applied on the target and the Ta film was formed through sputtering for 900 seconds. The distance between the target and the substrate 104 was set to 160 mm. Application of a high-frequency voltage as in Example 1 was not performed on the substrate 104 and the substrate supporter 102.

Figure 19:
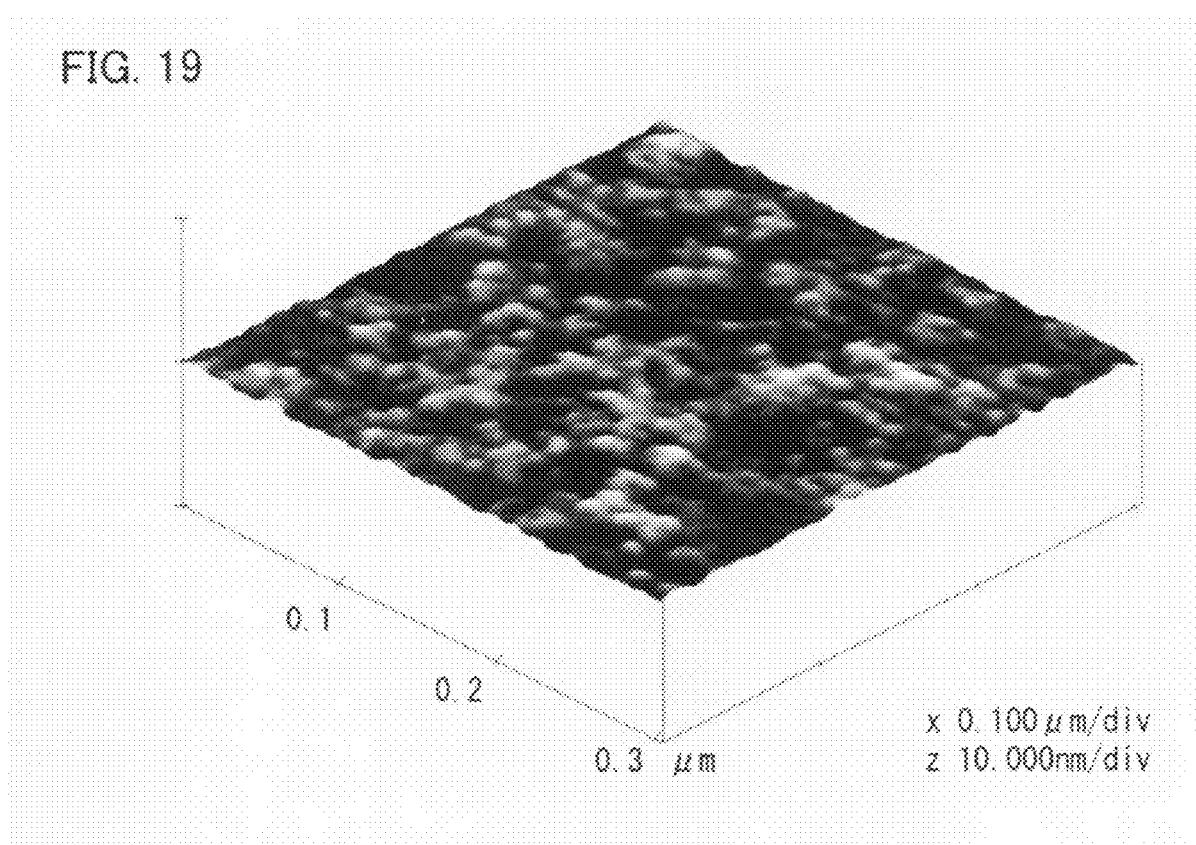
FIG. 19 is a drawing illustrating an image obtained by observation with AFM of the surface of a sample in Comparative Example 1.

FIG. 19 illustrates the result of observation with AFM of the surface of the sample of Comparative Example 1 produced through the above method in a scanning range of 300 nm square.

As illustrated in FIG. 19, the concavities and convexities having periodicity in nano meter order that were seen in Example 1 were not seen in Comparative Example 1. The maximum vertical interval was 2.2 nm and arithmetic mean roughness Ra was 0.16 nm in the observation in the scanning range of 1 µm square, which were smaller than those in Example 1.

Figure 20:
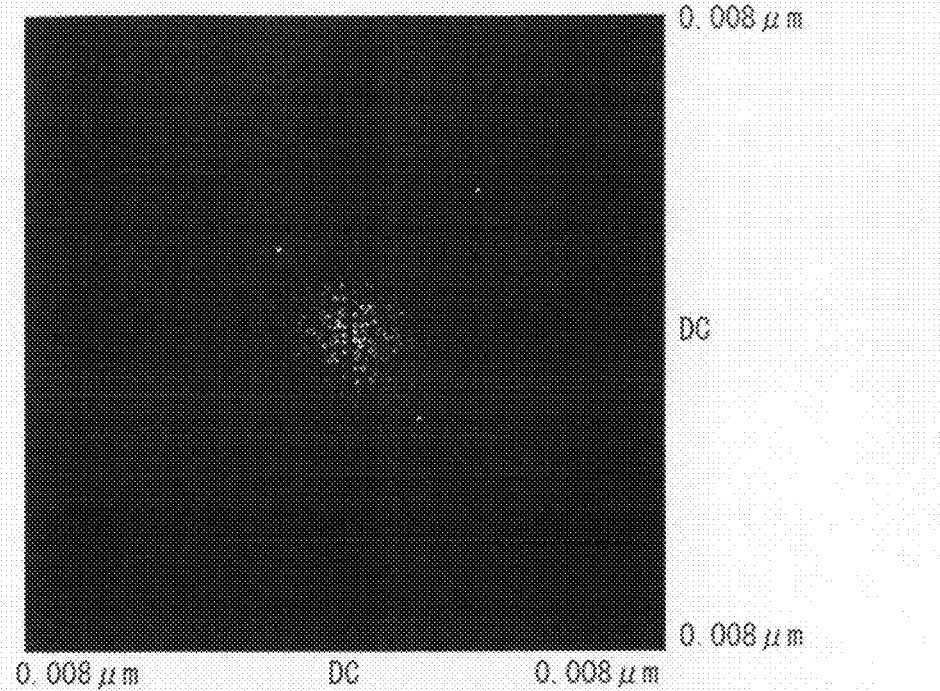
FIG. 20(a) is a drawing illustrating a spectrum obtained by subjecting the result of measurement with AFM of a substrate in Comparative Example 1 to 2-D Fourier conversion.
FIG. 20(b) is a drawing illustrating a power spectrum density obtained by subjecting the result of measurement with AFM of a substrate in Comparative Example 1 to 2-D Fourier conversion.
Figure 20:
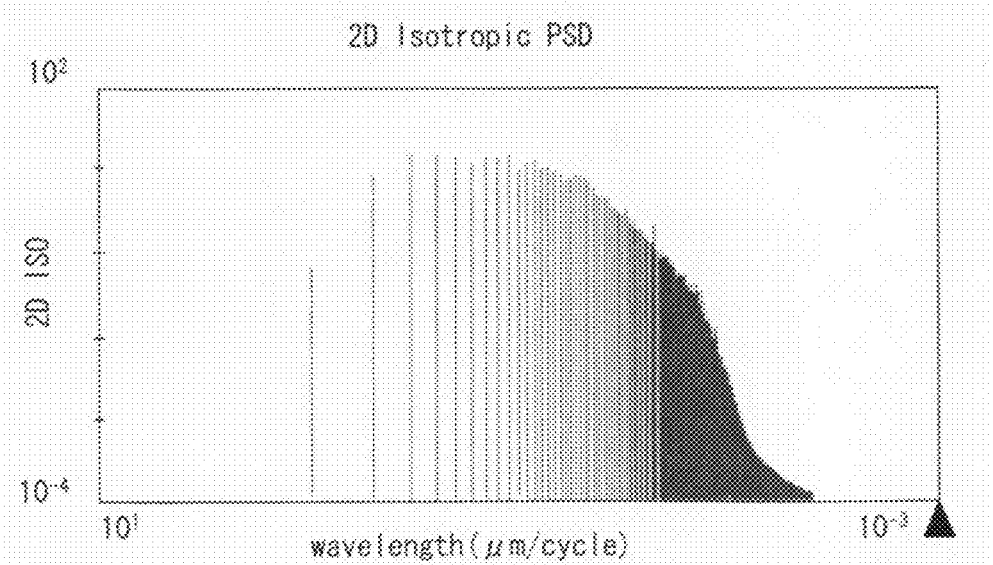

FIGS. 20(a) and 20(b) illustrate the results of 2-D spectrum and 2-D power spectrum density of Comparative Example 1 based on the observation with AFM (scanning range: 1 µm square).

In the 2-D spectrum in FIG. 20(a), the bright ring-shaped portion that was seen in Example 1 was not seen. In the power spectrum density in FIG. 20(b), a clear peak was not seen with a gentle slope existing. From these results, it was confirmed that in the sample in Comparative Example 1, periodic fine particles (concavities and convexities) were not formed.

In addition, samples were prepared with different pressures of Ar gas, different reflected electric powers in sputtering, and different times for forming a film. However, in each case, the periodic fine particles (concavities and convexities) that were obtained in Example 1 were not formed.

The result of the present Comparative Example shows that in order to form periodic fine particles (concavities and convexities) that were obtained in Example 1, it is necessary not only to supply atoms etc. from the supply source 103 to the substrate 104 but also to apply on the substrate supporter 102 (plus the substrate 104 if the substrate 104 is conducted) a high-frequency voltage varying positively and negatively with respect to a ground voltage, thereby repeating ejection of atoms etc. from the surface and reattachment of the atoms etc. to the surface.

Comparative Example 2

Comparative Example 2 shows an example of using Al as a target material instead of using Ta that was used as a target material in Comparative Example 1. In the present Comparative Example, An Al film was formed on the substrate 104 through sputtering while the substrate 104 was a Si wafer as in Comparative Example 1 and a sputtering device having an Al target at a position facing the substrate 104 was used.

In forming the Al film, ultimate vacuum of the sputtering device was set to $5 \times 10^{-5}$ Pa as in Comparative Example 1, and Ar gas was introduced as in Comparative Example 1, and the pressure at the time of the introduction of the gas was set to $8.6 \times 10^{-2}$ Pa. The Al target was of 6 inches in diameter, and an electric power of DC400W was applied on the target and the Al film was formed through sputtering for 10 seconds. The distance between the target and the substrate 104 was set to 160 mm. Application of a high-frequency voltage as in Example 1 was not performed on the substrate 104 and the substrate supporter 102.

Figure 21:
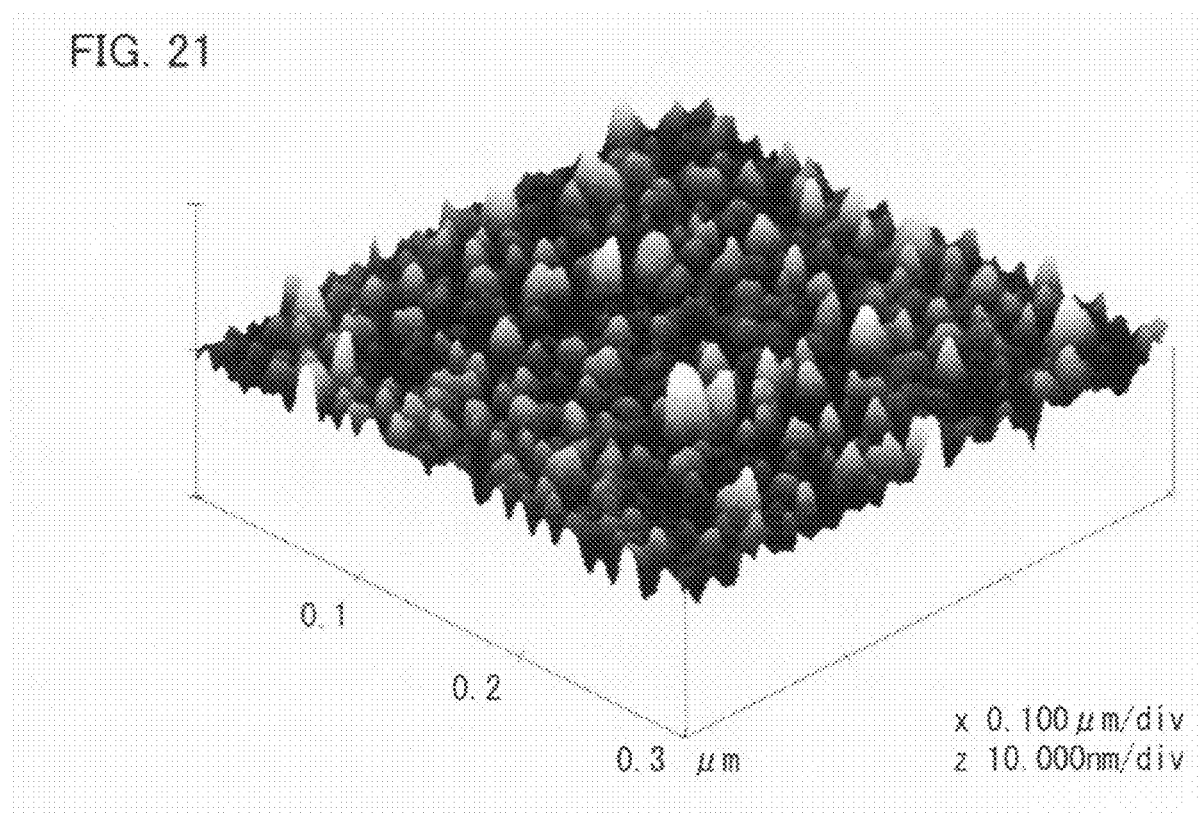
FIG. 21 is an image obtained by observation with AFM of the surface of a sample in Comparative Example 2.

FIG. 21 illustrates the result of observation with AFM of the surface of the sample of Comparative Example 2 produced through the above method in a scanning range of 300 nm square.

As illustrated in FIG. 21, in the present Comparative Example, particles agglomerated on the substrate 104 due to the low melting point of Al, and concavities and convexities were observed. The maximum vertical interval was 7.8 nm and arithmetic mean roughness was 0.58 nm when observing in the scanning range of 1 μm square. The sizes of individual concavities and convexities varied compared with Example 1.

Figure 22:
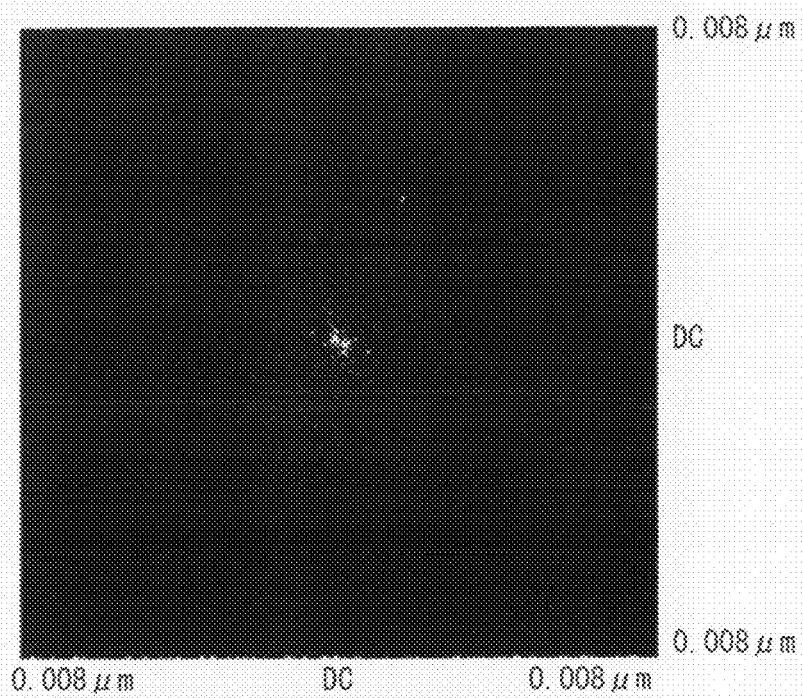
FIG. 22(a) is a drawing illustrating a spectrum obtained by subjecting the result of measurement with AFM of a substrate in Comparative Example 2 to 2-D Fourier conversion.
FIG. 22(b) is a drawing illustrating a power spectrum density obtained by subjecting the result of measurement with AFM of a substrate in Comparative Example 2 to 2-D Fourier conversion.
Figure 22:
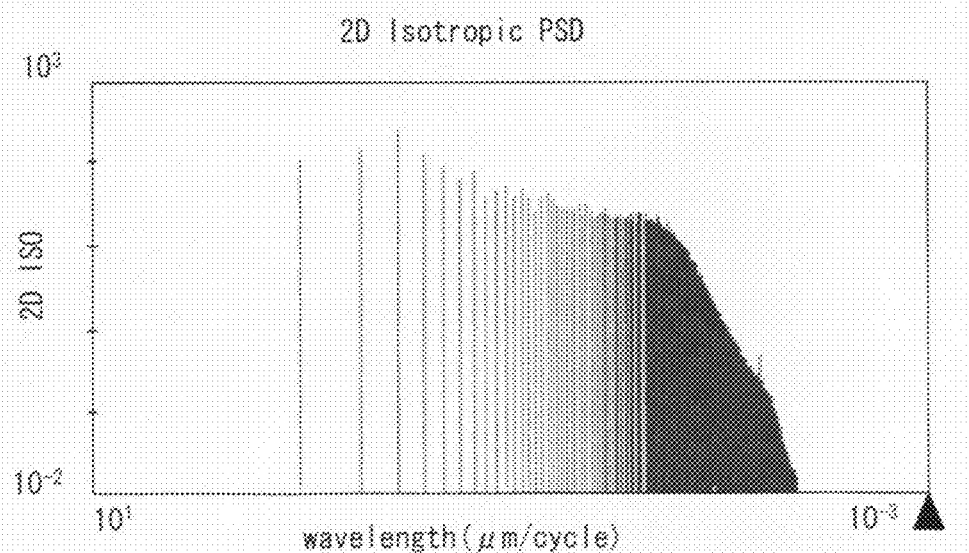

FIGS. 22(a) and 22(b) illustrate the results of 2-D spectrum and 2-D power spectrum density of Comparative Example 2 based on the observation with AFM (scanning range: 1 μm square).

In the 2-D spectrum in FIG. 22(a), the bright ring-shaped portion that was seen in Example 1 was not seen. In the power spectrum density in FIG. 22(b), a clear peak was not seen with a gentle slope existing.

From these results, it was confirmed that in the sample in Comparative Example 2, concavities and convexities can be formed on the surface of the substrate 104 due to agglomeration of Al, but the formed concavities and convexities had low uniformity. This shows that in Comparative Example 2, when concavities and convexities were formed by sputtering film formation, energy of particles that reached the surface of the substrate 104 and particle size were difficult to be uniform, making it difficult to form periodic concavities and convexities.

In addition, samples were prepared with different pressures of Ar gas, different reflected electric powers in sputtering, and different times for forming a film. However, in each case, the periodic fine particles (concavities and convexities) that were obtained in Example 1 were not formed.

Comparative Example 3

In the present Comparative Example, the same operation as Example 1 was performed except that the material of the supply source 103 was changed from Ta to Al.

The supply source 103 that was an Al film was formed in the same way as the supply source 103 that was a Ta film. An Al film of 100 nm in thickness was formed on the surface of the substrate supporter 102 with a sputtering device beforehand, and the Al film was used as the supply source 103.

Figure 23:
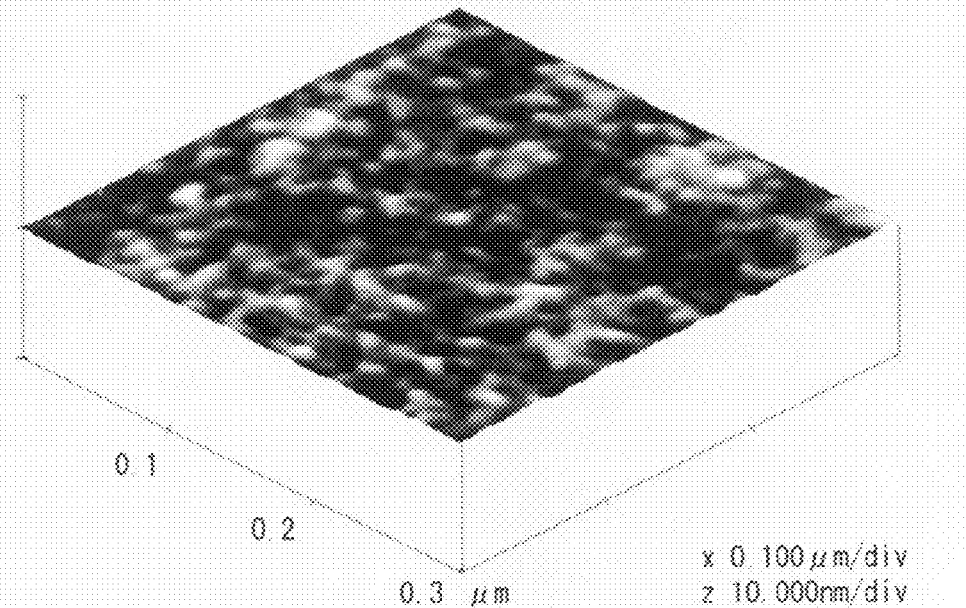
FIG. 23 is a drawing illustrating an image obtained by observation with AFM of the surface of Comparative Example 3.

FIG. 23 illustrates the result of observation with AFM of the surface of the sample of Comparative Example 3 produced through the above method in the scanning range of 300 nm square.

As illustrated in FIG. 23, in Comparative Example 3, fine particles (concavities and convexities) with periodicity in nano meter order that were seen in Example 1 were not seen, and the maximum vertical interval was 2.1 nm and arithmetic mean roughness Ra was 0.13 nm in the observation in the scanning range of 1 μm square, which were smaller than those in Example 1.

2-D spectrum and 2-D power spectrum density of the sample were obtained based on the observation with AFM. The results show that the bright ring-shaped portion that was seen in Example 1 was not seen in the 2-D spectrum, and a clear peak was not seen with a gentle slope existing in the power spectrum density, as in Reference Example and Comparative Example 1. From these results, it was confirmed that in the sample in Comparative Example 3, periodic fine particles (concavities and convexities) were not formed.

Al used for the supply material 103 in the present Comparative Example is a material that cannot be combined with Si for the substrate 104 to produce a compound, and has a lower melting point than Si. The result of the present Comparative Example shows that it is desirable that the materials for the supply source 103 and the surface of the substrate 104 are materials that can be combined with each other to produce a compound and the material for the supply source 103 has a higher melting point than the material for the surface of the substrate 104.

In addition, MgO that is hard to sputter was examined whether MgO was suitable for the material for the supply source 103 or not. As a result, it was confirmed that fine particles (concavities and convexities) with periodicity that were obtained in Example 1 could not be formed as in the case of Al. That is, it was confirmed that it is impossible to form fine particles (concavities and convexities) with periodicity even when other element is not supplied to the surface of the substrate 104.

Comparative Example 4

In Comparative Example 4, the same operation as in Example 1 was performed except that the substrate 104 was not a Si wafer but a thermally oxidized Si wafer obtained by thermally oxidizing the surface of a Si wafer.

The thermally oxidized Si wafer used in the present Comparative Example was obtained by thermally oxidizing a Si wafer so that a portion between the surface and a point away from the surface by 500 nm or more was an oxidized Si.

Figure 24:
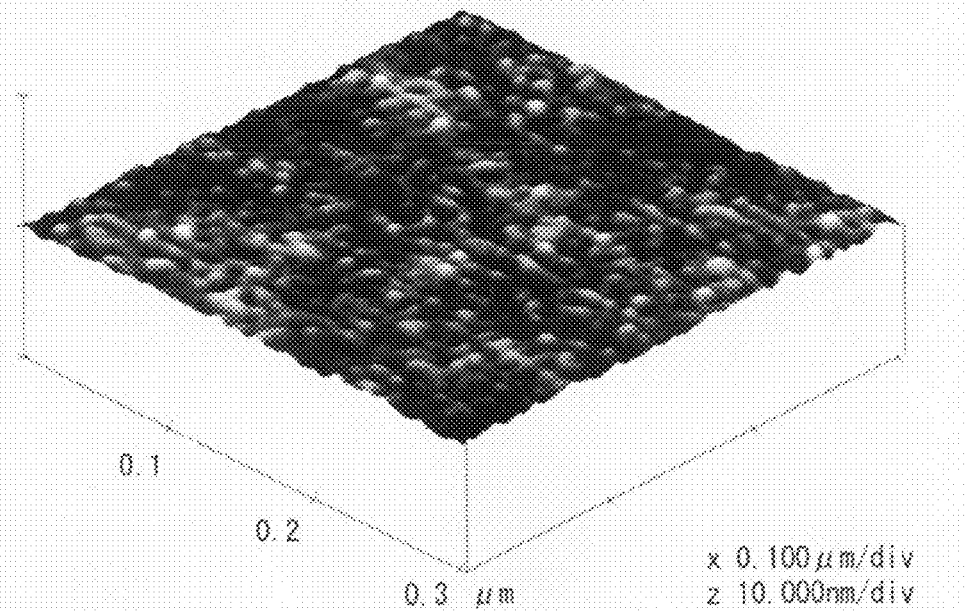
FIG. 24 is a drawing illustrating an image obtained by observation with AFM of the surface of Comparative Example 4.

FIG. 24 illustrates the result of observation with AFM of the surface of the sample of Comparative Example 4 in the scanning range of 300 nm square, the sample being prepared by using the thermally oxidized Si wafer as the substrate 104.

As illustrated in FIG. 24, in Comparative Example 4, fine particles (concavities and convexities) with periodicity in nano meter order that were seen in Example 1 were not seen as in Comparative Examples 1 and 3, and the maximum vertical interval was 2.7 nm and arithmetic mean roughness Ra was 0.19 nm in the observation with the scanning range of 1 μm square, which were smaller than those in Example 1.

2-D spectrum and 2-D power spectrum density of the sample were obtained based on the observation with AFM. The results show that the bright ring-shaped portion that was seen in Example 1 was not seen in the 2-D spectrum, and a clear peak was not seen with a gentle slope existing in the power spectrum density, as in Reference Example and Comparative Examples 1 to 3. From these results, it was confirmed that in the sample in Comparative Example 4, periodic fine particles (concavities and convexities) were not formed.

Oxidized Si used for the surface of the substrate 104 in the present Comparative Example is a material that cannot be combined with Ta for the supply source 103 to produce a compound. The result of the present Comparative Example shows that it is desirable that the materials for the supply source 103 and the surface of the substrate 104 are materials that can be combined with each other to produce a compound, as in Comparative Example 2.

Example 2

In Example 2, the same operation as in Example 1 was performed except that a time for applying a high-frequency voltage on the substrate supporter 102 was not 900 seconds but varied.

Table 1 shows maximum vertical interval Rmax, arithmetic mean roughness Ra, range of a clear peak seen in a graph of 2-D power spectrum density (PSD), the position where the peak was highest, and average particle size D of fine particles formed on the substrate 104, each of which was obtained by observing the surface of the prepared sample with AFM (scanning range: 1 μm square), as well as a time for applying a high-frequency voltage.

TABLE 1

|  | Application time (sec.) | Rmax (nm) | Ra (nm) | Peak range (nm) | Highest Position (nm) | Average particle size D (nm) |
| --- | --- | --- | --- | --- | --- | --- |
| Sample 2-1 | 600 | 3.9 | 0.35 | 9-25 | 16 | 8 |
| Sample 2-2 | 900 | 5.0 | 0.52 | 11-30 | 19 | 10 |
| Sample 2-3 | 3600 | 9.5 | 0.96 | 14-34 | 21 | 14 |

As shown in Table 1, as the time for applying a high-frequency voltage got longer, concavities and convexities got higher (deeper), and the peak of the power spectrum density (PSD) shifted to the long period side. Here, since the clear peak seen in the graph of the power spectrum density (PSD) indicates periodicity of the concavities and convexities formed on the surface of the sample in an in-plane 2-D direction, shifting of the peak to the long period side indicates that the concavities and convexities had longer repeating period while keeping high periodicity.

The result of Table 1 shows that changing the time for applying a high-frequency voltage allows adjusting the height (depth) of fine particles (concavities and convexities) and allows easily adjusting period and particle size according to purpose, while keeping high periodicity.

In the method of the present invention, it is particularly desirable that the time for applying a high-frequency voltage ranges form 30 to 3600 seconds for example. When the time is not less than 30 seconds, it is possible to make fine particles (concavities and convexities) grow stably on the surface with high periodicity. When the time is not more than 3600 seconds, it is possible to effectively produce fine particles (concavities and convexities) with high periodicity. That is, even when the time is more than 3600 seconds, production of fine particles (concavities and convexities) with high periodicity is possible, but the production in this case requires a longer process time and therefore is ineffective in terms of productivity.

Example 3

In Example 3, the same operation as in Example 1 was performed except that a radiated electric power was not 200 W but varied.

Table 2 shows maximum vertical interval Rmax, arithmetic mean roughness Ra, range of a clear peak seen in a graph of 2-D power spectrum density (PSD), the position where the peak was highest, and average particle size D of fine particles formed on the substrate 104, each of which was obtained by observing the surface of the prepared sample with AFM (scanning range: 1 μm square), as well as a radiated electric power for generating a high-frequency voltage and a time for applying the high-frequency voltage.

TABLE 2

|  | Radiated electric power (W) | Application time (sec.) | Rmax (nm) | Ra (nm) | Peak range (nm) | Highest position (nm) | Average particle size D (nm) |
| --- | --- | --- | --- | --- | --- | --- | --- |
| Sample 3-1 | 200 | 900 | 5.0 | 0.52 | 11-30 | 19 | 10 |
| Sample 3-2 | 300 | 900 | 7.6 | 0.79 | 15-39 | 23 | 17 |
| Sample 3-3 | 400 | 900 | 7.8 | 0.83 | 16-39 | 25 | 18 |
| Sample 3-4 | 100 | 3600 | 5.2 | 0.53 | 12-29 | 20 | 10 |
| Sample 3-5 | 200 | 3600 | 9.5 | 0.96 | 14-34 | 21 | 14 |

Out of the samples in Table 2, as for samples 3-1 to 3-3, the time for applying a high-frequency voltage was seconds as in Example 1. As for samples 3-4 and 3-5, the time was 3600 seconds. In terms of other production conditions, each of the samples had the same conditions as Example 1.

The difference (Vpp) between the maximum value and the minimum value of a high-frequency voltage in preparing the sample was approximately 820V to 850V in the samples 3-1 and 3-5 with the radiated electric power being 200 W, 1000V to 1060V in the sample 3-2 with the radiated electric power being 300 W, 1160V to 1220V in the sample 3-3 with the radiated electric power being 400 W, and 570V to 600V in the sample 3-4 with the radiated electric power being 100 W.

Further, the value (Vdc) obtained by subtracting a ground voltage from an average value of a high-frequency voltage is −110V to −140V in the samples 3-1 and 3-5 with the radiated electric power being 200 W, −160V to −190V in the sample 3-2 with the radiated electric power being 300 W, −190V to −220V in the sample 3-3 with the radiated electric power being 400 W, and −75V to −95V in the sample 3-4 with the radiated electric power being 100 W.

As described above, all of the samples in Table 2 were designed so that Vpp is larger than the average value of Vdc. As a result, the high-frequency voltage varied positively and negatively with respect to a ground voltage.

As is seen from the samples 3-1 to 3-3 in Table 2, as the radiated electric power got larger (deeper) (Vpp and the absolute value of Vdc got larger), the concavities and convexities got higher (deeper), the peak of the power spectrum density (PSD) shifted to the long period side, and the average particle size got larger.

Here, since the clear peak seen in the graph of the power spectrum density (PSD) indicate periodicity of the concavities and convexities formed on the surface of the sample, shifting of the peak to the long period side indicates that the concavities and convexities had longer repeating period while keeping high periodicity.

Further, the results of the samples 3-4 and 3-5 in Table 2 show that, as the radiated electric power got-larger (deeper) (Vpp and the absolute value of Vdc got larger), the concavities and convexities got higher (deeper), the peak of the power spectrum density (PSD) shifted to the long period side, and the average particle size got larger.

The results of Table 2 as described above show that changing the radiated electric power (changing Vpp and Vdc of the high-frequency voltage) allows adjusting the height (depth) of fine particles (concavities and convexities) and allows easily adjusting period and particle size according to purpose, while keeping high periodicity.

In the method according to the present invention, it is particularly desirable that the difference between the maximum value and the minimum value of the high-frequency voltage (Vpp) is not less than 100V and not more than 2000V. When Vpp is not less than 100V, movement energy of inert gas ions that collide with the supply source 103 gets sufficiently high, which allows efficiently ejecting a supply material from the supply source 103, allowing stably forming fine particles (concavities and convexities) on the substrate 104.

On the other hand, when Vpp is not more than 2000V, it is possible to prevent movement energy of the inert gas that collide with the substrate 104 from being too large, which prevents unintended damages on the substrate 104, preventing formation of uneven concavities and convexities. This allows stably forming fine particles (concavities and convexities) with high periodicity on the substrate 104.

Example 4

In Example 4, the same operation as in Example 1 was performed except that pressure at the time of the introduction of Ar gas was not $8.6 \times 10^{-2}$ Pa but varied.

Table 3 shows maximum vertical interval Rmax, arithmetic mean roughness Ra, range of a clear peak seen in a graph of 2-D power spectrum density (PSD), the position where the peak was highest, average particle size D of fine particles formed on the substrate 104, and standard deviation σ of fine particle size, each of which was obtained by observing the surface of the prepared sample with AFM (scanning range: 1 µm square), as well as a pressure (gas pressure) at the time of the introduction of Ar gas and a radiated electric power.

TABLE 3

| | Gas pressure (Pa) | Radiated electric power (W) | Rmax (nm) | Ra (nm) | Peak Range (nm) | Highest Position (nm) | Average particle size D (nm) | Standard Deviation σ (nm) |
|---|---|---|---|---|---|---|---|---|
| Sample 4-1 | $8.6 \times 10^{-2}$ | 200 | 5.0 | 0.52 | 11-30 | 19 | 10 | 3.6 |
| Sample 4-2 | $1.3 \times 10^{-2}$ | 200 | 3.9 | 0.39 | 9-30 | 18 | 8 | 2.5 |
| Sample 4-3 | $1.3 \times 10^{-2}$ | 300 | 7.2 | 0.70 | 13-37 | 25 | 10 | 3.1 |

Out of the samples in Table 3, as for samples 4-1 and 4-2, the radiated electric power was 200 W as in Example 1. As for sample 4-3, the radiated electric power was 300 W. In terms of other production conditions, each of the samples had the same conditions as Example 1.

The difference (Vpp) between the maximum value and the minimum value of a high-frequency voltage in preparing the sample was approximately 820V to 850V in the sample 4-1 with the gas pressure being $8.6 \times 10^{-2}$ Pa, 640V to 720V in the sample 4-2 with the gas pressure being $1.3 \times 10^{-2}$ Pa, and 730V to 800V in the sample 4-3 with the gas pressure being $1.3 \times 10^{-2}$ Pa and the radiated electric power being 300 W.

Further, the value obtained by subtracting a ground voltage from an average value of a high-frequency voltage (Vdc) is −110V to −140V in the sample 4-1, −160V to −190V in the sample 4-2, and −220V to −250V in the sample 4-3. As described above, all of the samples in Table 3 were designed so that Vpp is larger than the average value of Vdc. As a result, the high-frequency voltage varied positively and negatively with respect to a ground voltage.

Comparison between the samples 4-1 and 4-2 in Table 3 showed that in the sample 4-2, concavities and convexities are lower (shallower), the peak of the power spectrum density (PSD) was closer to the short period side, and the average particle size was smaller.

Further, comparison in standard deviation σ of fine particle size between the samples 4-1 and 4-2 showed that the sample 4-2 with a smaller gas pressure had smaller standard deviation σ. This shows that formation of concavities and convexities under a low gas pressure allows reducing particle size distribution of fine particles.

In the method, it is particularly desirable that the gas pressure in forming concavities and convexities is not less than $1.0 \times 10^{-2}$ Pa and not more than 1.0 Pa. When the gas pressure is not less than $1.0 \times 10^{-2}$ Pa, it is possible to perform plasma discharge stably. When the gas pressure is not more than 1.0

Pa, it is possible to prevent introduced inert gas from being taken into fine particles, further increasing uniformity of fine particles.

However, in a case where the method for ejecting atoms etc. from the supply source 103 is not sputtering as shown in the present example but radiation of ion beam or electron beam or evaporation of molecules by heating, it is possible to stably form concavities and convexities under a lower gas pressure. In some cases, formation of concavities and convexities does not necessarily require introduction of inert gas such as Ar gas.

As described above, when atoms etc. from the supply source 103 and atoms etc. of the surface of the substrate 104 are combined with each other to produce a compound which is formed as fine particles on the substrate 104, the amount of impurities taken into the fine particles has a great influence on evenness of the fine particles. Therefore, it is preferable to make ultimate pressure of a vacuum chamber used in forming the fine particles is as low as possible (the vacuum chamber has as high vacuum as possible) in order to remove impurities, the amount of inert gas introduced in the process is as small as possible, and the gas has high purity.

The sample 4-3 was prepared under the gas pressure of $1.3 \times 10^{-2}$ Pa as in the sample 4-2, and the radiated electric power directed to the sample 4-3 is set so large (300 W) that the sample 4-3 has the same average particle size D (10 nm) as that of the sample 4-1. Comparison between the sample 4-3 and the sample 4-1 shows that the position of the peak in the graph of power spectrum density of the sample 4-3 is closer to the long period side.

That is, the sample 4-3 has fine particles of the same particle size as those of the sample 4-1, but has longer period than the sample 4-1. In other words, the sample 4-3 is shaped to have a wider distance between fine particles. This shows that changing of the gas pressure in forming fine particles (concavities and convexities) allows adjusting not only the particle size of formed fine particles but also the distance between fine particles.

In addition, the sample 4-3 has larger Rmax and Ra than the sample 4-1 and has fine particles with larger heights formed on the substrate 104 than those of the sample 4-1. As described above, usage of a sample having fine particles with larger heights allows stable masking effect when etching the substrate 104 masked by fine particles, thereby allowing deeper etching.

Example 5

In Example 5, the same operation was performed as in Example 1 except that Xe gas that is inert gas is used instead of Ar gas used as inert gas to be introduced into a vacuum chamber in Example 1.

Even when the introduced gas was changed from Ar gas to Xe gas, fine particles (concavities and convexities) with high periodicity as in Example 1 were confirmed by observation with AFM, and the maximum vertical height and the arithmetic mean roughness Ra that are similar to those in Example 1 were obtained.

Specifically, the maximum vertical interval in hum square was 5.3 nm and the arithmetic mean roughness Ra was 0.55 nm. Further, individual fine particles were seen to be isolated from each other. the graph of the power spectrum density obtained by subjecting the result of measurement with AFM in the measurement range of hum square to 2-D Fourier conversion shows a clear peak in the range of 11 nm to 30 nm, and the position where the peak is highest is at 19 nm.

As described above, even when the introduced gas was inert gas other than Ar gas, it is possible to form fine particles (concavities and convexities) with high periodicity as in Example 1.

Example 6

In example 6, the same operation as in Example 1 was performed except that the substrate 104 is not a Si wafer but a substrate obtained by forming a 70 nm Si film on the surface of a thermally oxidized Si wafer that was obtained by thermally oxidizing the surface of a Si wafer.

The thermally oxidized Si wafer was the same as the thermally oxidized Si wafer used in Comparative Example 4, and was obtained by thermally oxidizing a Si wafer so that a portion with a thickness of 500 nm or more away from the surface was oxidized Si.

As already shown in Comparative Example 4, when the substrate 104 was the thermally oxidized Si wafer, the surface of the substrate 104 was an oxidized Si that could not be combined with the material (Ta) for the supply source 103 to produce a compound, and therefore fine particles (concavities and convexities) with high periodicity could not be obtained even when production conditions were the same as those of Example 1.

In contrast thereto, the present Example was different from Comparative Example 4 in that a Si film was formed on the thermally oxidized Si wafer and the surface of the substrate 104 was made of a material (Si) capable of being combined with the material (Ta) for the supply source 103 to produce a compound.

The substrate 104 in the present Example was produced by forming a 70 nm Si film on the thermally oxidized Si wafer through sputtering. Ultimate vacuum was set to $5 \times 10^{-5}$ Pa, and Ar gas was introduced in forming the Si film. Gas pressure at the time of forming the Si film was $7.5 \times 10^{-2}$ Pa. Si used as a sputtering target was a Si monocrystalline target to which B was doped and whose resistivity was 0.1 Ωcm or less, and the Si film was formed through DC sputtering.

The substrate 104 on the surface of which the Si film was formed as described above was supported by the substrate supporter 102 on the surface of which a 100 nm Ta film was formed through sputtering, as in Example 1.

Inert gas to be introduced into the vacuum chamber 101 in forming fine particles was Ar gas as in Example 1, and pressure at the time of the introduction of the Ar gas was set to $1.3 \times 10^{-2}$ Pa. Application of a high-frequency voltage from the high-frequency power source 105 to the substrate supporter 102 was controlled so that a radiated electric power was constantly 300 W. The high-frequency voltage was applied for 1000 seconds continuously. The difference (Vpp) between the maximum value and the minimum value of the high-frequency voltage in preparing the sample ranged from approximately 730V to 800V, and a value (Vdc) obtained by subtracting a ground voltage from the average value of the high-frequency voltage ranged from approximately −220V to −250V.

Figure 25:
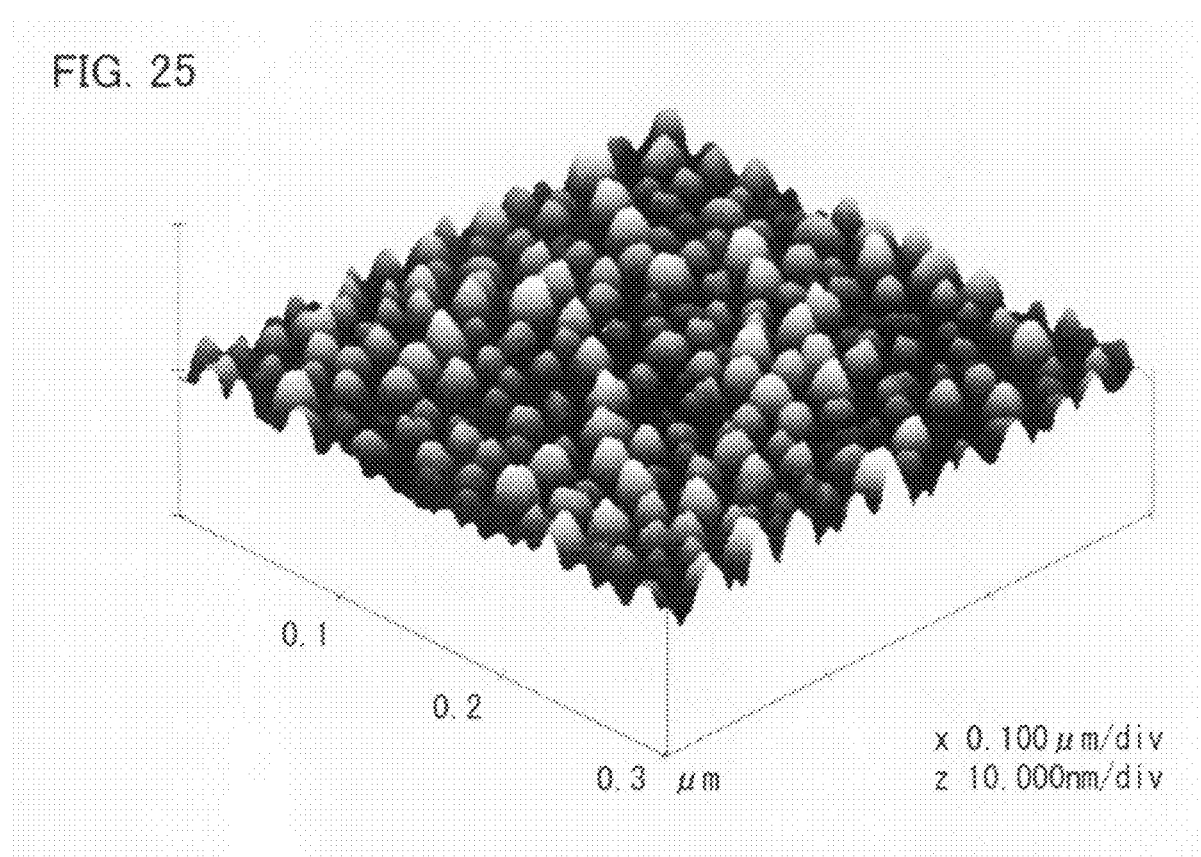
FIG. 25 is a drawing illustrating an image obtained by observation with AFM of fine particles in Example 6 that are formed through the method of the present embodiment for forming fine particles.
Figure 26:
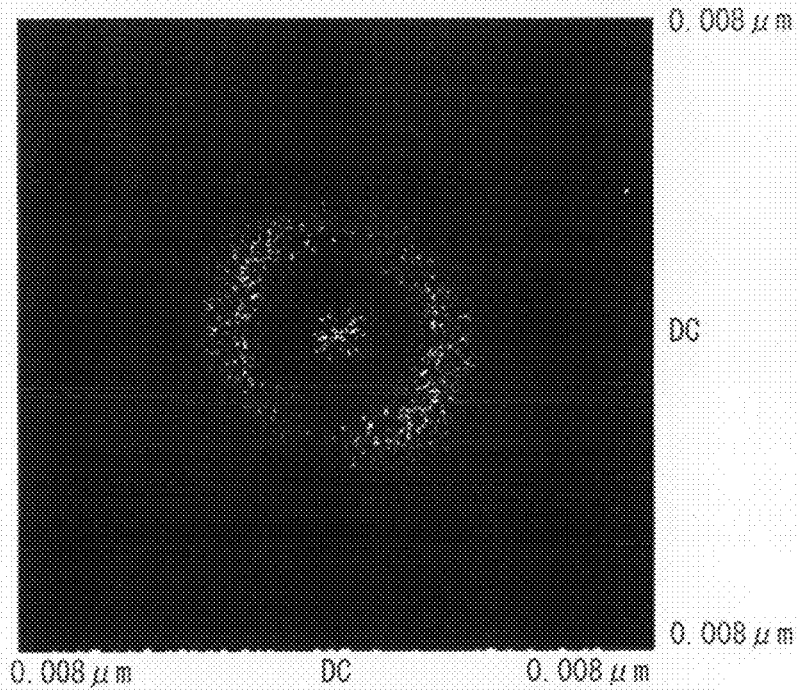
FIG. 26(a) is a drawing illustrating a spectrum obtained by subjecting the result of measurement with AFM of fine particles in Example 6 to 2-D Fourier conversion.
FIG. 26(b) is a drawing illustrating a power spectrum density obtained by subjecting the result of measurement with AFM of fine particles in Example 6 to 2-D Fourier conversion.
Figure 26:
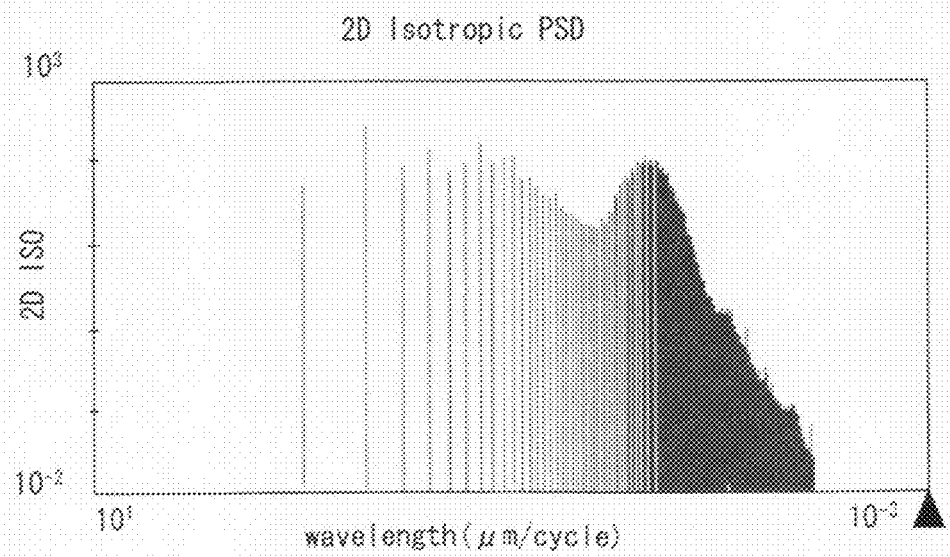

FIG. 25 illustrates the result of observation with AFM of the surface of the sample of the present Example. FIGS. 26(a) and 26(b) illustrate the results of obtaining 2-D spectrum and 2-D power spectrum density, respectively, of the sample based on the observation with AFM.

FIG. 25 is an oblique drawing illustrating the result of observing the surface of the sample in the scanning range of 300 nm square. The surface of the prepared sample had maximum vertical interval of 6.4 nm and arithmetic mean roughness Ra of 0.74 nm in the scanning range of 1 μm square. Fine particles were seen to be formed while isolated from each other.

The 2-D spectrum illustrate in FIG. 26(a) shows a ring-shaped bright portion in the range of frequency corresponding to the range of 13 nm to 38 nm. This indicates that the concavities and convexities formed in the present Example had high periodicity in the extreme narrow range of 13 nm to 38 nm.

On the other hand, the power spectrum density in FIG. 26(b) shows a clear peak in the range of 13 nm to 38 nm, and the position where the peak was the highest was at 23 nm.

From the above results, it was confirmed that the concavities and convexities produced in the present example had high periodicity in the extremely narrow range of 13 nm to 38 nm, and it was confirmed that when the surface of the substrate 104 was made of a material (Si in the present Example) that can be combined with the material (Ta in the present Example) for the supply source 103 to produce a compound, it was possible to form concavities and convexities with high periodicity in nano order.

In a case of forming on the surface of the substrate 104 a thin film made of a material that can be combined with the material for the supply source 103 to produce a compound, it is necessary to be taken into consideration that the surface of the substrate 104 is etched by application of a high-frequency voltage. Specifically, the thin film formed on the surface of the substrate 104 is set to have a thickness larger than the thickness etched from the substrate 104 during the process of forming concavities and convexities. This prevents the thin film from being removed completely by etching and thus prevents a base material from being exposed in the process of forming the concavities and convexities.

In the present Example, a Si monocrystalline target to which B was doped and which had a resistivity of 0.1 Ωcm or less was used in the present Example. However, the target material is not limited to this as long as the target material allows formation of concavities and convexities with high periodicity. The target material may contain different amounts of different additives, or may have no additive. Further, since a film formed through sputtering is not a monocrystalline, the target material is not necessarily a monocrystalline.

In the present Example, an explanation was made as to a case where a Si film was formed on the thermally oxidized Si wafer. In addition to this case, also in the cases of forming a Si film on a $SiO_2$ substrate, barium borosilicate glass substrate, and a polycarbonate substrate, formation of fine particles (concavities and convexities) with high periodicity was confirmed.

The above results show that when forming fine particles (concavities and convexities) with high periodicity, the base material for the substrate 104 is not particularly limited, and the kind of the material formed on the surface of the substrate 104 (formed in the range that is approximately several ten nm away from the surface in a depth direction) is important. Further, in view of the fact that fine particles (concavities and convexities) with high periodicity were obtained even when the non-conductive material was used as the base material for the substrate 104, the substrate supporter 102 is not necessarily required to be electrically connected with the substrate 104.

Further, although heating of the substrate and cooling of the substrate were not performed in the present Example, the heating of the substrate or the cooling of the substrate may be performed in order to adjust the size of a resulting fine particle or the distance between resulting fine particles.

Example 7

Example 7 shows a case where fine particles (concavities and convexities) with high periodicity were produced with use of the fine particle forming device including the blocking member 208 in Second Embodiment (FIG. 6).

In the present Example, the vacuum chamber 101 whose ultimate vacuum was $5 \times 10^{-5}$ Pa was used and the substrate supporter 102 was a stainless steel as in Example 1. A film of 30 nm in thickness made of MgO that was a material hard to be sputtered was formed on the surface of the substrate supporter 102 by a sputtering device beforehand, so that atoms etc. were hard to be supplied from the substrate supporter 102 to the substrate 104 in applying a high-frequency voltage.

The MgO film was formed on the whole area of the surface of the substrate 104 to which surface the substrate 104 was to be attached. As in Example 1, the substrate 104 was a P-type Si wafer (plane direction (100)) to which B was doped. The substrate 104 had a diameter of 76 mm, and was fixed by a spring member onto the substrate supporter 102 with the MgO thin film formed thereon. A sputtering target material that was the supply source 203 was Ta of 152 mm in diameter. The supply source 203 was positioned to face the substrate 104 and the distance between the supply source 203 and the substrate 104 was set to 160 mm. The blocking member 208 was a stainless disc of 216 mm in diameter and 3 mm in thickness, and was positioned on a line connecting the supply source 203 and the substrate 104 in such a manner as to be away form the supply source 203 by 30 mm and to face the supply source 203. The blocking member 208 was electrically grounded.

With the positioning, atoms etc. (Ta) ejected from the supply source 203 through sputtering was prevented from being directly and linearly incident to the substrate 104, so that atoms etc. that were diffused due to collision with inert gas in film-formation atmosphere or other atoms etc. from the supply source 203 or atoms etc. with low energy that were diffused or diffracted due to collision with the blocking member 208 reach the substrate 104.

Inert gas to be introduced to the vacuum chamber 101 in forming fine particles was Ar gas, and pressure at the time of the introduction of the Ar gas was set to $8.6 \times 10^{-2}$ Pa. As in Example 1, the high-frequency power source 105 was a power source whose frequency was 13.56 MHz and which could apply an electric power of 1 kW or less. When applying a high-frequency voltage from the high-frequency power source 105 to the substrate supporter 102, as illustrated in FIG. 6, an end of the high-frequency power source 105 which end was opposite to the substrate supporter 102 was electrically grounded and was connected with the side wall of the vacuum chamber 101 to have the same potential, and control was performed so that a radiated electric power was constant.

In the present Example, application of a high-frequency voltage was performed so that a radiated electric power was 200 W. Since the surface of the substrate supporter 102 to which surface the substrate 104 was attached had a diameter of 550 mm, the size of the radiated electric power per unit area was 0.08 W/cm². Further, the adjustor 106 made adjustment so that a reflected electric power was 5 W or less. As a result, while forming concavities and convexities, Vdc and Vpp varied in the range of −70 to −140V and in the range of 820 to 850V, respectively. These ranges indicate states where the applied high-frequency voltage varied positively and negatively with respect to a ground voltage.

The high-frequency voltage was applied for 600 seconds continuously. A DC sputtering power source was electrically connected with the supply source 203 and an electric power of 450 W was supplied to the supply source 203 to apply the above high-frequency voltage, so that the Ta target was sputtered for 600 seconds. Since the Ta target had a diameter of 152 mm, an electric power per unit area supplied to the target was 2.5 W/cm$^2$. The distance between the surface of the substrate supporter 102 to which surface the substrate 104 was attached and the wall of the vacuum chamber 101 facing the surface was set to 200 mm.

Figure 27:
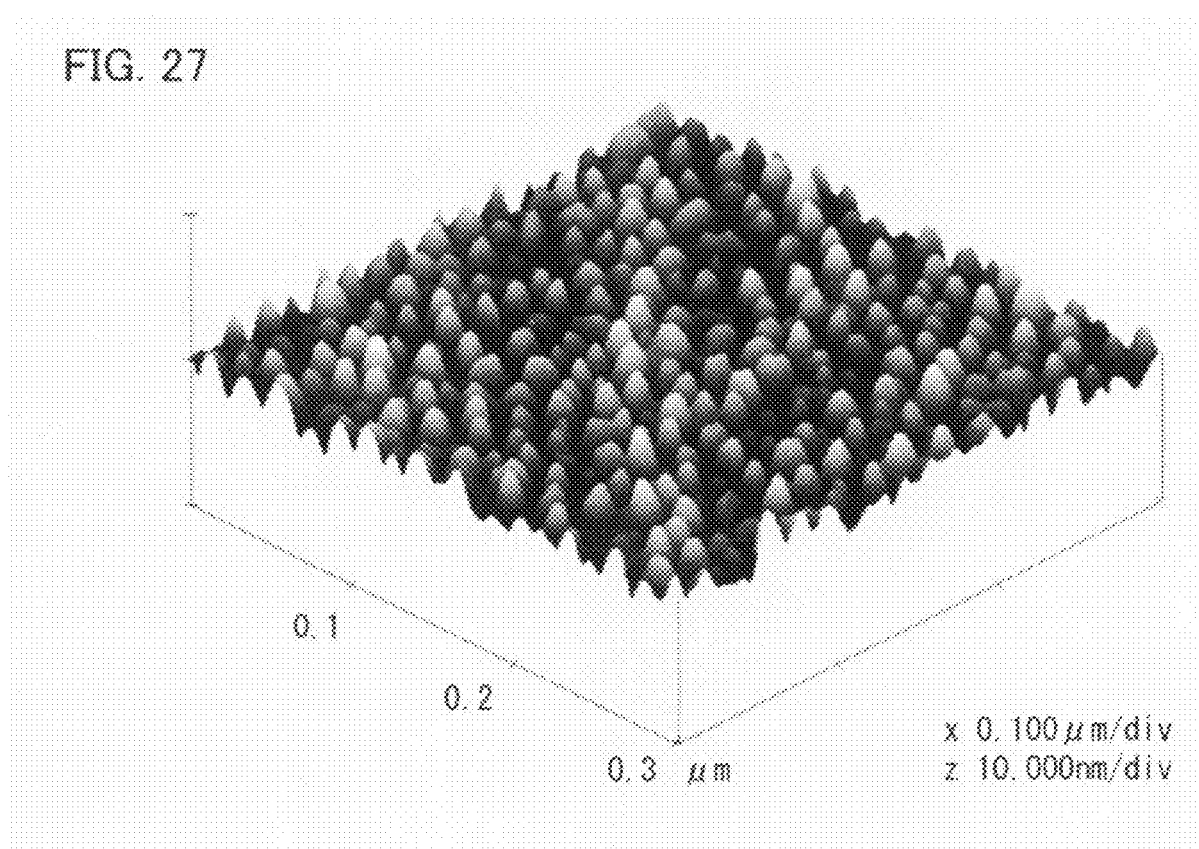
FIG. 27 is a drawing illustrating an image obtained by observation with AFM of fine particles in Example 7 that are formed through the method of the present embodiment for forming fine particles.

FIG. 27 illustrates the result of observation with AFM of the surface of the substrate 104 on which fine particles (concavities and convexities) were formed through the method of the present Example, in the range of 300 nm square.

As illustrated in FIG. 27, the method in the present Example provides a surface where fine particles with periodicity were arrayed. The maximum vertical interval was 7.3 nm and arithmetic mean roughness Ra was 0.70 nm in the scanning range of 1 µm square. The fine particles were seen to be formed while being isolated.

Figure 28:
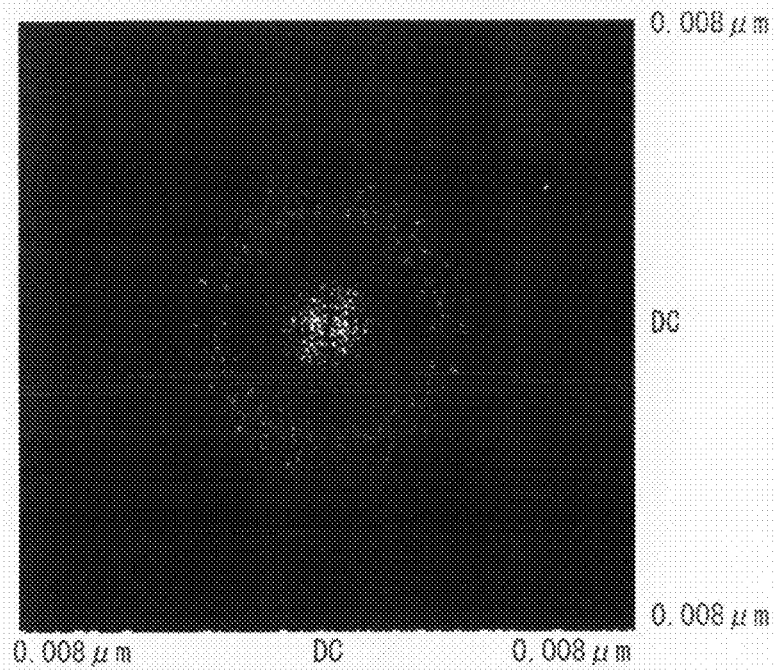
FIG. 28(a) is a drawing illustrating a spectrum obtained by subjecting the result of measurement with AFM of fine particles in Example 7 to 2-D Fourier conversion.
FIG. 28(b) is a drawing illustrating a power spectrum density obtained by subjecting the result of measurement with AFM of fine particles in Example 7 to 2-D Fourier conversion.
Figure 28:
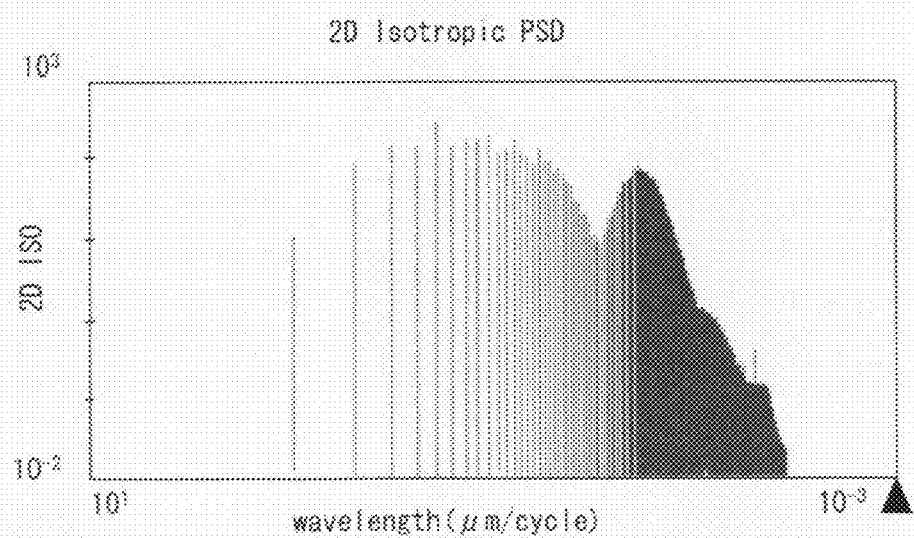

FIGS. 28(a) and 28(b) illustrate spectrum (FIG. 28(a)) and power spectrum density graph (FIG. 28(b)), respectively, obtained by subjecting the result of observation with AFM of the sample in FIG. 27 (scanning range: 1 µm) to 2-D Fourier conversion in order to confirm periodicity of the produced fine particles (concavities and convexities) in a direction perpendicular to the surface of the substrate.

The result of FIG. 28(a) showed a ring-shaped bright portion in the range of frequency corresponding to the range of 11 nm to 31 nm, indicating that the concavities and convexities produced through the present Example had high frequency in the extremely narrow range of 11 nm to 31 nm.

On the other hand, the power spectrum density in FIG. 28(b) shows a clear peak in the range of 11 nm to 31 nm, and the position where the peak was the highest was at 20 nm. From the above results, it was confirmed that the fine particles (concavities and convexities) produced in the present Example had high frequency in the extremely narrow range of 11 nm to 31 nm.

Further, although heating of the substrate and cooling of the substrate were not performed in the present Example, the heating of the substrate or the cooling of the substrate may be performed in order to adjust the size of a resulting fine particle or the distance between resulting fine particles.

Example 8

Example 8 shows a case where fine particles (concavities and convexities) with high periodicity were produced with use of the fine particle forming device in Third Embodiment (FIG. 7).

In the present Example, the vacuum chamber 101 whose ultimate vacuum was 5×10$^{-5}$ Pa was used and the substrate supporter 102 was a stainless steel as in Example 1. A film of 30 nm in thickness made of MgO that was a material hard to be sputtered was formed on the surface of the substrate supporter 102 by a sputtering device beforehand, so that atoms etc. were hard to be supplied from the substrate supporter 102 to the substrate 104 in applying a high-frequency voltage. The MgO film was formed on the whole area of the surface of the substrate 104 to which surface the substrate 104 was to be attached.

As in Example 1, the substrate 104 was a P-type Si wafer (plane direction (100)) to which B was doped. The substrate 104 had a diameter of 76 mm, and was fixed by a spring member onto the substrate supporter 102 with the MgO thin film formed thereon. A sputtering target material that was the supply source 203 was Ta of 152 mm in diameter. The supply source 203 and the substrate 104 were positioned in such a manner that the surface of the supply source 203 and the surface of the substrate 104 faced each other and that the angle θ in FIG. 7 was 55 degrees. The distance between the supply source 203 and the substrate supporter 102 was set to 160 mm.

Inert gas to be introduced to the vacuum chamber 101 in forming fine particles was Ar gas, and pressure at the time of the introduction of the Ar gas was set to 1.7×10$^{-2}$ Pa.

As in Example 1, the high-frequency power source 105 was a power source whose frequency was 13.56 MHz and which could apply an electric power of 1 kW or less. As illustrated in FIG. 7, when applying a high-frequency voltage from the high-frequency power source 105 to the substrate supporter 102, an end of the high-frequency power source 105 which end was opposite to the substrate supporter 102 was electrically grounded and was connected with the side wall of the vacuum chamber 101 to have the same potential, and control was performed so that a radiated electric power was constant.

In the present Example, application of a high-frequency voltage was performed so that a radiated electric power was 400 W. Since the surface of the substrate supporter 102 to which surface the substrate 104 was attached had a diameter of 550 mm, the size of the radiated electric power per unit area was 0.17 W/cm$^2$. Further, the adjustor 106 made adjustment so that a reflected electric power was 5 W or less. As a result, while forming fine particles (concavities and convexities), Vdc and Vpp varied in the range of –259 to –300V and in the range of 1000 to 1080V, respectively. These ranges indicate states where the applied high-frequency voltage varied positively and negatively with respect to a ground voltage.

The high-frequency voltage was applied for 300 seconds continuously. A DC sputtering power source was electrically connected with the supply source 203 and an electric power of 20 W was supplied to the supply source 203 to apply the above high-frequency voltage, so that the Ta target was sputtered for 300 seconds. Since the Ta target had a diameter of 152 mm, an electric power per unit area supplied to the target was 0.11 W/cm$^2$. The distance between the surface of the substrate supporter 102 to which surface the substrate 104 was attached and the wall of the vacuum chamber 101 facing the surface was set to 200 mm.

Figure 29:
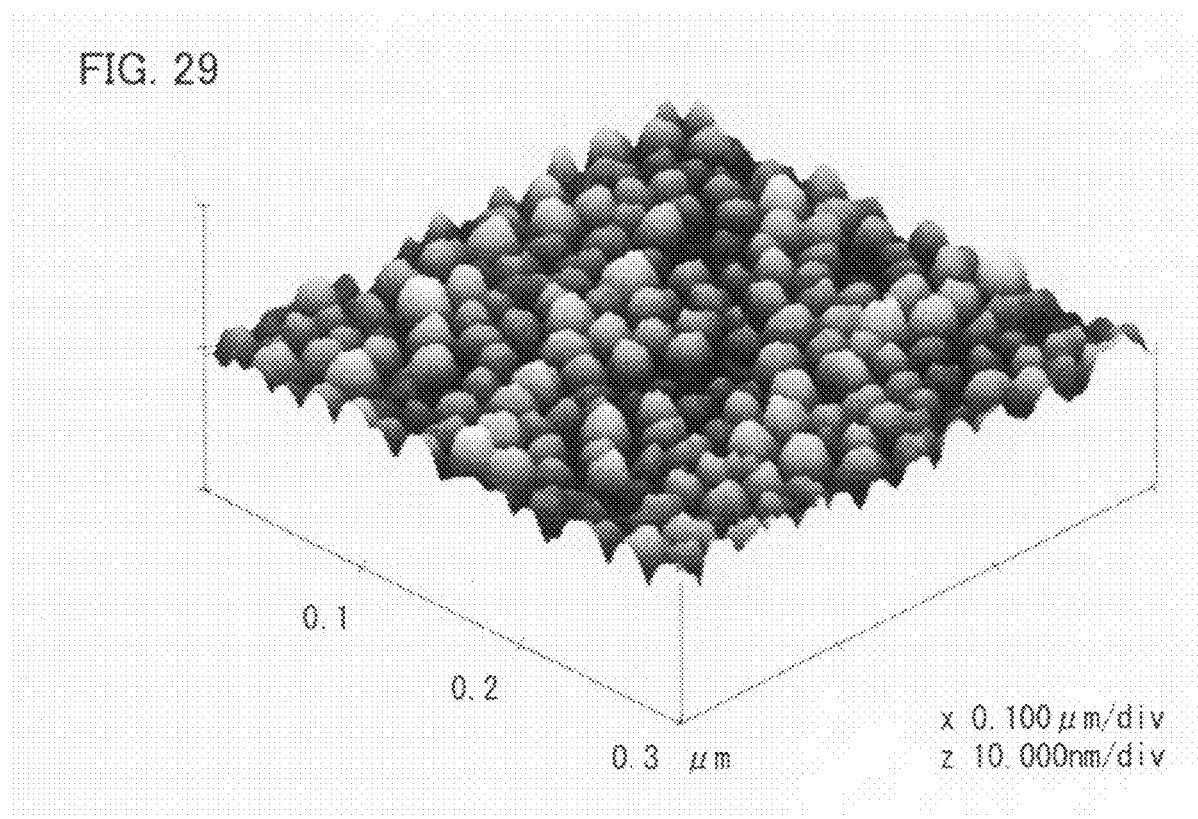
FIG. 29 is a drawing illustrating an image obtained by observation with AFM of fine particles in Example 8 that are formed through the method of the present embodiment for forming fine particles.

FIG. 29 illustrates the result of observation with AFM of the surface of the substrate 104 on which fine particles (concavities and convexities) were formed through the method of the present Example, in the range of 300 nm square.

As illustrated in FIG. 29, the method in the present Example provides a surface where fine particles with periodicity were arrayed. The maximum vertical interval was 5.7 nm and arithmetic mean roughness Ra was 0.63 nm in the scanning range of 1 µm square. The fine particles were seen to be formed while being isolated.

Figure 30:
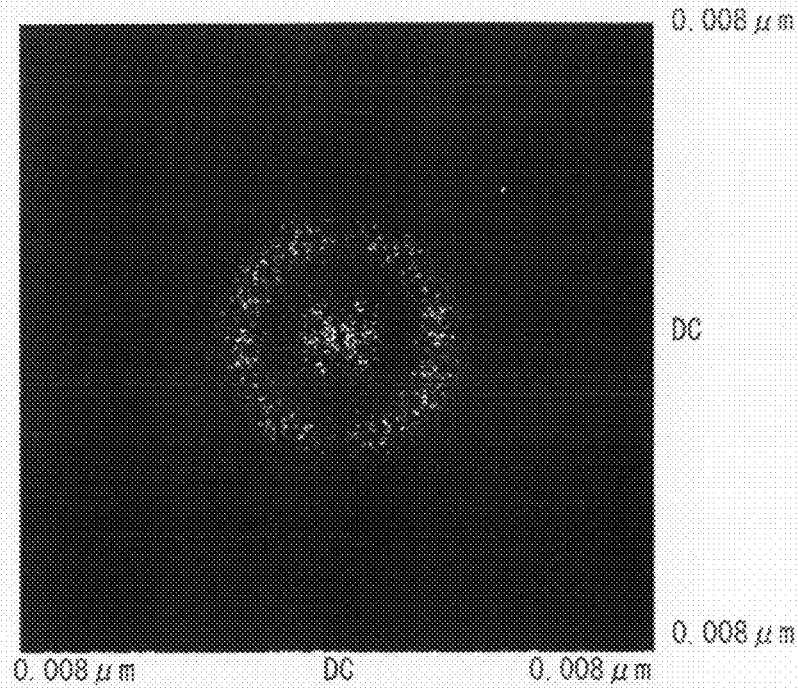
FIG. 30(a) is a drawing illustrating a spectrum obtained by subjecting the result of measurement with AFM of fine particles in Example 8 to 2-D Fourier conversion.
FIG. 30(b) is a drawing illustrating a power spectrum density obtained by subjecting the result of measurement with AFM of fine particles in Example 8 to 2-D Fourier conversion.
Figure 30:
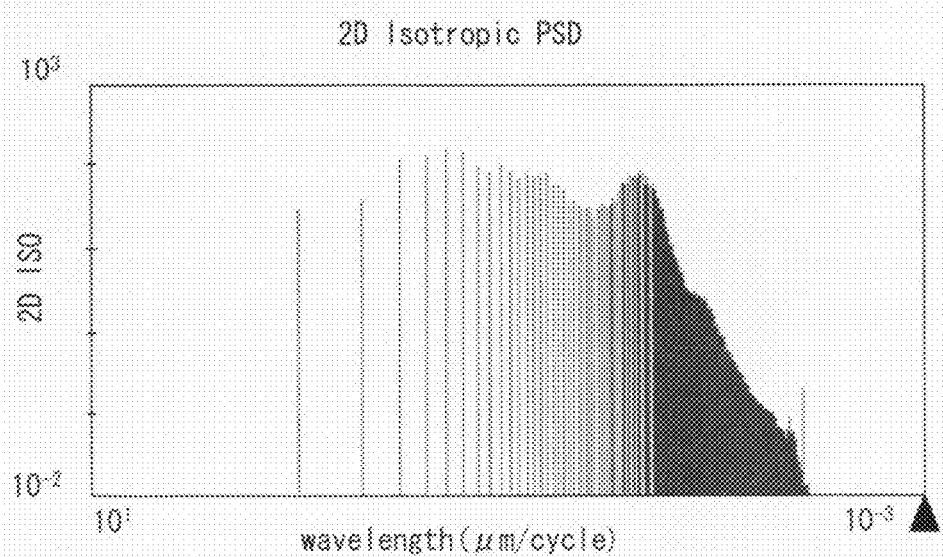

FIGS. 30(a) and 30(b) illustrate spectrum (FIG. 30(a)) and power spectrum density graph (FIG. 30(b)), respectively, obtained by subjecting the result of observation with AFM of the sample in FIG. 29 (scanning range: 1 µm) to 2-D Fourier conversion in order to confirm periodicity of the produced fine particles (concavities and convexities) in a direction parallel to the surface of the substrate.

The result of FIG. 30(a) showed a ring-shaped bright portion in the range of frequency corresponding to the range of 15 nm to 38 nm, indicating that the fine particles (concavities and convexities) produced through the present Example had high frequency in the extremely narrow range of 15 nm to 38 nm. Further, the ring-shape indicates that the fine particles were positioned anisotropically with respect to a direction parallel to the surface of the substrate.

On the other hand, the power spectrum density in FIG. 30(b) shows a clear peak in the range of 15 nm to 38 nm, and the position where the peak was the highest was at 25 nm.

From the above results, it was confirmed that the fine particles (concavities and convexities) produced in the present Example had high frequency in the extremely narrow range of 15 nm to 38 nm.

Further, although heating of the substrate and cooling of the substrate were not performed in the present Example, the heating of the substrate or the cooling of the substrate may be performed in order to adjust the size of a resulting fine particle or the distance between resulting fine particles.

Example 9

Example 9 shows an example in which the angle θ formed by (i) a line connecting an end of the supply source 203 which end was closest to the substrate 104 and an end of the substrate 104 which end was closest to the supply source 203 and (ii) a line extending from the surface of the supply source 203 in Third Embodiment was changed. Specifically, in the fine particle forming device 31 in FIG. 7, the position of the substrate 104 was changed on a line extending from the surface of the substrate 104 (i.e., the substrate 104 was moved in a parallel manner), thereby changing the angle θ. The same operation was performed as in Example 8 except for the change of the position of the substrate 104.

When the angle θ was more than 55 degrees, although the prepared sample had concavities and convexities on its surface, particles grown on the substrate 104 were coupled with each other, so that the particles were randomly connected with each other to have an elongated shape in a plane direction of the substrate 104. A power spectrum density graph obtained by subjecting the result of observation with AFM (scanning range: 1 μm) in this case to 2-D Fourier conversion did not show a clear peak, indicating that high periodicity was not obtained.

The reason seems to be as follows. Since atoms etc. (Ta) were directly supplied from the supply source 203 to the substrate 104, atoms etc. having reached the substrate 104 had excessively large movement energy, which caused fine particles formed on the substrate 104 to collide with adjacent fine particles, and these fine particles were coupled with each other irregularly.

On the other hand, when the angle θ ranged from 25 to 55 degrees, the power spectrum density graph showed a clear peak as in the result of Example 8. Thus, it was confirmed that fine particles (concavities and convexities) with high periodicity were formed. Further, particles were seen to be formed while being isolated from each other.

In the device used in the above experiment, the angle θ could not be made smaller than 25 degrees due to the structure of the device. Note that even when the angle θ is made further smaller, it is possible to form fine particles (concavities and convexities) with high periodicity by adjusting an electric power to be supplied to the supply source 203 according to necessity.

Example 10

Examples 1 to 9 showed examples in which the material for the surface of the substrate 104 was Si and the material to be supplied (supply source 103 or 203) was Ta. Materials other than Si and Ta can yield similar results if the materials are selected so that the materials are likely to be combined with each other to produce a compound and allow formation of fine particles in nano meter order on the substrate. In the present Example, combinations of materials applicable to First to Third Embodiments are explained.

Figure 31:
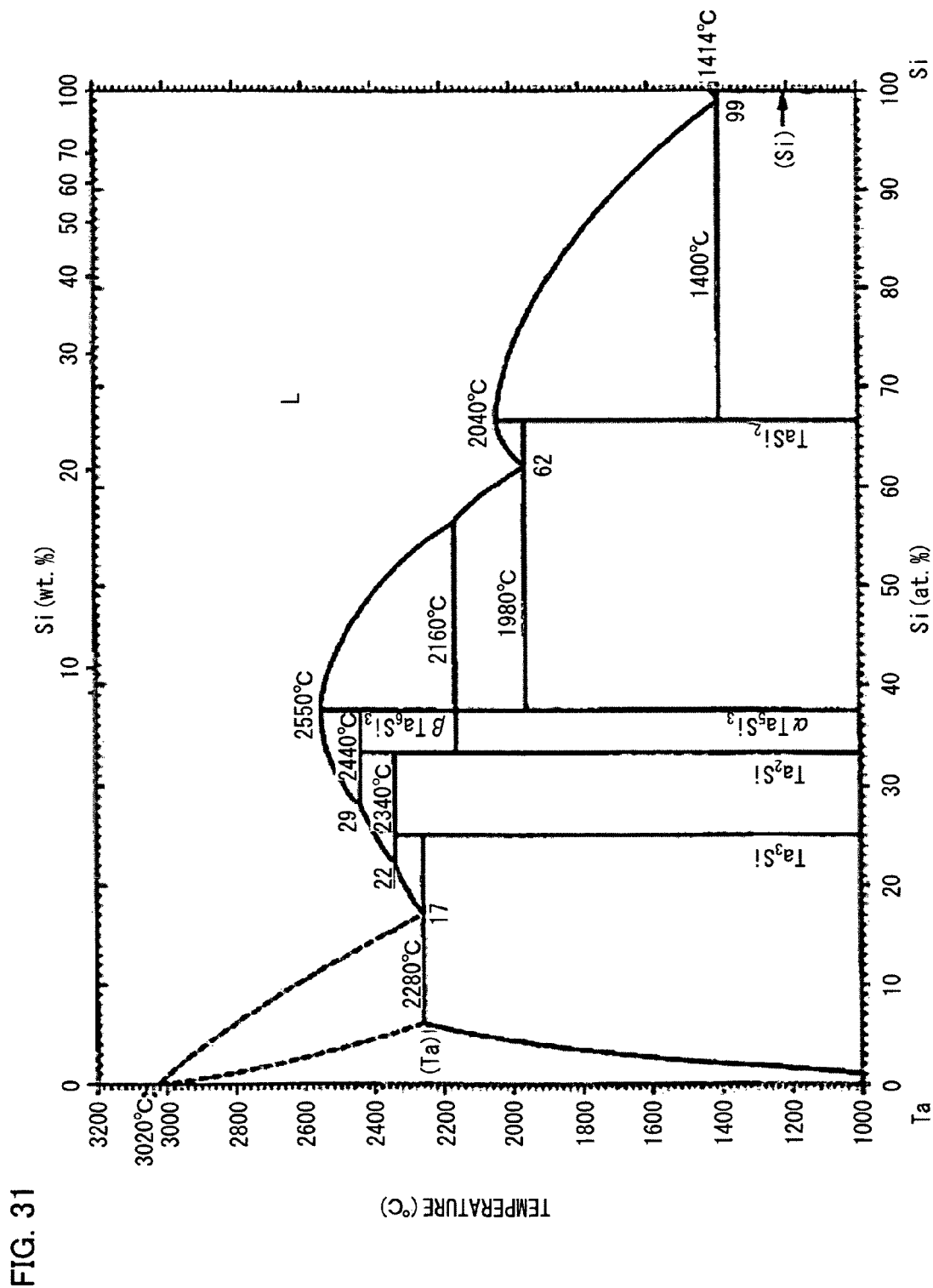
FIG. 31 is a binary phase diagram of Ta and Si.
Figure 32:
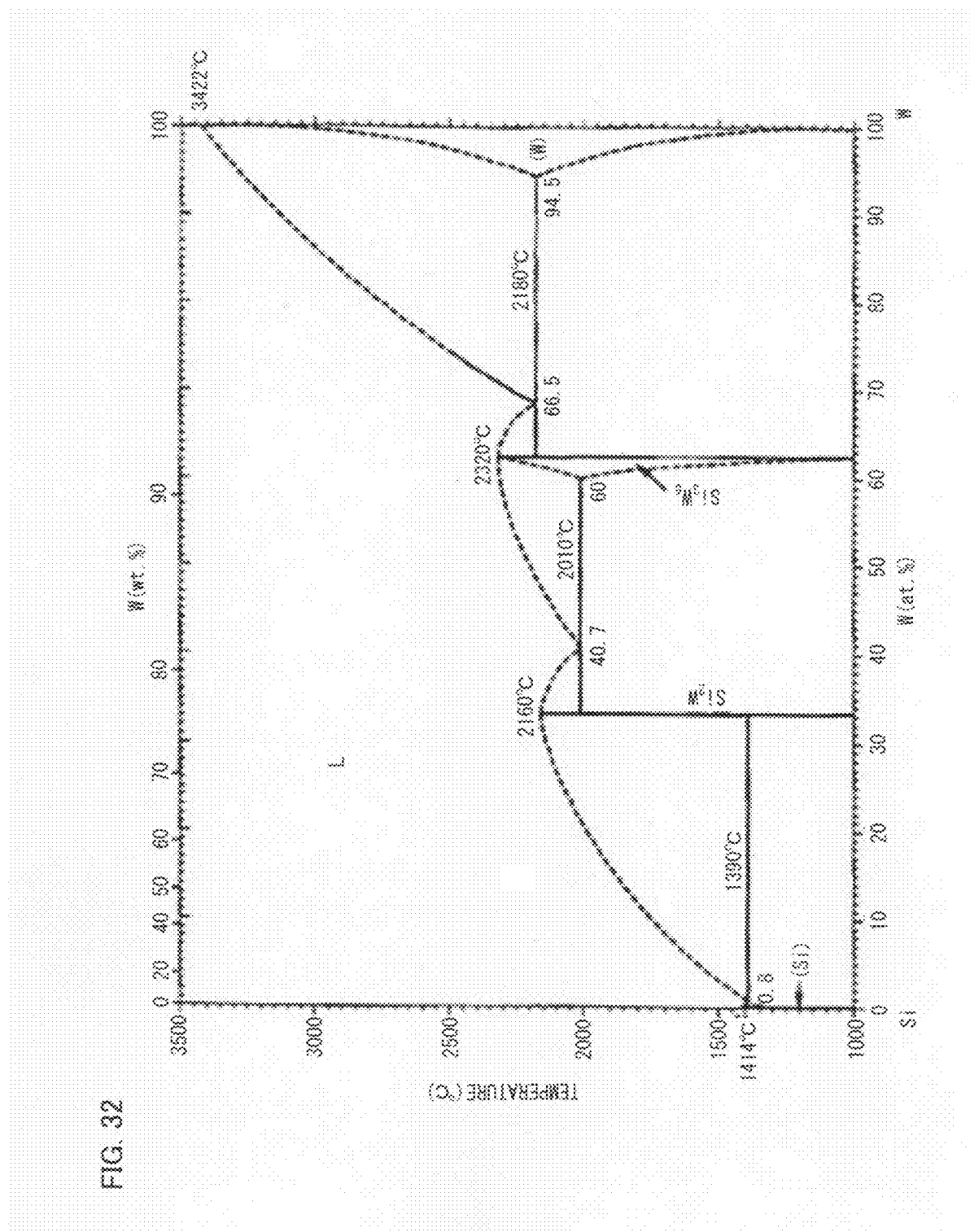
FIG. 32 is a binary phase diagram of Si and W.
Figure 33:
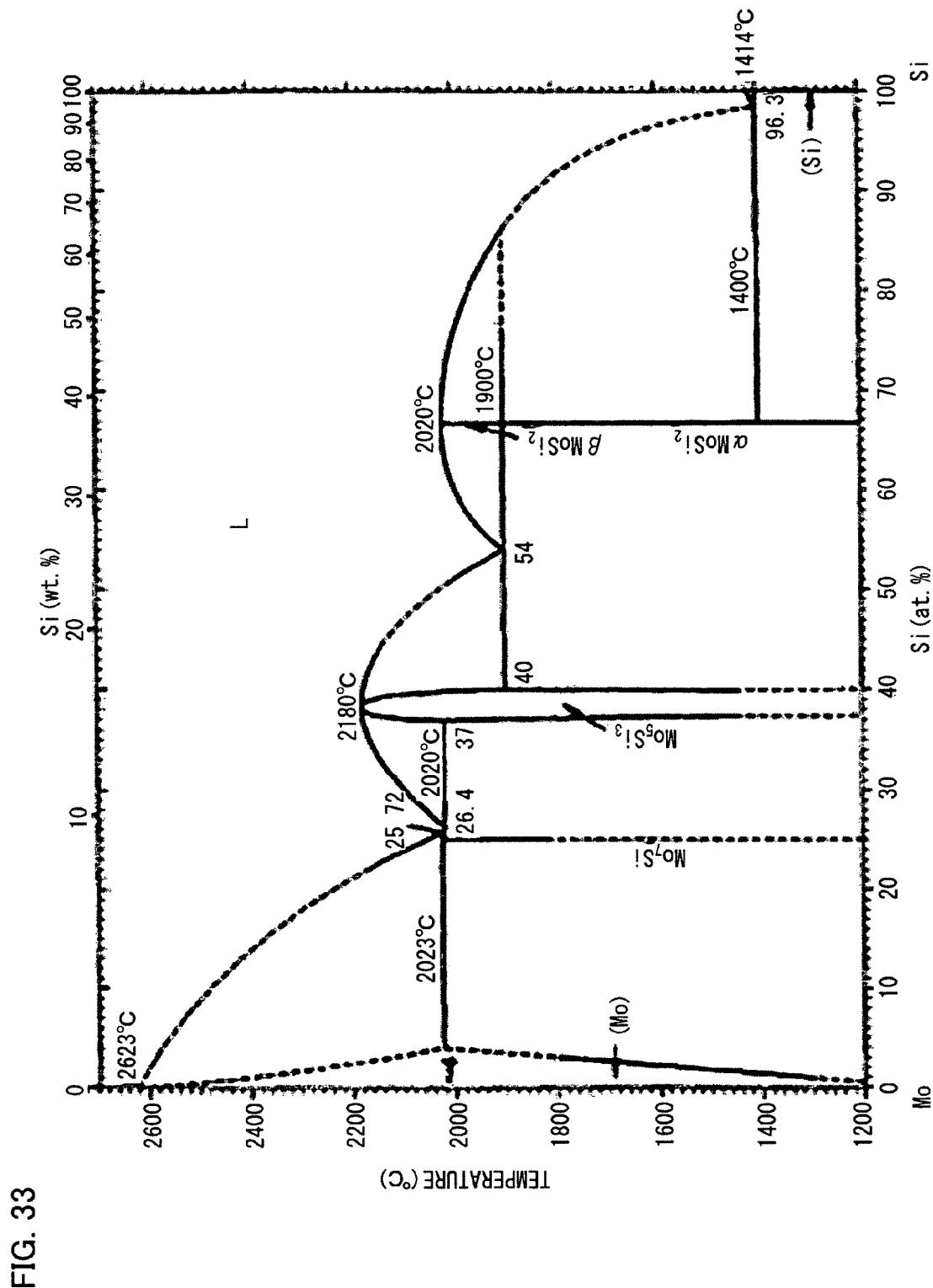
FIG. 33 is a binary phase diagram of Mo and Si.

FIGS. 31 to 33 illustrate binary alloy phase diagrams of examples of materials applicable to First to Third Embodiments (Binary Alloy Phase Diagrams Second Edition Volume 3, 1990, ASM)

FIG. 31 illustrates a binary alloy phase diagram of Si and Ta used in Examples 1 to 9. FIG. 32 illustrates a binary alloy phase diagram of Si and W. FIG. 33 illustrates a binary alloy phase diagram of Si and Mo.

As is evident from FIG. 31, the combination of Si and Ta used in Examples 1 to 9 is likely to produce a compound since the combination allows formation of a compound in a wide composition range while changing the ratio of Si to Ta.

Further, FIGS. 32 and 33 show that the combination of Si and W and the combination of Si and Mo can produce a compound in a wide composition range. In addition to these combinations, the binary alloy phase diagrams in the above document show that a compound is likely to be produced when Si is replaced with Ge or Al or when Ta, W, or Mo is replaced with a material belonging to the same group in the periodic table as Ta, W, or Mo belongs to or belonging to a group adjacent to the group to which Ta, W, or Mo belongs.

The combination that is likely to produce a compound preferably include, but is not limited to, a combination of a material mainly containing an element belonging to groups 3 to 6 in the periodic table and a material mainly containing an element belonging to groups 13 to 15. Further, in order to increase unfamiliarity with the surface of the substrate 104, it is generally desirable that the produced compound has a high melting point and a difference in temperature between the melting point of the produced compound and the melting point of the material (element) constituting the surface of the substrate 104 is large.

In view of the above, it is particularly desirable that the material for the supply source 103 (203) is a material mainly containing an element selected from V, Cr, Zr, Nb, Mo, Hf, Ta, and W that are materials with high melting points belonging to groups 3 to 6 or a material mainly containing alloys of these materials, and the material for the surface of the substrate 104 is a material mainly containing an element selected from Al, Si, and Ge or a material mainly containing alloys of these materials. The material for the supply source 103 (203) may be a compound between the aforementioned material suitable for the supply source 103 (203) and the aforementioned material suitable for the surface of the substrate 104.

Example 11

Example 11 shows the result of preparing a sample using Si and W for the substrate 104 and the supply source 103, respectively, which is an example of a combination of materials applicable to First to Third Embodiments.

In the present Example, the same operation as in Example 1 was performed except that the supply source 103 is made of W instead of Ta, ultimate vacuum of the vacuum chamber 101 was $8.5 \times 10^{-5}$ Pa, pressure at the time of introduction of Ar gas was $1.3 \times 10^{-1}$ Pa, and a radiated electric power of the high-frequency power source 105 was 100 W.

Figure 34:
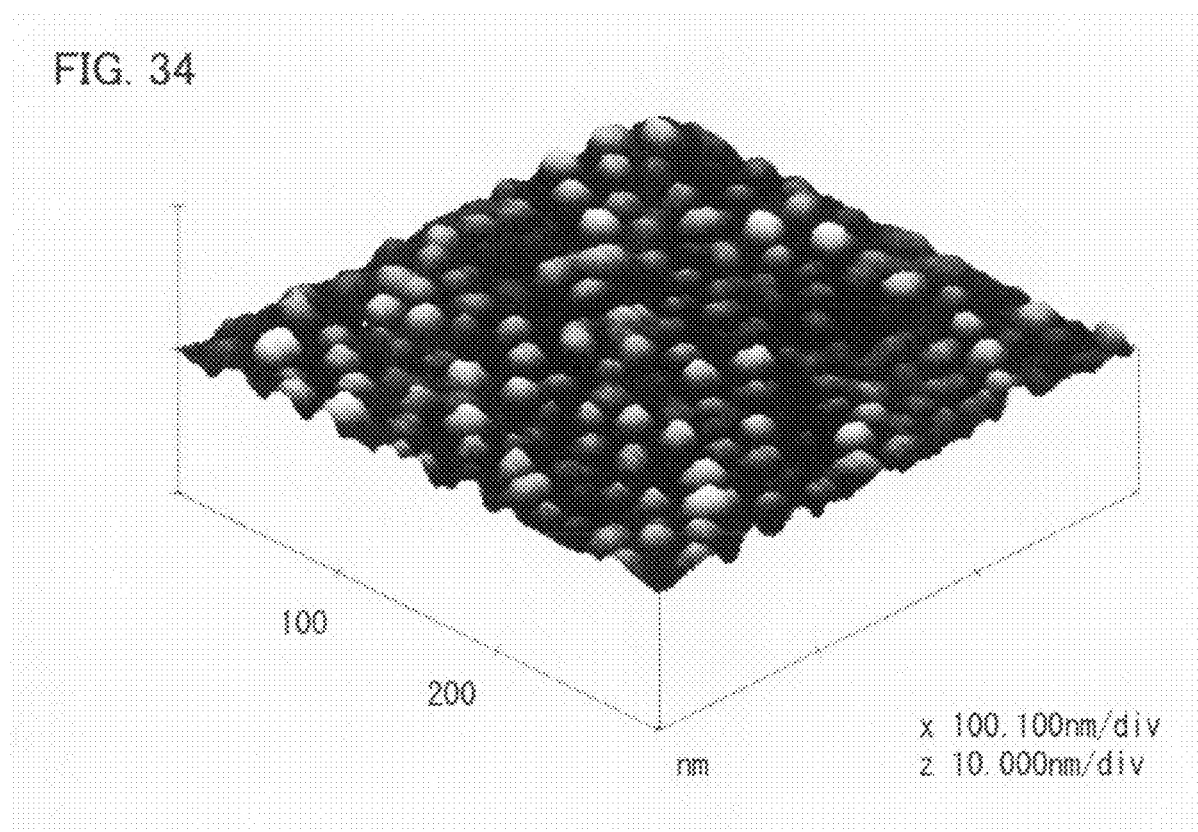
FIG. 34 is a drawing illustrating an image obtained by observation with AFM of fine particles in Example 11 that are formed through the method of the present embodiment for forming fine particles.

FIG. 34 illustrates the result of observation with AFM of the surface of the sample of the present Example in the scanning range of 300 nm square.

As illustrated in FIG. 34, when the supply source 103 is made of W, too, there is provided a surface where fine particles with periodicity were arrayed. The maximum vertical interval was 4.0 nm and arithmetic mean roughness Ra was 0.34 nm in the scanning range of 1 µm square. The fine particles were seen to be formed while being isolated.

Figure 35:
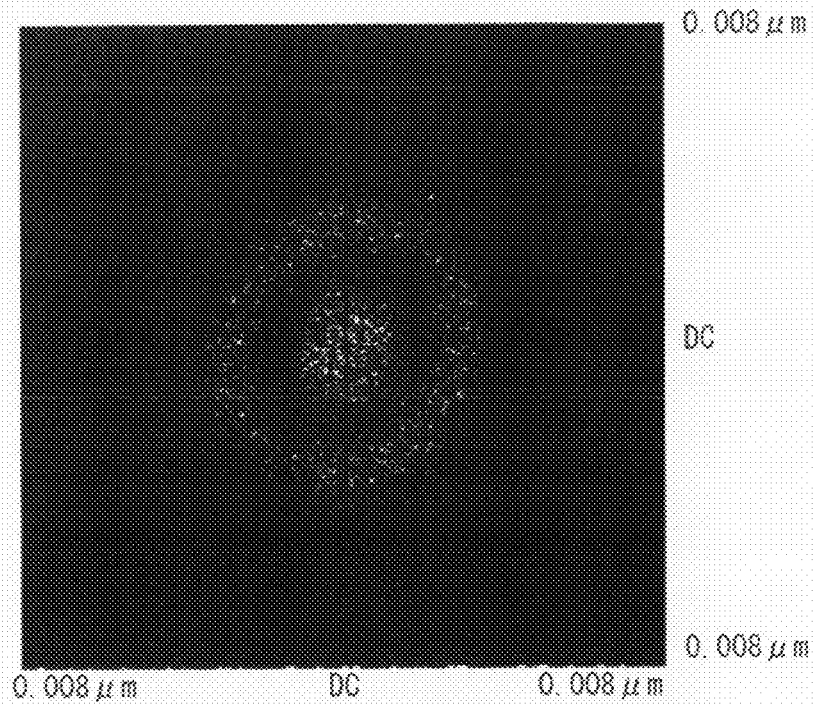
FIG. 35(a) is a drawing illustrating a spectrum obtained by subjecting the result of measurement with AFM of fine particles in Example 11 to 2-D Fourier conversion.
FIG. 35(b) is a drawing illustrating a power spectrum density obtained by subjecting the result of measurement with AFM of fine particles in Example 11 to 2-D Fourier conversion.
Figure 35:
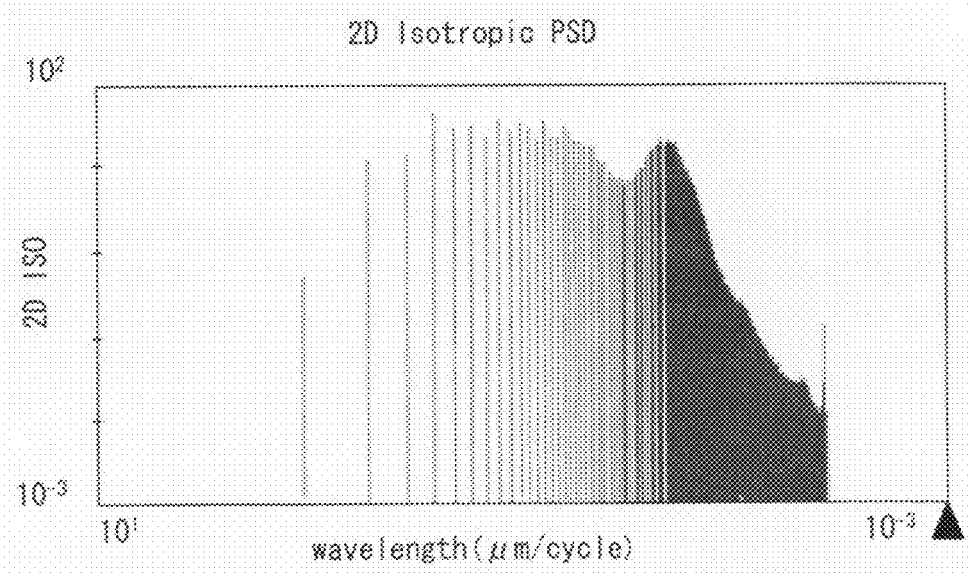

FIGS. 35(a) and 35(b) illustrate spectrum (FIG. 35(a)) and power spectrum density graph (FIG. 35(b)), respectively, obtained by subjecting the result of observation with AFM of the sample in FIG. 34 (scanning range: 1 µm) to 2-D Fourier conversion in order to confirm periodicity of the produced fine particles (concavities and convexities) in a direction parallel to the surface of the substrate.

The result of FIG. 35(a) showed a ring-shaped bright portion in the range of frequency corresponding to the range of 12 nm to 31 nm, indicating that the fine particles (concavities and convexities) produced through the present Example had high frequency in the extremely narrow range of 12 nm to 31 nm. Further, the ring shape indicates that the fine particles are arrayed anisotropically with respect to a direction parallel to the surface of the substrate.

On the other hand, the power spectrum density in FIG. 35(b) shows a clear peak in the range of 12 nm to 31 nm, and the position where the peak was highest was at 20 nm.

From the above results, it was confirmed that the fine particles (concavities and convexities) produced in the present Example had high frequency in the extremely narrow range of 12 nm to 31 nm.

It is known that W used for the supply source 103 in the present Example has a melting point of approximately 3387° C. and surface energy of W at 298K is approximately 3468 erg/cm$^2$.

On the other hand, it is known that Si used for the substrate 104 has a melting point of approximately 1414° C. and surface energy of Si at 298K is approximately 1107 erg/cm$^2$. In this manner, the combination of materials (elements) in the present Example is designed so that the material (element) for the supply source 103 has higher surface energy than the material (element) for the surface of the substrate 104, and fine particles formed on the substrate 104 exhibit unfamiliarity with the surface of the substrate 104.

Example 12

Example 12 shows an example in which a sample was prepared through a method for arraying fine particles in a line by forming steps in the substrate 104 beforehand.

In the present Example, the substrate 104 was a P-type Si wafer (plane direction (100)) to which B was doped as in Example 1. Steps were formed on the substrate 104 through photolithography and RIE (Reactive Ion Etching).

Specifically, a photoresist of 1 µm in thickness was applied on the substrate 104 and dried. Then, a line shape of 1 µm in width was exposed with use of a photolithography device whose light source was an Xe lamp. Then, the exposed line shape was developed, and the substrate 104 was attached to an RIE device where line-shaped steps were formed on the substrate 104 while masked by the resist in an atmosphere of a mixture gas between $CHF_3$ and $SF_6$. The steps formed on the substrate 104 had a height (depth) of approximately 15 nm, and an angle of inclination of a side wall with respect to a bottom surface was 16 degrees at its steepest point (i.e., the angle formed by the side wall and the bottom surface was 106 degrees).

Next, the substrate 104 on which the steps were formed was put in the vacuum chamber 101, fine particles were formed on the substrate 104 through the same method as the method in Example 1 for forming fine particles. Thus, concavities and convexities with high periodicity were obtained.

Figure 36:
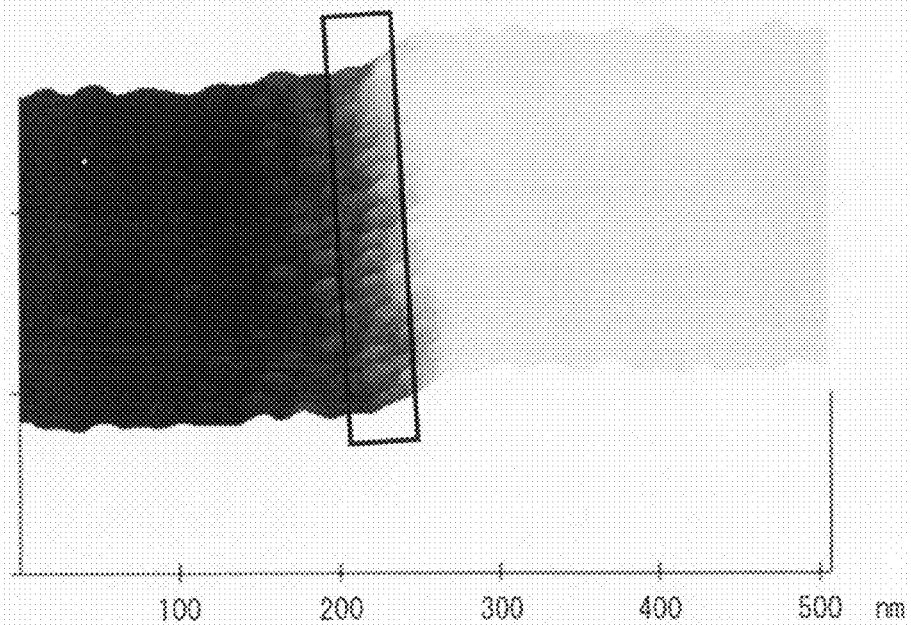
FIG. 36 is a drawing illustrating an image obtained by observation with AFM of fine particles in Example 12 that are arrayed through a method of Fourth Embodiment for arraying fine particles.

FIG. 36 illustrates an image obtained by observation with AFM of highly periodic concavities and convexities formed through the method of the present Example.

As is evident from FIG. 36, fine particles are arrayed in a line along the formed steps (the area surrounded by the rectangle in FIG. 36). Further, since such array was seen near the lower edge (bottom) of a step, the height (depth) of the step is not necessarily required to be 15 nm, and suffices to be approximately as high as a fine particle (approximately 3 nm). Further, a portion of the step near the lower edge (bottom) thereof, along which portion fine particles were arrayed, was inclined to the bottom surface at an angle of approximately 10 degrees. This indicates that the angle of the inclination being approximately 10 degrees suffices to array fine particles.

In the present Example, an explanation was made as to a case where steps whose concavities had a width of approximately 1 µm were formed. However, the width of concavities and the width of convexities may be as small as the diameter of a fine particle.

Example 13

Example 13 is an example in which the substrate 104 with highly periodic concavities and convexities formed thereon through the method of First Embodiment for forming fine particles was etched in the method of Example 5 so that the height (depth) of concavities and convexities of fine particles was increased.

In the present Example, a sample to be subjected to an etching treatment was the sample 4-3 in Example 4 (pressure of Ar gas in forming fine particles: $1.3 \times 10^{-2}$ Pa, radiated electric power: 300 W, time for applying high-frequency voltage: 900 seconds).

The sample 4-3 was put in a parallel plate RIE (Reactive Ion Etching) device, RF plasma was discharged in an atmosphere of mixture gas of $CHF_3$ and $SF_6$, and the concavities (substrate 104) of the concavities and convexities were anisotropically etched while masked by the convexities (fine particles).

In the present Example, the mixture ratio of $CHF_3$ gas to $SF_6$ gas was 1:2, and plasma was generated in the atmosphere of 5.0 Pa. A radiated electric power of an RF power source was 30 W, and the etching treatment was performed for 20 seconds with a reflected electric power being 1 W or less.

Figure 37:
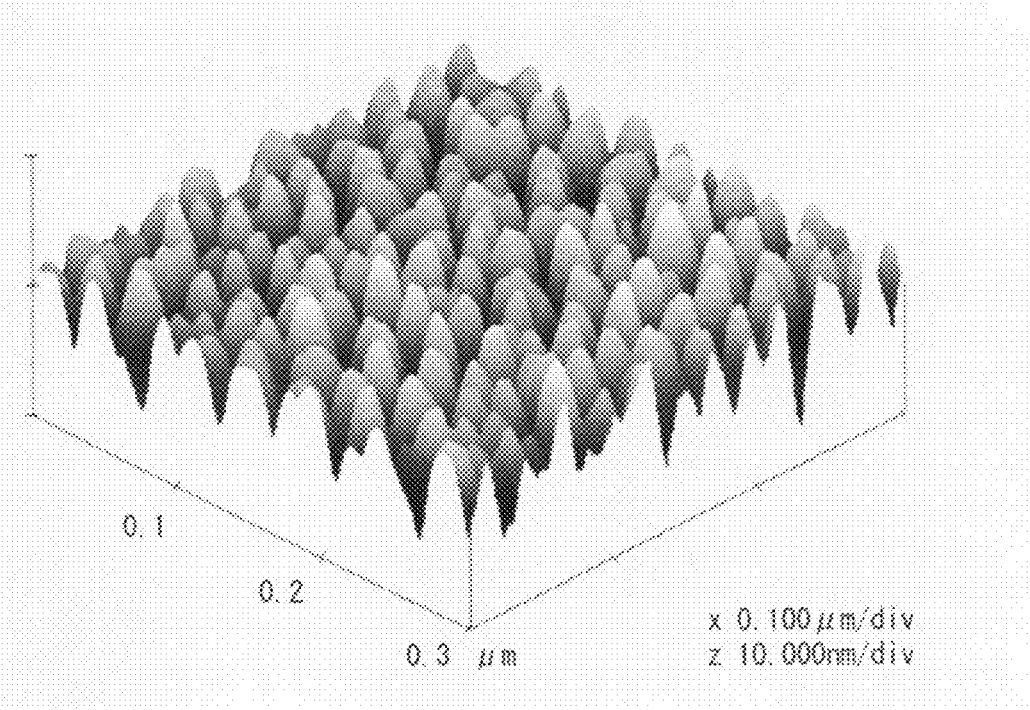
FIG. 37 is a drawing illustrating an image obtained by observation with AFM of concavities and convexities in Example 13 that result from etching through the etching method of Fourth Embodiment.

FIG. 37 illustrates the result of observation with AFM of the surface of the sample of the present Example in the scanning range of 300 nm square.

As illustrated in FIG. 37, the sample had periodic fine particles on its surface even after the etching treatment. The maximum vertical interval was 14.4 nm and arithmetic mean roughness Ra was 1.87 nm in the scanning range of 1 µm square, indicating that the concavities and convexities got higher (deeper) than those of the sample 4-3 before the etching treatment (maximum vertical interval was 7.2 nm and arithmetic mean roughness Ra was 0.70 nm). That is, it was confirmed that the concavities (material for the surface of the substrate 104) could be etched while masked by the convexities (formed fine particles).

Figure 38:
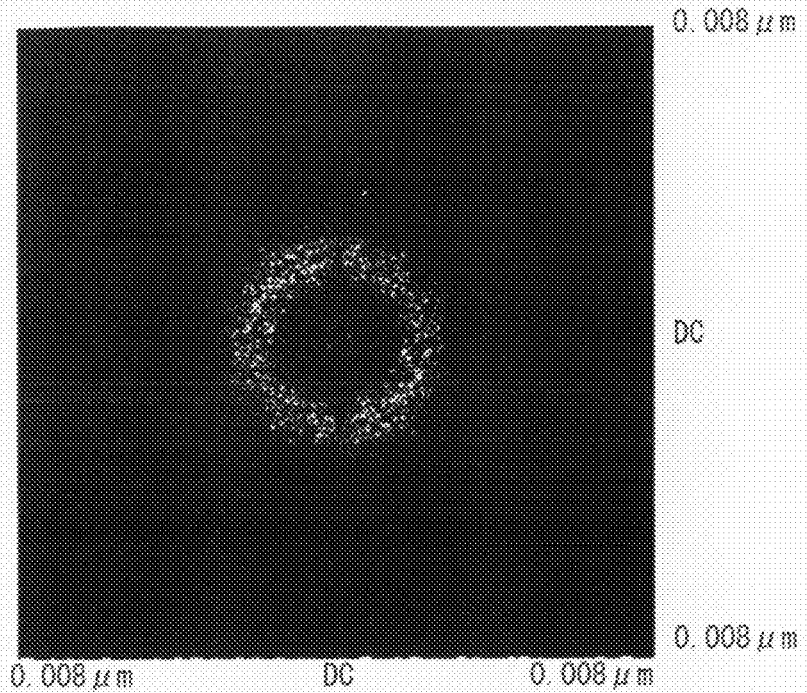
FIG. 38(a) is a drawing illustrating a spectrum obtained by subjecting the result of measurement with AFM of fine particles in Example 13 to 2-D Fourier conversion.
FIG. 38(b) is a drawing illustrating a power spectrum density obtained by subjecting the result of measurement with AFM of fine particles in Example 13 to 2-D Fourier conversion.
Figure 38:
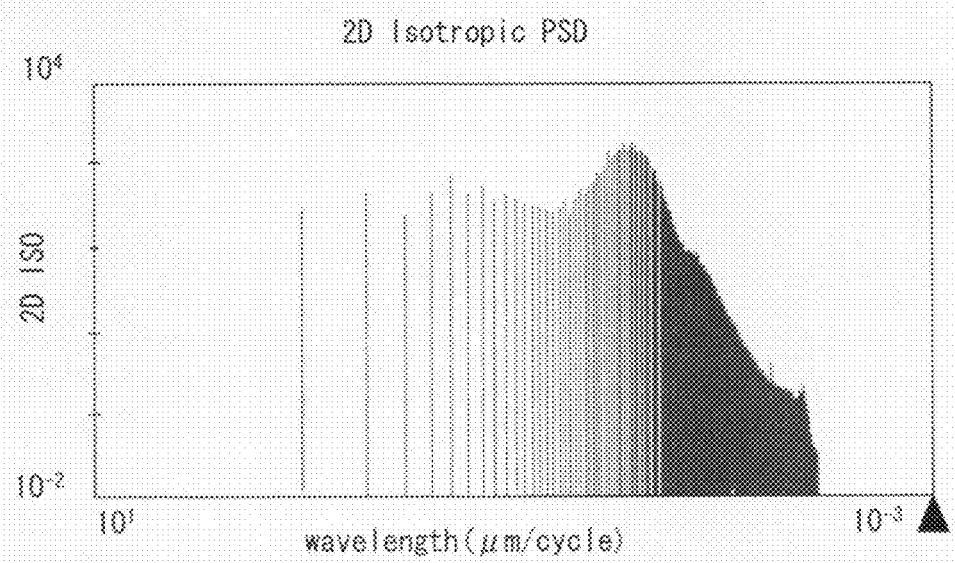

FIGS. 38(a) and 38(b) illustrate spectrum (FIG. 38(a)) and power spectrum density graph (FIG. 38(b)), respectively, obtained by subjecting the result of measurement with AFM of the sample after the etching treatment (scanning range: 1 µm) to 2-D Fourier conversion.

The result of FIG. 38(a) showed a ring-shaped bright portion in the range of frequency corresponding to the range of 16 nm to 45 nm, indicating that the concavities and convexities produced in the present Example had high frequency in the extremely narrow range of 16 nm to 45 nm. Further, the ring shape indicates that the fine particles are arrayed anisotropically with respect to a direction parallel to the surface of the substrate.

On the other hand, the power spectrum density in FIG. 38(b) shows a clear peak in the range of 16 nm to 45 nm, and the position where the peak was highest was at 29 nm. From the above results, it was confirmed that the fine particles (concavities and convexities) produced in the present Example had high frequency in the extremely narrow range of 16 nm to 45 nm.

Further, the angle of inclination of the side wall of the convexity to the surface of the substrate 104 was obtained based on the result of the observation with AFM. As a result, it was confirmed that in the sample 4-3, the angle was 30 degrees at the steepest inclination, whereas in the sample after the etching treatment in the present Example, the angle was 58 degrees, which was larger than that of the sample 4-3. In this manner, by etching the concavities (material for the surface of the substrate 104) while masked by the convexities (formed fine particles), it is possible not only to make the concavities and convexities higher (deeper) but also to enlarge the angle of inclination of the side wall.

Further, from the result of the present Example in combination with the result of Auger spectroscopy in Example 1, it was confirmed that fine particles formed on the surface of the substrate 104 contain Ta (element constituting the supply source 103) that is highly resistive to RIE.

Example 14

Example 14 is an example in which a magnetic storage medium was produced through the method in Sixth Embodiment. Here, an explanation will be made as to the magnetic storage medium 651 produced through the steps of FIGS. 8(a) to 8(c) for producing a magnetic storage medium in Sixth Embodiment.

In the present Example, the substrate 104 was a glass disc generally used as a substrate for a hard disc medium. An Si film of 70 nm in thickness, to which B was doped, was formed on the surface of the glass disc through sputtering.

Initially, in the step of FIG. 8(a), the fine particles 610 with high periodicity were formed on the surface of the substrate 104 through the same method as in Example 6 except that the base material (glass disc) for the substrate 104 was different. The fine particles 610 obtained here exhibited high periodicity in the range of 13 nm to 38 nm as in Example 6.

Next, in the step of FIG. 8(b), the substrate 104 was etched while masked by the fine particles 610 through the method in Example 13. In the Example, as in Example 13, the mixture ratio of $CHF_3$ gas to $SF_6$ gas was 1:2, and plasma was generated in the atmosphere of 5.0 Pa. A radiated electric power of an RF power source was 30 W, and the etching treatment was performed for 12 seconds with a reflected electric power being 1 W or less. As a result, concavities and convexities whose maximum vertical interval was approximately 15 nm in the AFM scanning range of 1 µm square was obtained as in Example 13.

Next, in the step of FIG. 8(c), the storage layer (magnetic film) 611 of 15 nm in thickness, made of TbFeCo, was formed on the fine particles 610 and then the protective layer 612 of 5 nm in thickness, made of AlN, was formed on the storage layer 611. The composition ratio of TbFeCo used for the storage layer 611 was adjusted so that compensation temperature was room temperature (25° C.) or less, coercive force at 25° C. was 1.5 kOe (0.12 A/m), and Curie temperature was 180° C. on a Si substrate on which concavities and convexities are not formed.

The magnetic storage medium 651 produced through the above steps were subjected to AC erase in which a magnetic field (20 kOe (1.6 A/m)) was applied in a direction perpendicular to the surface of the substrate 104, and then polarity was inverted while sweeping the magnetic field, and the magnetic field was gradually reduced. Magnetic domains formed in the storage layer 611 of the magnetic storage medium 651 having been subjected to the AC erase was observed with MFM (Magnetic Force Microscope). The observation with MFM was performed with a Nanoscope DI-3100 manufactured by Veeco Instruments as in the observation with AFM.

Figure 39:
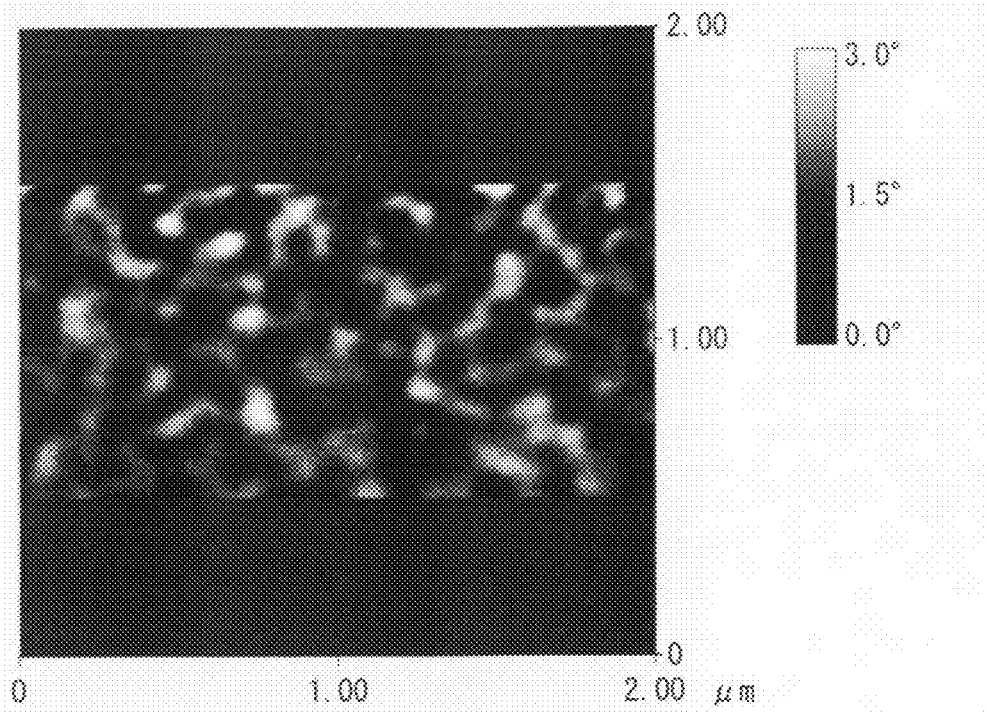
FIG. 39(a) is a drawing illustrating an image obtained by observation with MFM of a magnetic storage medium in Example 14.
FIG. 39(b) is a drawing illustrating an image obtained by observation with MFM of a magnetic storage medium for comparison.
Figure 39:
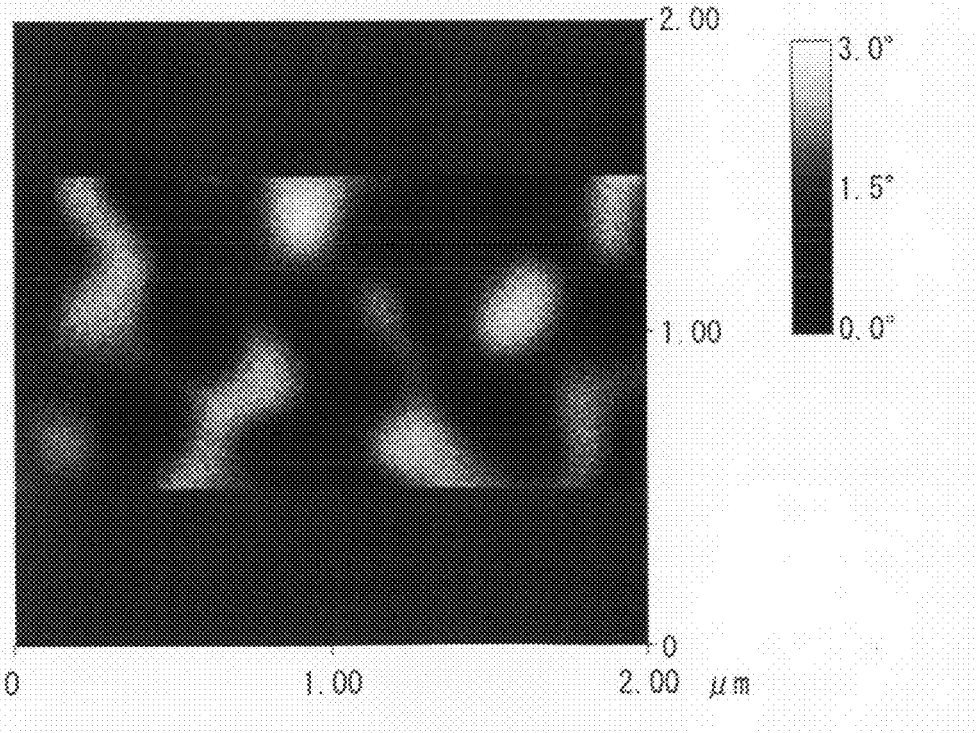

FIG. 39 (a) illustrates an image obtained by observation with MFM of the magnetic storage medium 651 of the present Example produced through the step of FIGS. 8(a) to 8(c). FIG. 39(b) illustrates, for comparison, an image obtained by observation with MFM of a magnetic storage medium made by forming the storage layer 611 and the protective layer 612 on the same glass disc as that of the present Example, without formation of the fine particles 610 and the etching treatment.

The storage layer 611 and the protective layer 612 for comparison were made of the same material and had the same thickness as those of the storage layer 611 and the protective layer 612 of the present Example. Further, the magnetic storage medium for comparison was subjected to AC erase and then observed with MFM, as in the case of the magnetic storage medium 651 of the present Example. Brightness and darkness in FIGS. 39(a) and 39(b) correspond to the size of a magnetic field that was generated from the storage layer 611 in a direction perpendicular to the surface of the substrate. A bright portion and a dark portion correspond to magnetic domains formed in the storage layer 611.

The results of FIGS. 39(a) and 39(b) are as follows. In the magnetic storage medium for comparison in FIG. 39(b), magnetic domains were formed with a main period of approximately 300 nm to 500 nm (magnetic inversion occurred), and the smallest magnetic domain in the observed range had a diameter of approximately 200 nm.

On the other hand, the magnetic storage medium 651 of the present Example in FIG. 39(a), magnetic domains were formed with a main period of approximately 70 nm to 120 nm (magnetic inversion occurred), and the smallest magnetic domain in the observed range had a diameter of approximately 50 nm. That is, the size of the magnetic domain of the magnetic storage medium 651 was approximately one-fourth of that of the magnetic storage medium for comparison.

The reason seems to be that in the magnetic storage medium 651 of the present Example, fine particles (concavities and convexities) with high periodicity were formed as a base for the storage layer 611, and consequently a pinning effect was yielded for the storage layer 611. That is, if the concavities and convexities would not exist, the magnetic domains of the storage layer 611 would be coupled with each other in the same direction to have the size of 300 nm to 500 nm to form a magnetic domain. However, in reality, fine particles (concavities and convexities) whose period is smaller than the above size exist, and consequently the atoms of the material of the storage layer 611 are prevented from being coupled with each other in the same direction to have the size of 300 nm to 500 nm, and are stably kept in the form of a small magnetic domain.

The MFM image in FIG. 39(a) shows a slight change of brightness and darkness that corresponds to the period (approximately 25 nm in diameter) of fine particles (concavities and convexities) formed as a base for the storage layer 611.

This clearly indicates that miniaturization of magnetic domains realized in the magnetic storage medium 651 of the present Example was caused by the fine particles (concavities and convexities) serving as a base.

Further, since the fine particles (concavities and convexities) serving as a base has high periodicity, it is possible to make dispersion of the size of a formed magnetic domain smaller than the case where a base without high frequency is used. Consequently, it is possible to form recording bits with uniform sizes and to increase the quality of a reproduction signal when recording/reproducing magnetic information to/from the magnetic storage medium.

The present invention is applicable to a normal magnetic recording method in which magnetic information is stored with use of a magnetic field, an optical magnetic recording method in which magnetic information is stored with use of light or heat and a magnetic field, a laser-assisted (heat-assisted) magnetic recording method, and the like. Specifically, the present invention is widely applicable to production of storage media such as tapes (e.g., magnetic tape and cassette tape), magnetic discs (e.g., Floppy® disc and hard disc), and cards (e.g., IC card (memory card)). Further, the present invention is applicable to production of a sensor device for analyzing a sample from the outside and production of nanowires and nanotubes such as carbon nanowires and carbon nanotubes.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A method for forming concavities and convexities, comprising the step of forming concavities and convexities on a substrate by supplying, in a presence of inert gas, to the substrate, atoms or molecules of a supply material that is capable of being combined with a material constituting a surface of the substrate to produce a compound, the atoms or the molecules of the supply material being supplied from a supply source,
   the supply source being positioned in such a manner that the supply material from the supply source is not directly incident to the surface of the substrate where the concavities and convexities are to be formed,
   a high-frequency voltage varying positively and negatively with respect to a ground voltage, ranging from 100 kHz to 100 MHz, being applied to at least one of the substrate and a substrate supporter for supporting the substrate.

2. The method as set forth in claim 1, wherein
   the material constituting the surface of the substrate is a material mainly containing an element selected from Si, Ge, and Al or a material mainly containing an alloy of the material, and
   the supply material is (i) a material mainly containing an element selected from V, Cr, Zr, Nb, Mo, Hf, Ta, and W, (ii) a material mainly containing an alloy of the material (i), or (iii) a material mainly containing an alloy of the materials (i) and (ii) and the material constituting the surface of the substrate.

3. The method as set forth in claim 1, wherein the supply material is supplied to the substrate through sputtering.

4. The method as set forth in claim 3, wherein the substrate is positioned outside a plasma emission area that accompanies sputtering to the supply source.

5. The method as set forth in claim 1, wherein the supply source is positioned on the substrate supporter for supporting the substrate or at least a part of the substrate supporter is made of the supply source.

6. The method as set forth in claim 1, wherein a blocking member for preventing the supply material from being directly incident to the surface of the substrate is provided between the substrate and the supply source.

7. The method as set forth in claim 1, wherein the surface of the substrate where the concavities and convexities are to be formed is provided with steps.

8. The method as set forth in claim 1, wherein a magnetic film is formed on the surface of the substrate where the concavities and convexities are to be formed.

9. A method for forming concavities and convexities, comprising the step of etching a substrate by using, as masking, concavities and convexities formed through the method as set forth in claim 1.

* * * * *